United States Patent [19]

Launey et al.

[11] Patent Number: 5,086,385
[45] Date of Patent: Feb. 4, 1992

[54] EXPANDABLE HOME AUTOMATION SYSTEM

[75] Inventors: Reuel O. Launey, Arlington, Va.; Peter A. Grendler, Silver Spring, Md.; Donald L. Packham, Fort Lauderdale, Fla.; James M. Battaglia, Kettering; Howard E. Levine, Adelphi, both of Md.

[73] Assignee: Custom Command Systems, College Park, Md.

[21] Appl. No.: 304,300

[22] Filed: Jan. 31, 1989

[51] Int. Cl.[5] .............................. G05B 15/02
[52] U.S. Cl. ..................... 364/188; 364/189; 340/825.37; 379/102
[58] Field of Search .............. 364/200, 900, 188, 189, 364/513.5; 379/102, 104, 79; 340/825.37, 825.69; 219/10.55 B, 506; 319/46, 47, 97, 98

[56] References Cited

U.S. PATENT DOCUMENTS

| | | | |
|---|---|---|---|
| 4,503,288 | 3/1985 | Kessler | 179/2 DP |
| 4,513,189 | 4/1989 | Ueda et al. | 219/10.55 B |
| 4,520,576 | 6/1985 | Vander Molen | 34/45 |
| 4,521,645 | 6/1985 | Carroll | 379/98 |
| 4,663,775 | 5/1987 | Olek | 379/24 |
| 4,665,544 | 5/1987 | Honda et al. | 379/104 |
| 4,728,949 | 3/1988 | Platte et al. | 340/825.37 |

Primary Examiner—Jerry Smith
Assistant Examiner—Paul Gordon
Attorney, Agent, or Firm—Dickstein, Shapiro & Morin

[57] ABSTRACT

A system for and a method of providing an expandable home automation controller is disclosed which supports multiple numbers and multiple different types of data communications with both appliances and subsystems within the home as well as systems external to the home. The system is based upon a central processor, such as a microprocessor-based computer, and is connected by means of a data bus to control the various products and subsystems within a home or commercial building, such as lighting systems, security systems, various sensors, multiple external terminals, as well as to allow for the input of commands by a variety of means such as touchscreens, voice recognition systems, telephones, custom switches or any device capable of providing an input to a computer system. The system functions can be readily controlled by the user utilizing a high resolution graphics display and associated touchscreen interface.

20 Claims, 45 Drawing Sheets

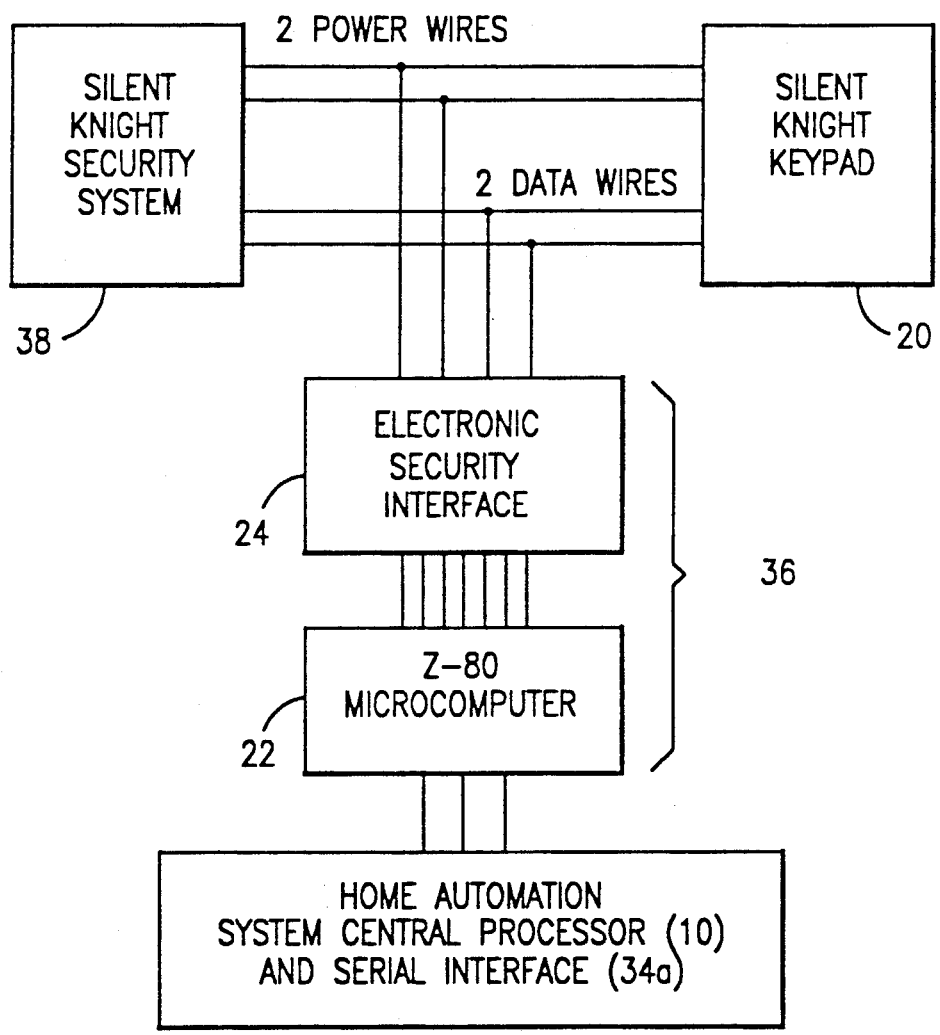

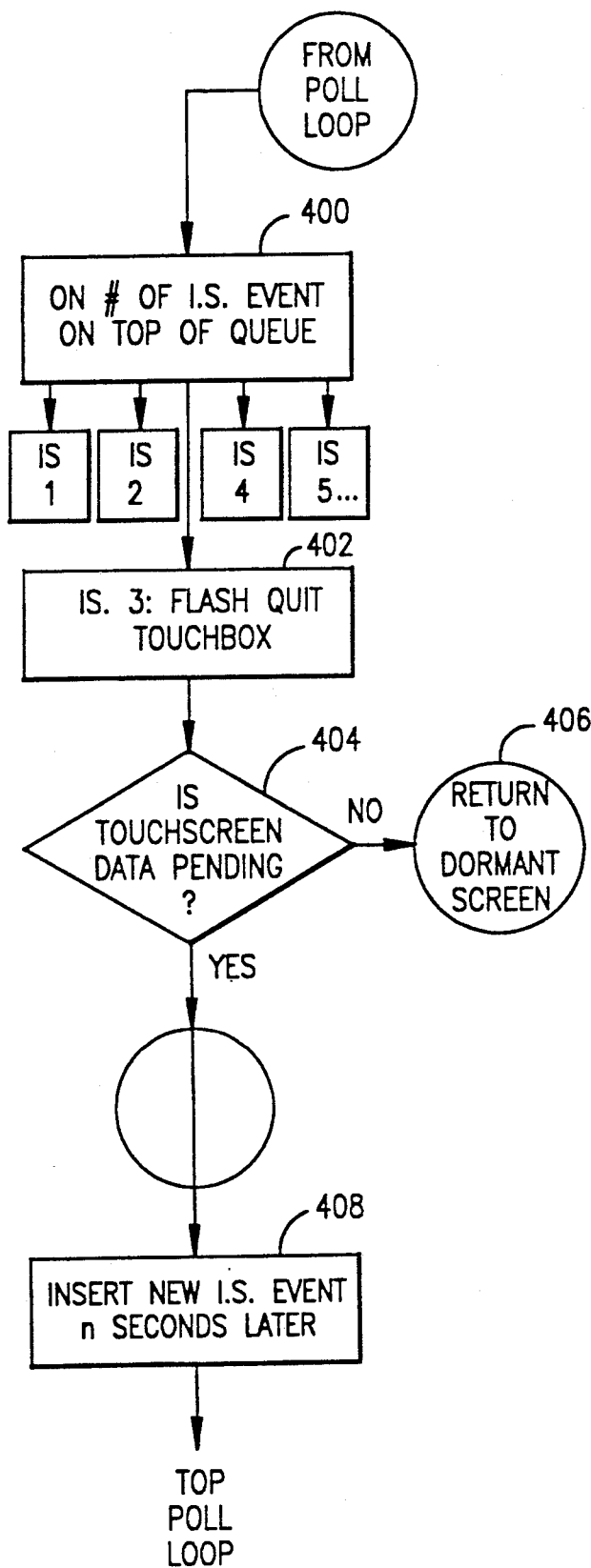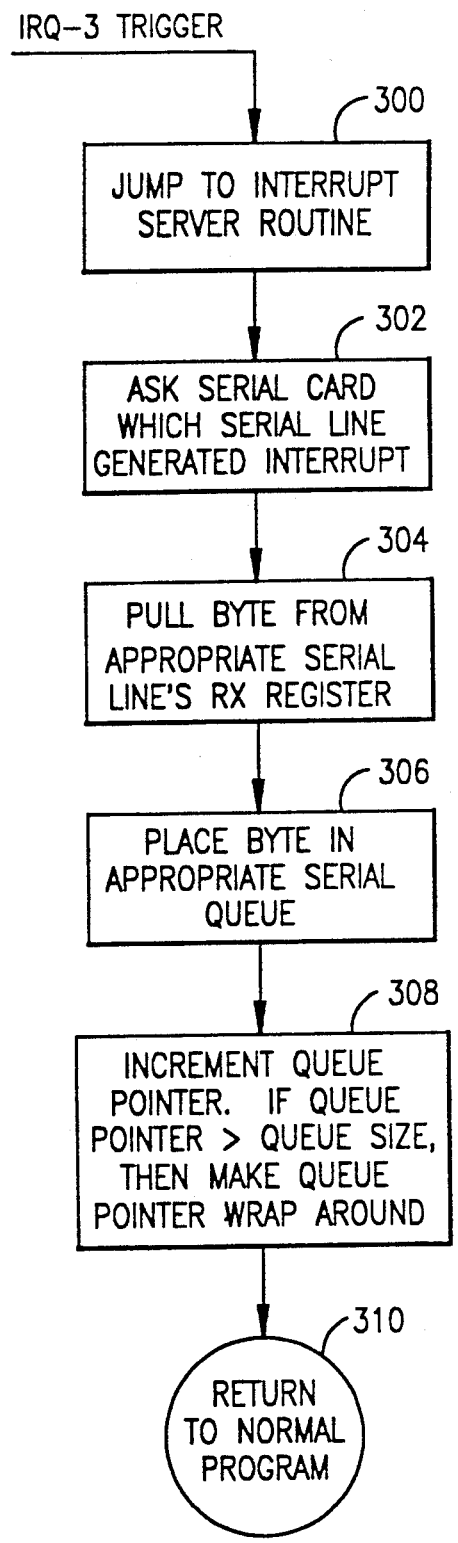
FIG. 4a
FIG. 4b

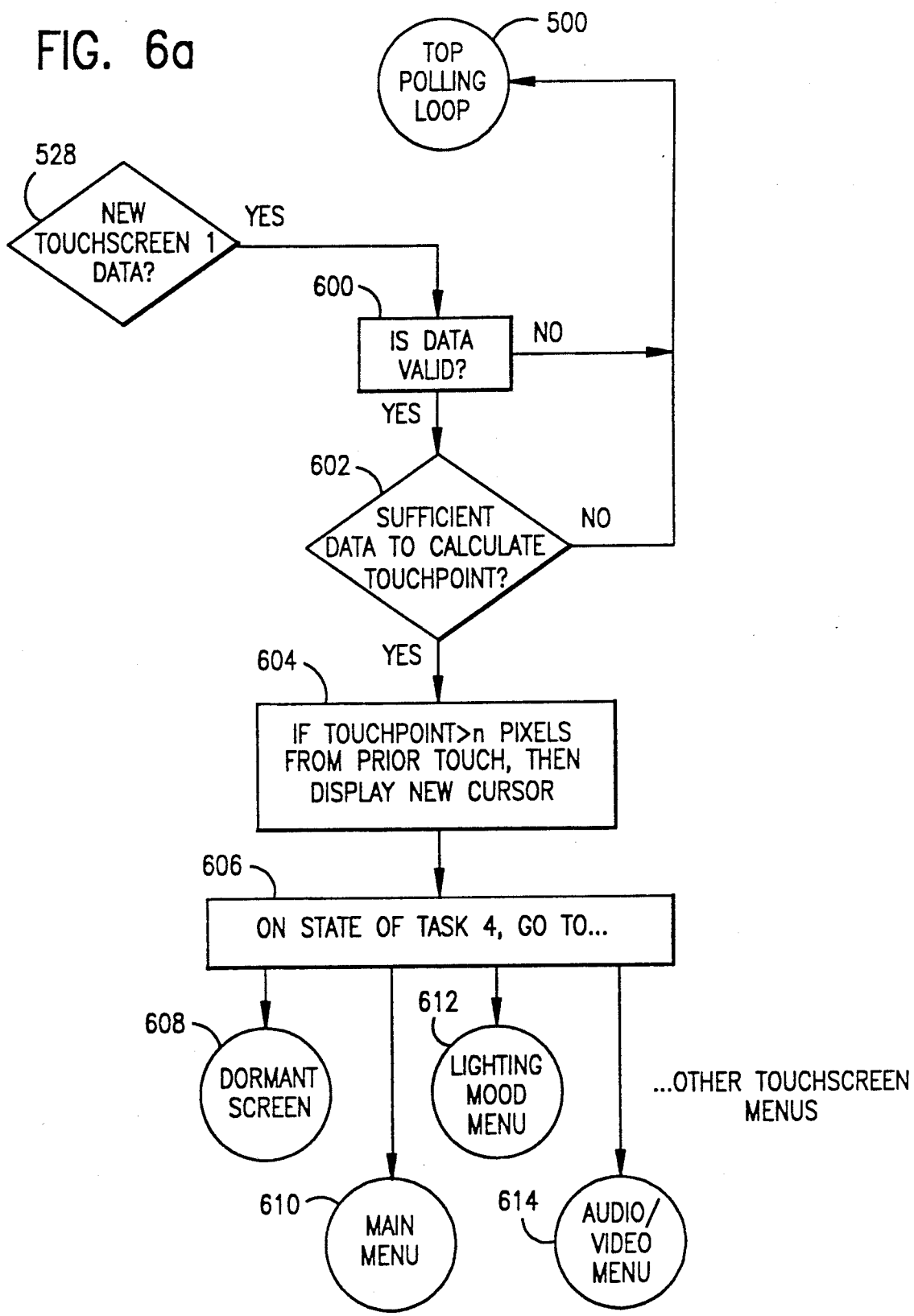

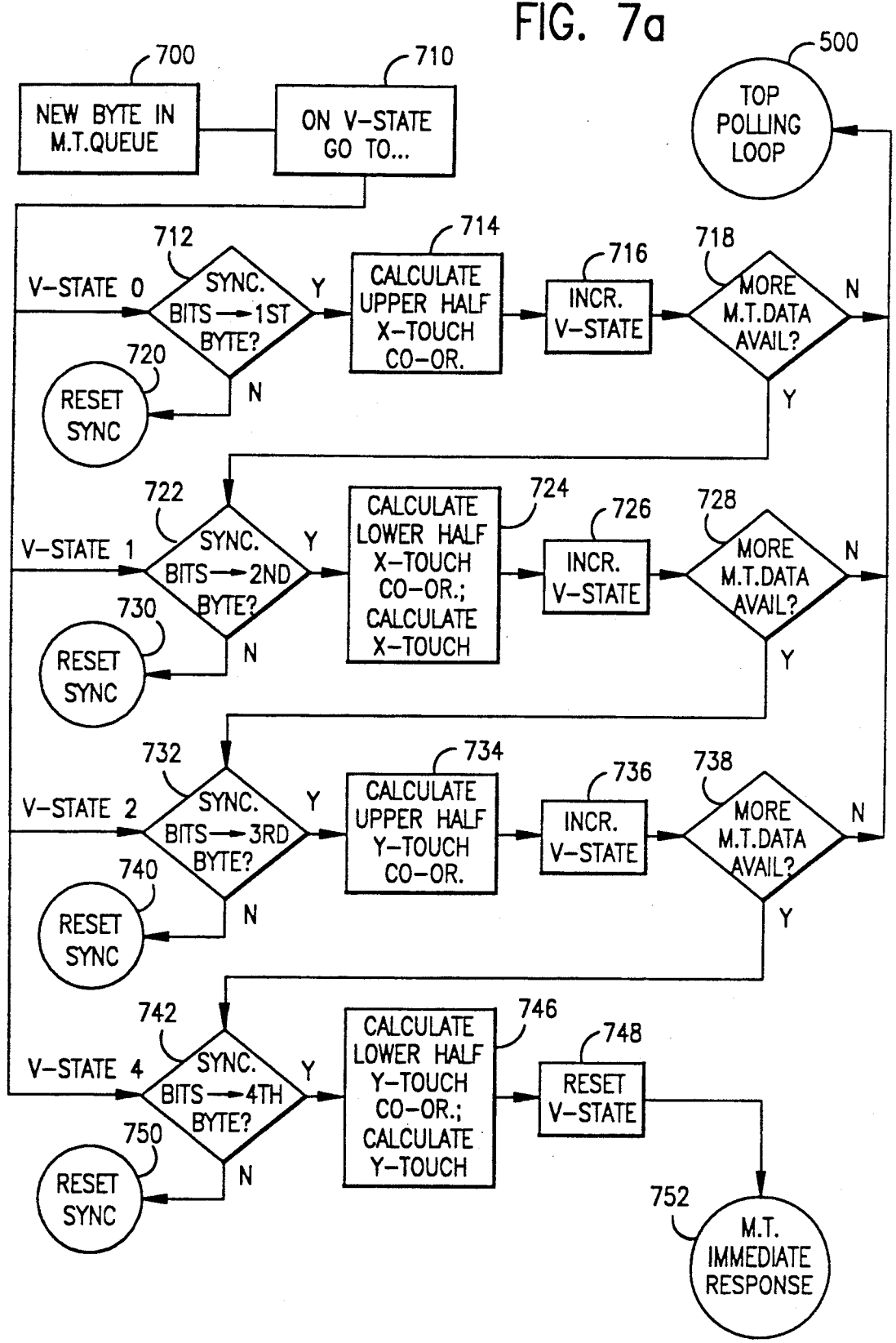

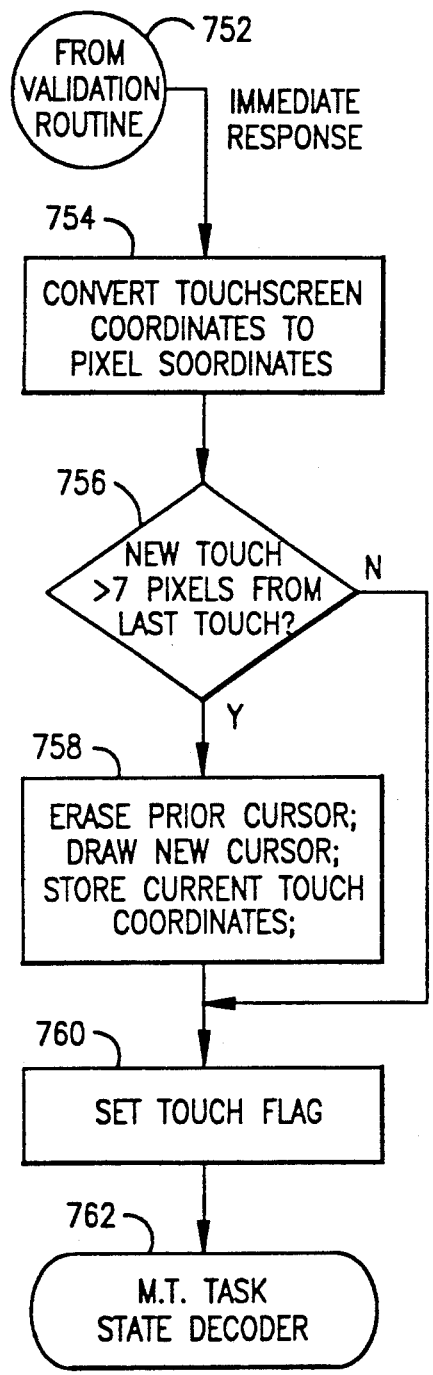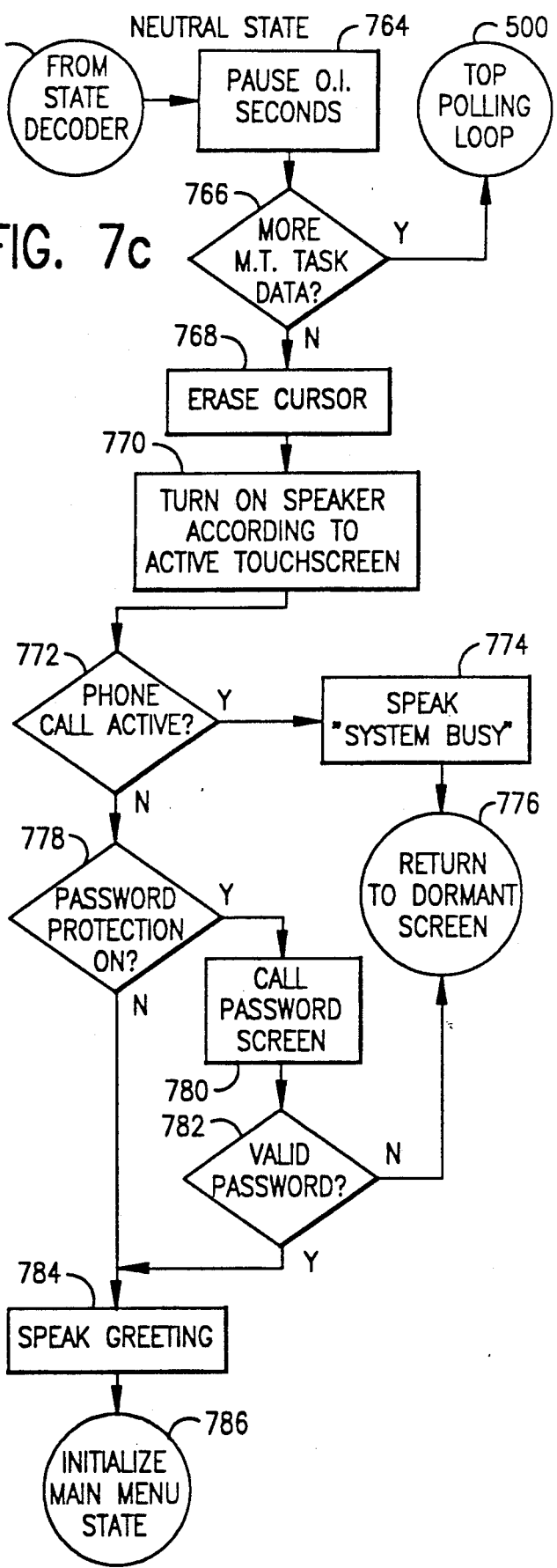

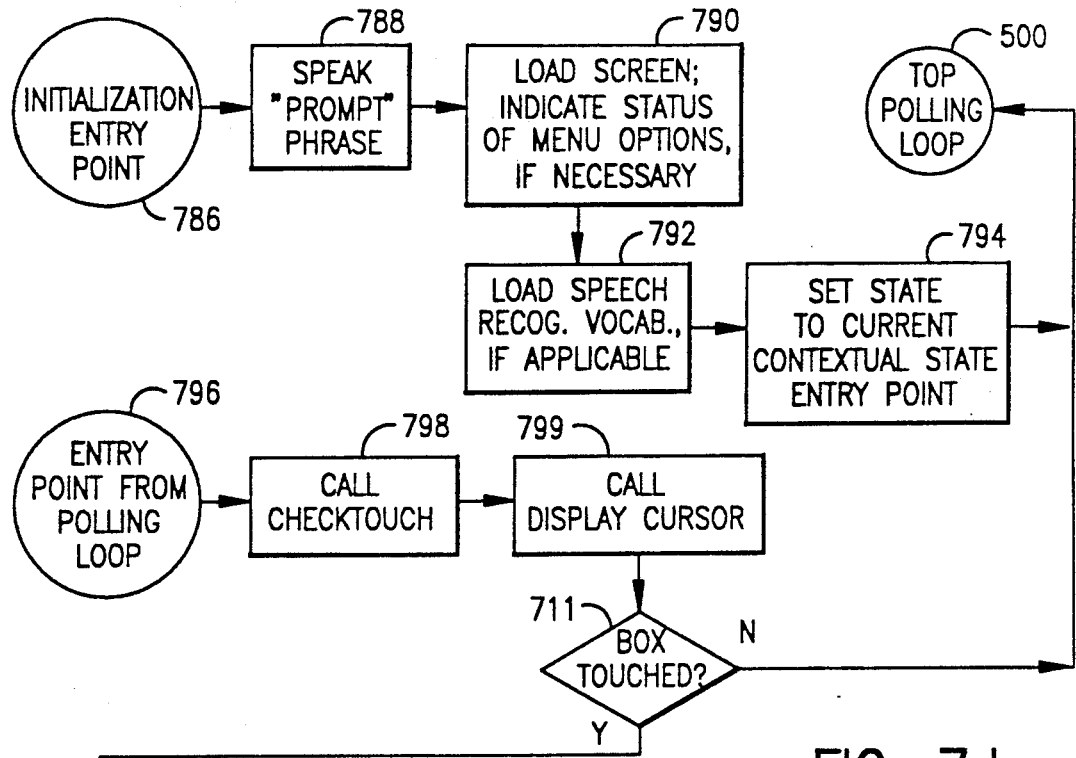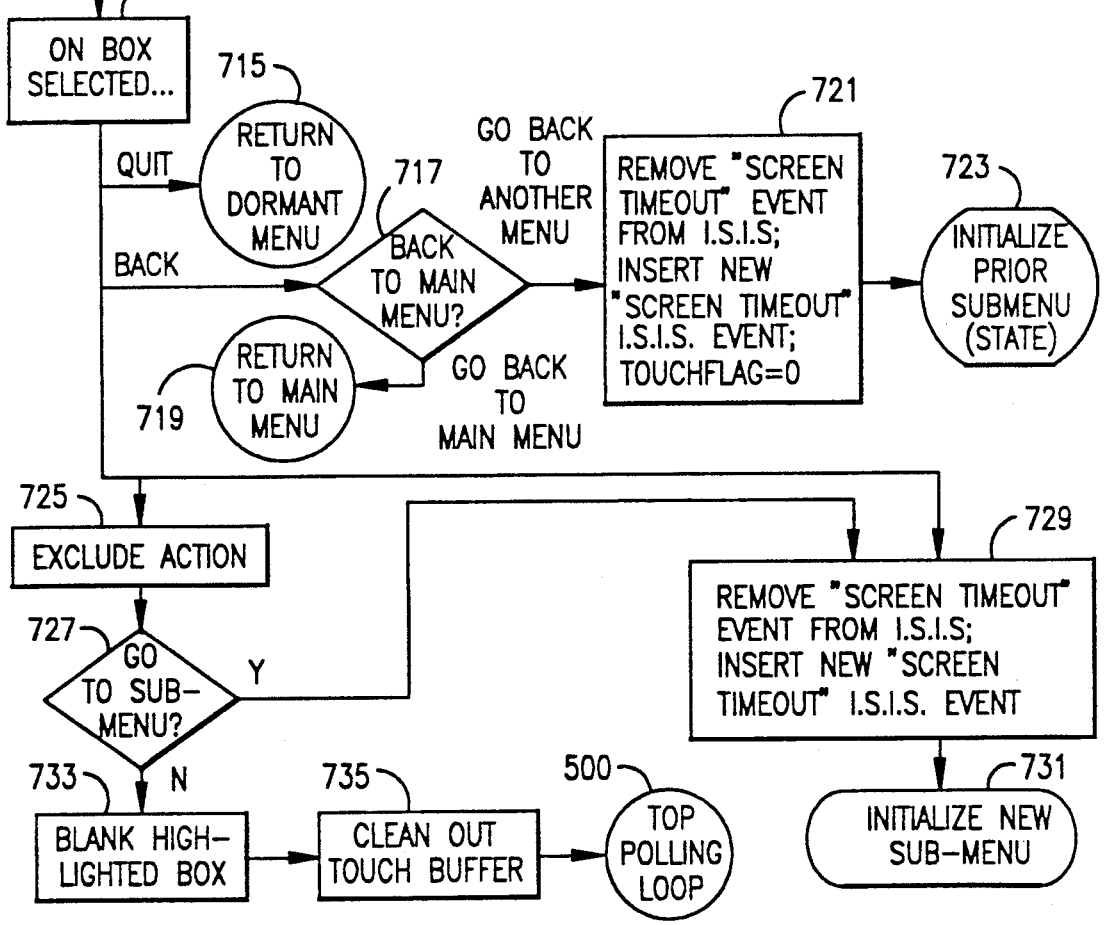
FIG. 7d

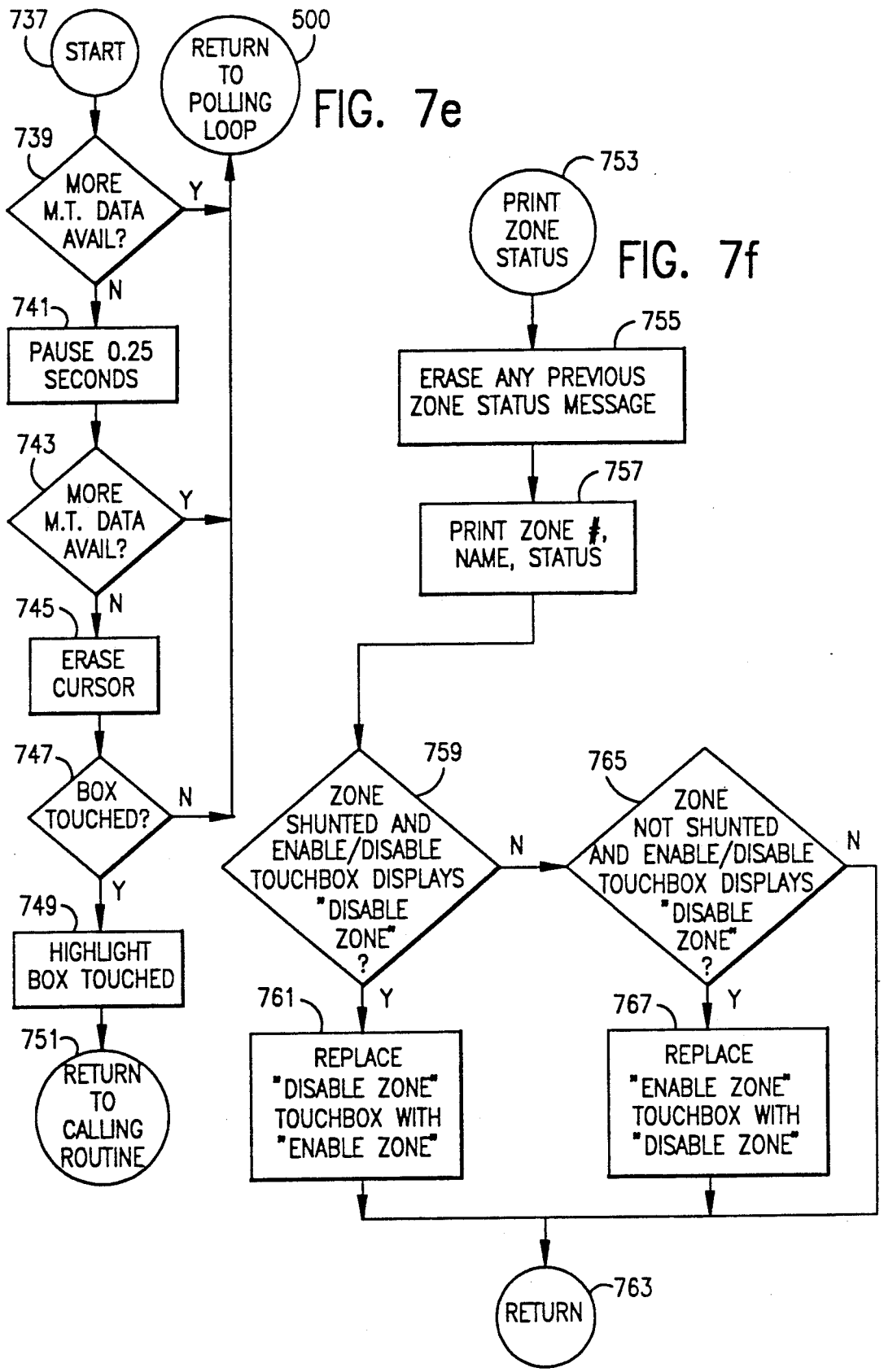

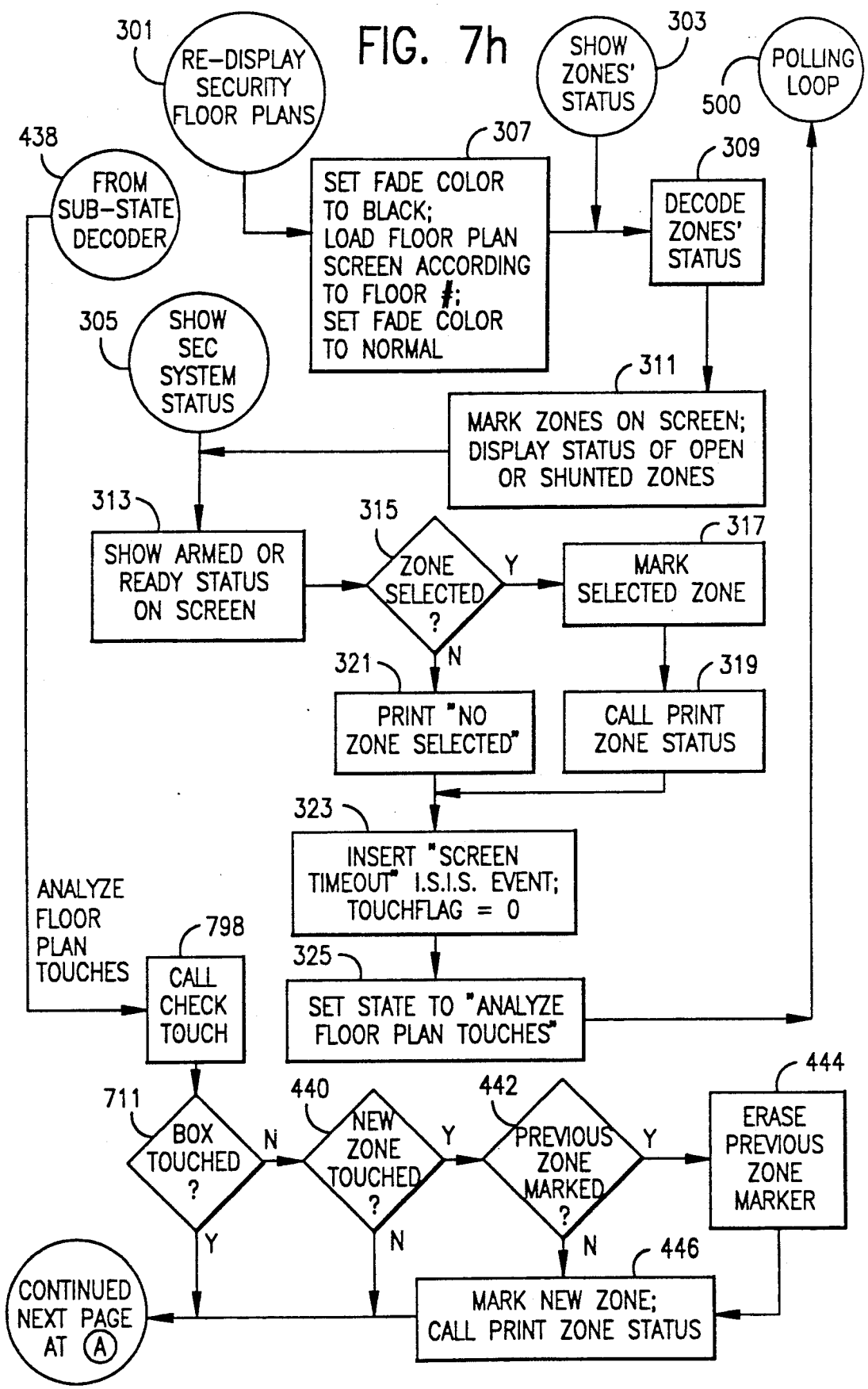

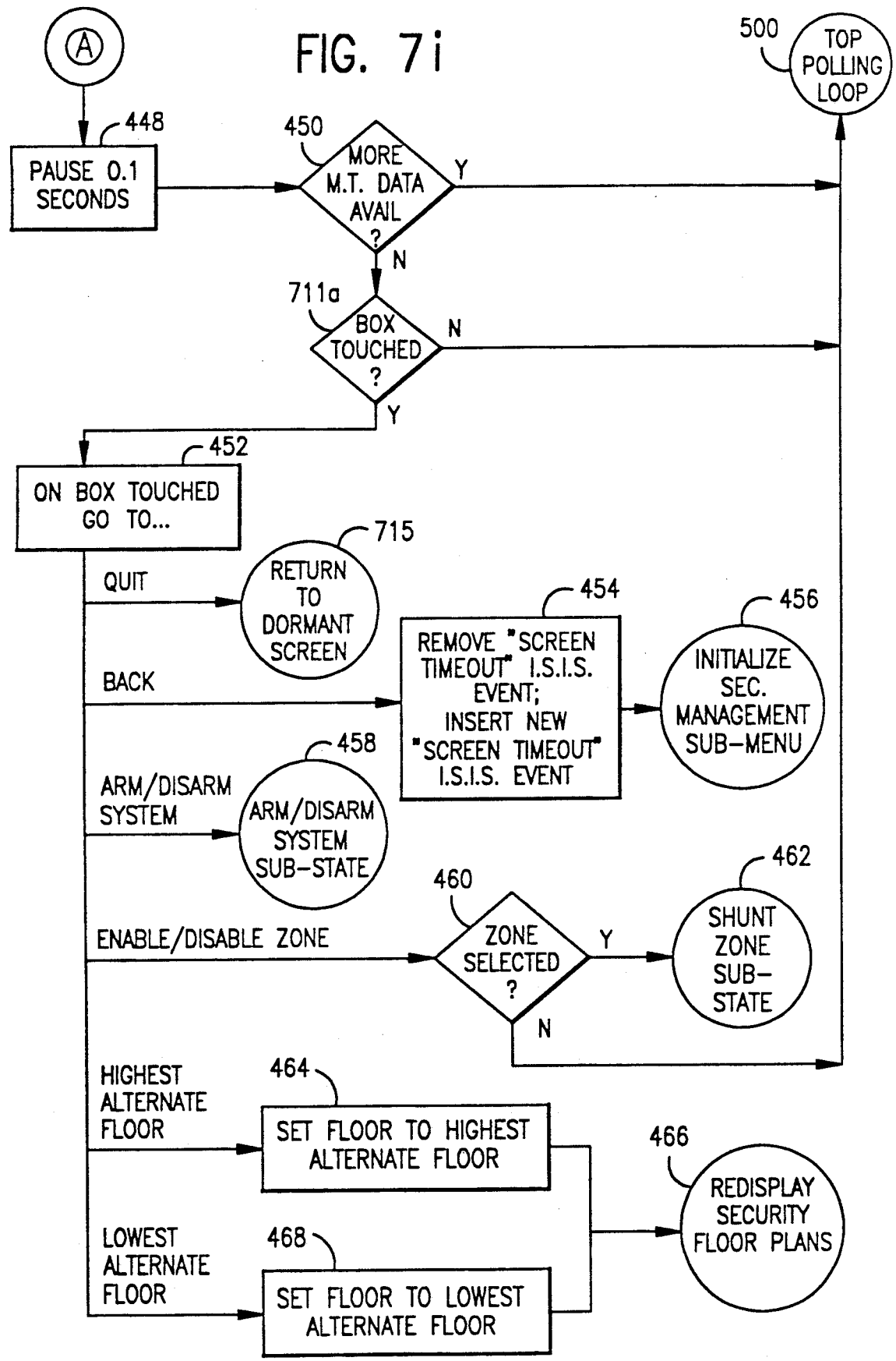

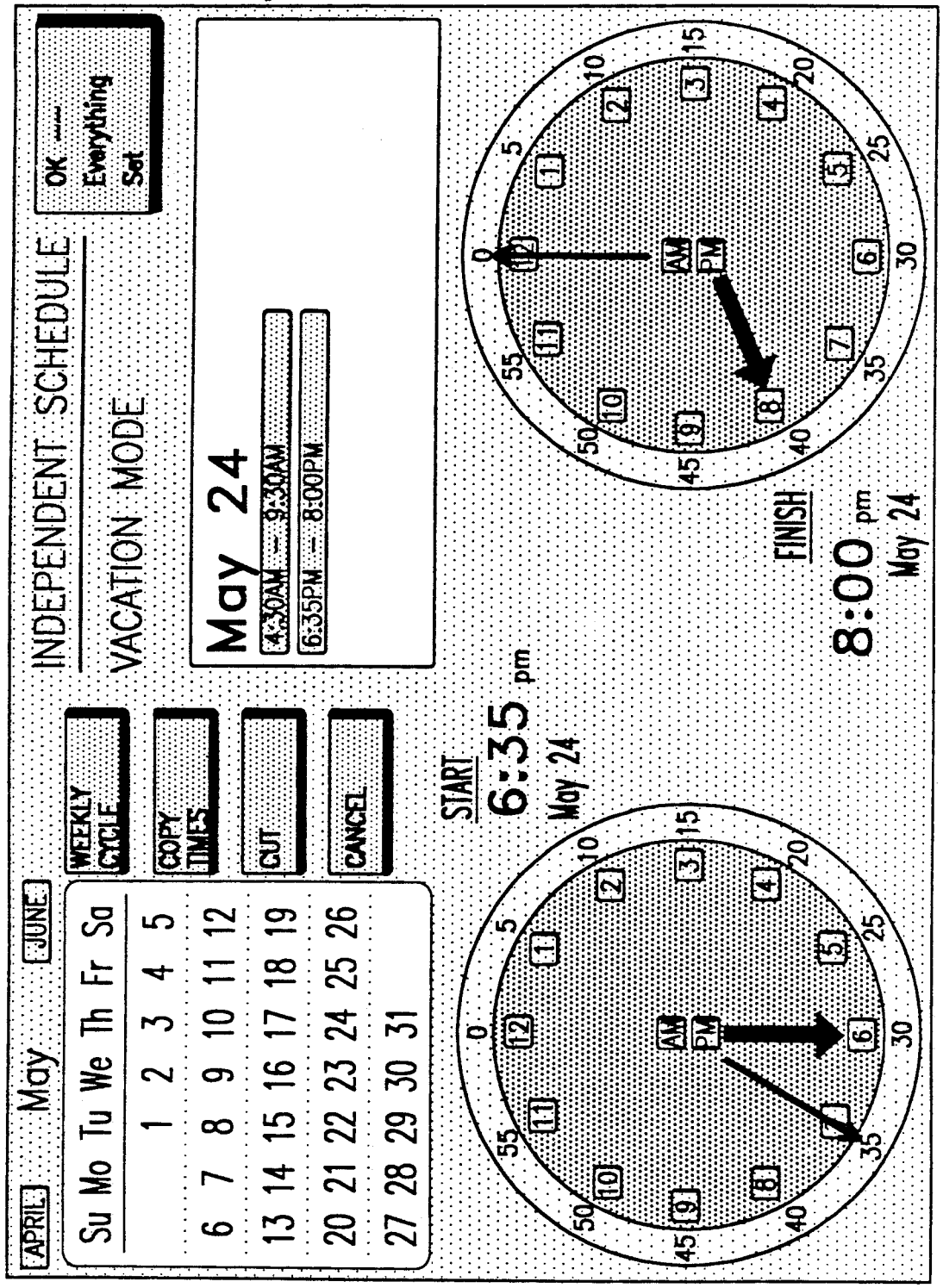

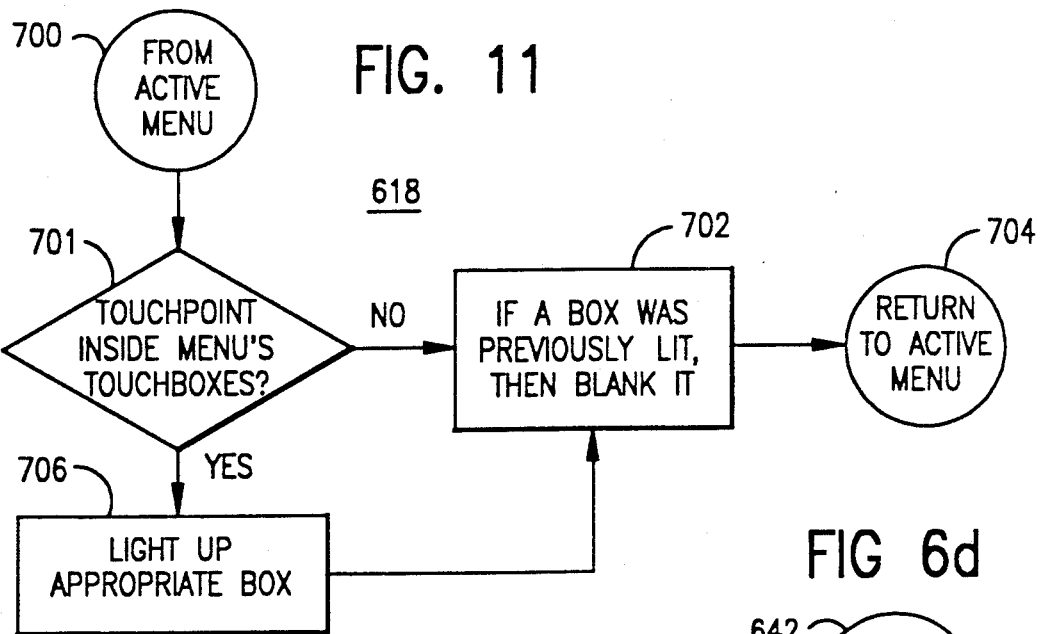
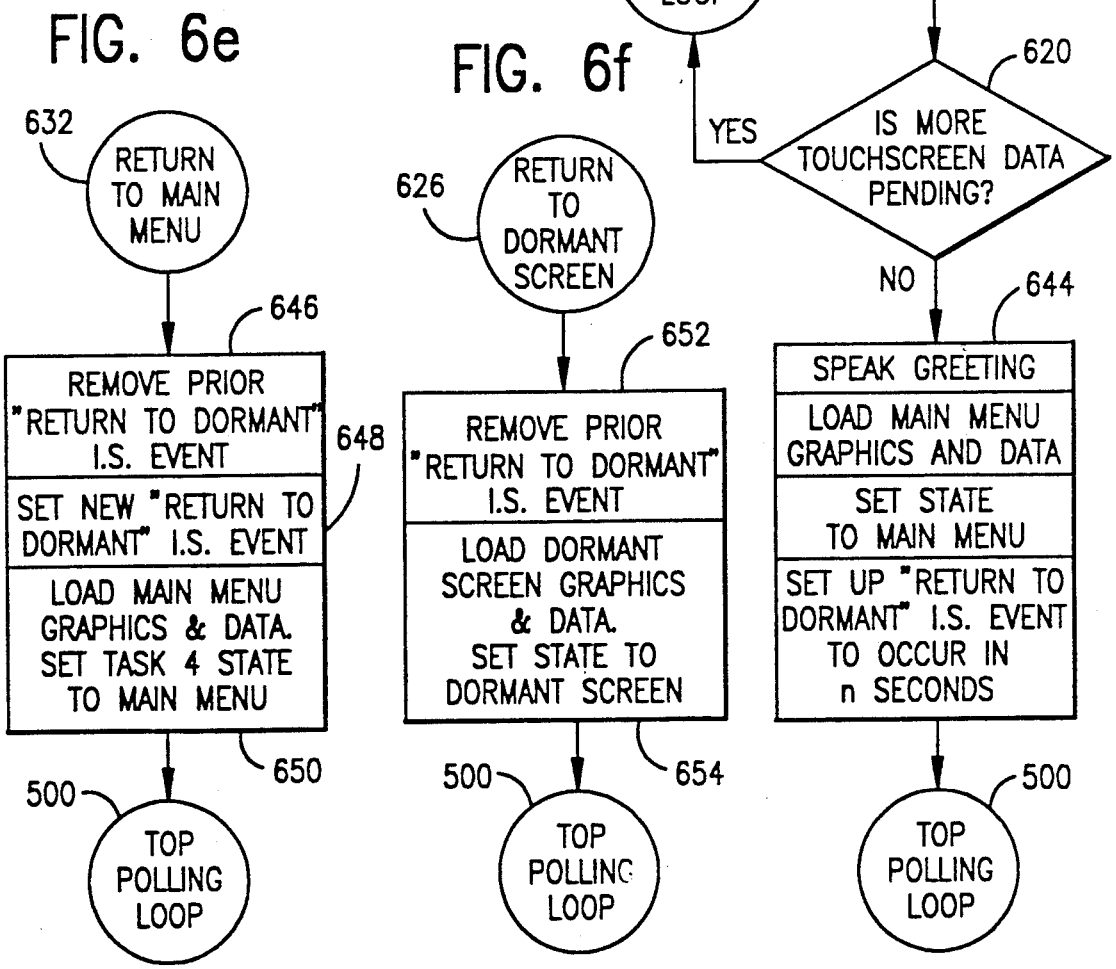

EXPANDABLE HOME AUTOMATION SYSTEM

BACKGROUND OF THE INVENTION

The present invention relates to computer controlled systems for automating a plurality of diverse electrically controllable subsystems. More particularly, the present invention relates to a microprocessor-based electronic control system for use in the automation and control of electrical subsystems found in the home environment. Such systems may also be utilized in commercial applications.

In the past, sophisticated electronic control over complex systems has been limited primarily to industrial applications, and occasionally commercial applications. Such electronic control systems usually required extensive and costly equipment, as well as technically trained operators. However, as consumer products and systems become more and more complex, untrained people in home environments have been increasingly desirous of obtaining a sophisticated electronic control system for enabling an easy to use control over such home products and systems. Many such products and systems are also increasingly being used in commercial environments, such as electronic conference rooms, in which it is also desirable to provide an easy to use control system for use by individuals who are often not skilled in technological arts.

Known home automation systems are generally built around a small control box which is connected by means of existing household 110 volt AC wiring to one or more modules distributed throughout the home. The appliances and/or lights to be controlled are in turn connected to the modules and may thus be controlled from the control console by the homeowner. The main advantage of such "power-line carrier" home control systems is that they are low in cost and utilize existing home wiring. However, such power-line carrier control systems can be easily disrupted by outside environmental electrical disturbances, such as weather conditions. In addition, such systems allow the control of only a relatively limited number of types of electrical appliances, namely, lights and small electrical appliances. They do not, however, allow for any sophisticated programming functions other than perhaps a time on and time off feature Thus, power-line carrier control systems are of relatively limited utility for home automation purposes.

More sophisticated home automation system designs are known, which are generally built around a programmable microprocessor connected to a local bus which accepts a limited number of input/output control cards. Such systems may allow the connection of one or two user control devices such as a keypad or a touchscreen for inputting control commands to the home automation system. However, such systems have a predetermined limited number of how many devices and user interfaces the system can support. Generally speaking, in order to expand such systems, a second identical controller is required with its own programming for controlling its own connected devices and user interfaces. Although such an approach may be cost effective for small home automation systems, it is too limiting for more sophisticated automation tasks or for larger homes.

The inventive expandable home automation system disclosed in this application overcomes such limitations and drawbacks of the prior art systems by being designed as a master controller for intelligent subsystems. Although it can also control simple devices directly, the primary method of control of the present invention is by means of multiple communication channels which are compatible with or convertible to a wide variety of standard data communications protocols. Thus, the system disclosed in this application can be connected to virtually any type of electrically controlled device that may be presently found in a home or can conceivably be connected to either the standard data communication buses in existence today, local area networks or future home automation data buses such as CEBUS or the SMART HOUSE bus. The system may also be connected to devices to be controlled directly by parallel and serial ports.

With the innovative expansion capabilities of the inventive system, simultaneous operation of multiple types of user devices can now be achieved. For example, the home automation system described herein may be connected to simple keyboards, serial data keypads, touchscreens, voice recognition circuitry, hand-held remote controls, computer keyboards or telephones. In fact, virtually any type of electronic subsystem may be connected, by means of an appropriate interface, to the present system.

The present invention is also compatible with commercially available automation controllers. Thus, for example, when a control task requires an extensive number of inputs and outputs, the system can become the "master controller" for a wide variety of commercial or special purpose automation controllers. Such a capability is not available in any other known home automation system controller.

Due to the innovative expansion capabilities discussed above, the present invention, while allowing simultaneous operation of multiple types of user devices and compatibility with commercial automation controllers, is also compatible with intelligent appliances and subsystems and with external information retrieval services.

Consumer appliances used in the home are increasingly becoming more intelligent. The appliance manufacturers are increasingly incorporating connections for microprocessor-based intelligent remote control. The system controller of the present invention embodies a multiple data port capability which provides for its connection to an unlimited number of such intelligent appliances simultaneously. For example, the expandable home automation system may be connected to control or communicate with intelligent audio/video systems, heating/cooling systems, access control systems, security systems, telephone systems, appliances and lighting systems.

Having access to multiple data ports also allows the system disclosed in this application to dedicate one or more data ports for connection to external information services or gateways to information services by means of a modem or other type of data connection. That allows the instant inventive home automation system to become an information provider as well as a controller.

SUMMARY AND OBJECTS OF THE INVENTION

In view of the foregoing, it should be apparent that there still exists a need in the art for a home automation control system which allows for the sophisticated control, including programming, of virtually any home subsystem or appliance in which electronic means are utilized by the user in a simple to understand and yet precise manner to accomplish the desired control or monitoring function. It is, therefore, a primary object of this invention to provide an expandable home automation control system for providing sophisticated control functions over complex subsystems found in a home which is characterized by intuitive and simple to use user interfaces.

More particularly, it is an object of this invention to provide an expandable control system which provides for a simple, intuitive and easy to use control over complex subsystems utilized in commercial buildings.

Still more particularly, it is an object of this invention to provide an expandable home automation control system which includes a multiple port, expandable controller.

Another object of the present invention is to provide an expandable home automation control system in which the user utilizes high resolution color graphics touchscreens for instructing the system to perform its control functions.

A further object of the present invention is to provide an expandable home automation control system in which voice recognition is utilized by the user to instruct the system to control subsystems present in the home.

A further object of the present invention is to provide an expandable home automation system in which voice recognition may be used in concert with high resolution color graphics displays in order to provide the user with an easy to use interface for instructing the system to perform its control or monitoring functions.

Still another object of the present invention is to provide an expandable home automation system which incorporates multiple types of user devices which may be utilized simultaneously.

A still further object of the present invention is to provide an expandable home automation control system which uses dynamic, object-oriented touch or cursor-controlled displays for controlling and scheduling actions.

Still more particularly, it is an object of this invention to provide an expandable home automation control system which integrates tailored information retrieval together with communication services.

Still another object of the present invention is to provide an expandable home automation control system which displays plan views of the home and allows the user to create certain moods therefore.

A still further object of the present invention is to provide an expandable home automation control system which provides multiple dimensions of interaction and control.

Another object of the present invention is to provide an expandable home automation control system which utilizes multifunction display monitors to display multiple types of video imagery.

A further object of the present invention is to provide an expandable home automation control system which utilizes an electronic interface to a multi-zone security system to thereby allow touch or cursor-control of the security system by means of graphics displays.

Still another object of the present invention is to provide an expandable home automation control system in which spoken messages are utilized as prompts for touchscreen use.

Briefly described, these and other objects of the invention are accomplished in accordance with its apparatus aspects by providing a home automation controller which is designed to support multiple numbers and multiple different types of data communications with external systems. Such a controller is unlimited in its means of communications with external systems since it is fundamentally compatible with all forms of data communications. The system controller utilizes a microprocessor-based computer, such as an IBM AT type, or compatible, with its associated memory and storage subsystems. The processor is connected by means of a high speed data bus to a plurality of external parallel and serial interfaces, external custom interfaces and external network interfaces. The external parallel and serial interfaces are connected to various external systems, such as home automation buses like CEBUS or SMART HOUSE. If necessary, optional protocol translators are connected between those external systems and the external serial and parallel interfaces.

The external custom interfaces are connected directly to various external systems, while the external network interfaces are connected directly to multiple external systems. By means of such structure, an 80286-based AT compatible microcomputer can be utilized, by means of the IBM AT data bus, to control various products and subsystems within a home or commercial building, such as lighting systems, security systems, various sensors, multiple external terminals, and to allow for input of commands by a variety of means such as touchscreens, voice recognition, telephones, custom switches or any device capable of providing input to a computer system.

The method of the present invention is carried out by the use of a Home Environment Automated Real-time Transactor (HEART) which is a standardized, modular, software program that is configured for each installation. Secondary processors are utilized, under HEART control, to relay information to the central 80286-based microcomputer or central processor, or to translate central processor commands into commands their dedicated devices can understand. A star hardware topology is currently utilized. The secondary processors manage the voice recognition and voice synthesis subsystems, telephone communication subsystems, touchscreen subsystems, hand-held remote control unit communications, input/output control and monitoring, security/fire safety and monitoring and other intelligent subsystems such as lighting, audio, video and HVAC.

The central processor's HEART software is comprised of six major portions: the Subsystem Interrupt Handler, the Internal Scheduled Interrupt Server (ISIS), the Polling Loop, the Tasks, the Device Drivers and the Support Environment. Those modules interact with any software contained in the intelligent secondary processors in order to provide an integrated and seamless control environment for the user.

With these and other objects, and advantages of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 2 is an schematic block diagram of the security system interface used as part of the apparatus of FIG. 1;

FIG. 4a is a flow chart showing the Internal Scheduled Interrupt Server module of the HEART central processor software utilized with the present invention; and FIG. 4b is a flow chart showing the Serial Interrupt Handler module of the HEART central processor software utilized in the present invention.

FIG. 5b is a flow chart showing the second half of the Polling Loop module shown in FIG. 5a.

FIG. 7a is a flow chart showing the validation routine of the master touchscreen task of the present invention;

FIG. 7b is a flow chart showing the immediate response portion of the master touchscreen task module of the present invention;

FIG. 7c is a flow chart showing the neutral state of the master touchscreen task module of the present invention;

FIG. 7d is a flow chart showing the general contextual state of the master touchscreen task module of the present invention;

FIG. 7e is a flow chart of the display cursor subroutine of the master touchscreen task module of the present invention;

FIG. 7f is a flow chart of the print zone status subroutine of the security floor plans sub-menu of the master touchscreen task module of the present invention;

FIGS. 7g-7n form a flow chart of the security floor plan sub-menu of the master touchscreen task module of the present invention;

FIGS. 10a and 10g are graphics touchscreen representations of a portion of a touchscreen utilized by the instant system to schedule a day and month for operation of one of the user selectable functions;

FIG. 10b is a graphics touchscreen representation of a portion of a touchscreen utilized by the instant system showing a summary of the dates and times that have been selected using the graphics scheduling tools of FIGS. 10a, 10g, 10c and 10d;

FIG. 10c is a graphics touchscreen representation of a start clock which may be utilized to set the start time for a function selected by the user of the system;

FIG. 10d is a graphics touchscreen representation of a finish clock which may be utilized to set the stop time for a function selected by the user of the system; and FIGS. 10e and 10f are alternative graphics touchscreen representations of the start and finish clocks shown in FIGS. 10c-10d.

FIG. 11 is a flow chart showing the checktouch function of the master touchscreen task module of the present invention whose function is to compare the touchpoints of the user with the touch boxes or menu.

DETAILED DESCRIPTION OF THE PREFERRED EMBODIMENT

Figure 1:
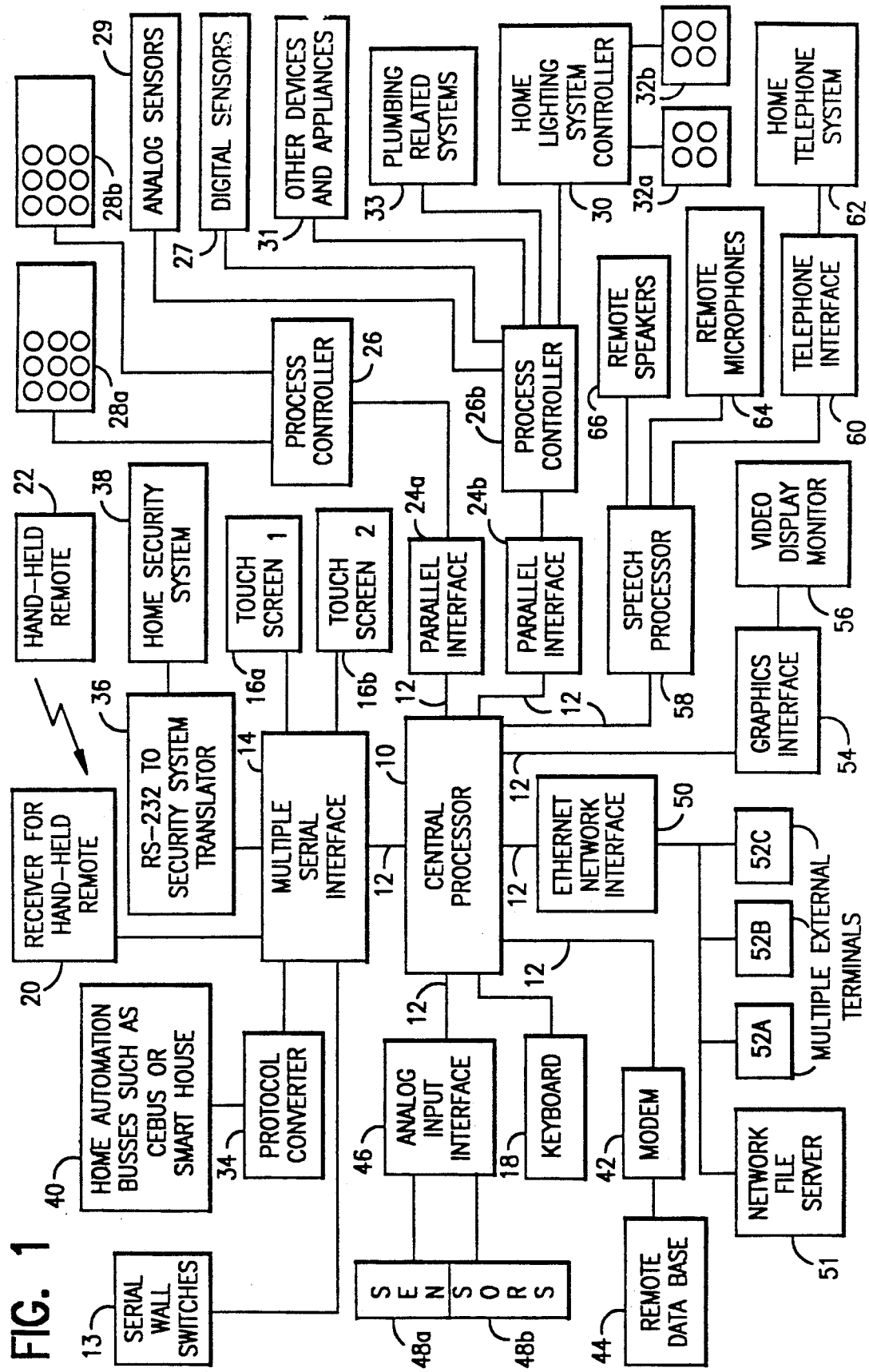
FIG. 1 is a schematic block diagram showing the apparatus of the present invention.

Referring now in detail now to the drawings wherein like parts are designated by like reference numerals throughout, there is illustrated in FIG. 1 a block diagram representation of the expandable home automation system of the present invention. As previously described, the instant expandable home automation system is built around an 80286-based microcomputer, such as an IBM AT class microcomputer, or compatible. Obviously, an 80386-based microcomputer or any computer equaling or exceeding the computing speed or processing power of an IBM AT class microcomputer may be used with the present invention. The microcomputer together with its random access memory (RAM), expanded RAM memory and associated hard disk drive and power supply is shown in FIG. 1 as the central processor 10. In the preferred embodiment, the central processor includes 3–4 megabytes of extended RAM and a hard disk having a storage capacity of approximately 20 megabytes.

The central processor 10 is connected, by means of an IBM AT data bus, or its equivalent, through a plurality of standard or custom interfaces to either control each of the subsystems automated within the home environment or to transmit or receive either data or instructions from within the home environment. For example, for control purposes, the central processor 10 is connected by means of the data bus 12 to a multiple serial interface 14 which in turn is connected to two touchscreens 16a and 16b. As will be described later herein, the user can instruct the home automation system, by means of the touchscreens 16a and 16b to carry out a particular task. Under those circumstances, the central processor receives the input from the appropriate touchscreen after it has been processed by the serial interface 14 and then processes the appropriate instructions to perform the selected task. As many touchscreens 16a and 16b as are desired can be distributed throughout the automated environment. In order to increase the number of touchscreens that may be used to control the automation system or to add additional devices requiring a serial interface, additional multiple serial interface cards may be added. The multiple serial interface 14 may preferably be a DigiBoard COM/8 serial interface, available from DigiBoard, Inc. of Saint Louis Park, Minn. The touchscreens 16a and 16b may preferably be Elographics Accutouch touchscreens, available from Elographics of Oak Ridge, Tenn.

In addition to controlling the instant automation system by means of one or more touchscreens 16a and 16b, the central processor may also be connected to a standard IBM AT or compatible computer keyboard 18. While such a keyboard may be utilized by the user, it will more likely be utilized by technical personnel during set up and maintenance procedures. A standard PC computer keyboard may also be effectively utilized.

A receiver for a hand-held remote control unit may also be connected to the serial interface 14 so that the user may be provided with a hand-held infrared, RF or other type of remote 22 for commanding the central processor to perform the various available tasks.

The central processor 10 may also be connected by means of the bus 12 to a first parallel interface 24a which may be utilized to both receive and to output direct digital signals. A wide variety of switch control devices may be connected through this parallel interface 24a, either directly, or through a process controller 26, to the switch control devices. A preferred example of the switch control devices is the LiteTouch 1000 lighting switch, available from LiteTouch of Salt Lake City, Utah. The switches 28a and 28b can each provide for the control of a plurality of devices, preferably nine, and are connected directly to the process controller 26a, which, for this example, may preferably be a protocol translator such as an opto-isolated buffer. Such a buffer is available from Industrial Computer Designs, Inc., of Westlake Village, Calif., as the AOISO-8 eight-channel output driver board. The parallel interface 24a may preferably be an ICD1018 multiple parallel port board, which is also from Industrial Computer Designs, Inc.

The central processor 10 may also be preferably connected to a second parallel interface 24b by means of the data bus 12. The parallel interface 24b communicates directly with a process control system 26b made up, for example, of a Metrabyte relay input/output board, such as the Model MEM-32 electromechanical relay board, an analog input board such as the MAI 16 A/D board, or a digital input/output board such as the MSSR-32 solid state relay module board, all available from Metrabyte Corp., of Taunton, Mass. The parallel interface 24b may preferably be a Metrabyte MDB-64 controller board.

Both the relay output board and the input/output board may be connected to the electrical appliances or devices 31 such as door locks, security gates, lawn lights, speakers, or any other switch-controlled device. The relay output and input/output boards may also be connected to the plumbing related systems 33 such as baths, showers, faucets, pools, spas, and fountains. The analog board may be connected directly to the analog sensors 29, which provide a voltage output indicating, for example, temperature, humidity, pressure, light level, distance, vibration, air quality, or any other useful parameter for automation purposes. The input/output board may also be connected to the digital sensors 27, such as security sensors, pressure mats, driveway sensors, status relays, or other digital indicator devices.

The security system 38 used in the automated environment, may preferably be a Silent Knight Model 4000 security system, available from Silent Knight, of Minneapolis, Minn. Such a home security system 38 is connected to an RS-232-to-security system translator 36 which is in turn connected to the central processor 10 by means of the serial interface 14 and a data bus 12. It can provide simultaneous RS-232 communications with eight separate external systems. When thus configured, the serial interface 14 can communicate directly with any external system, such as an Elographics touchscreen controller, or any other system that uses standard RS-232 protocols. If, as is the case in the preferred embodiment, the external device uses a nonstandard protocol, then an RS-232 protocol converter, such as element 36, can be used to convert between the RS-232 protocol and the protocol utilized by the device to be controlled. That same interface, as is shown as element 14 in FIG. 1, may also be used to connect the central processor 10 and its data bus 12 through a protocol converter 34, if necessary, to various home automation buses such as CEBUS and SMART HOUSE.

As will probably be clear to those of ordinary skill in the art, the design of the inventive expandable home automation system described herein allows for the use of interface boards that are designed to be directly compatible with the bus 12 of the central processor 10. Such interface boards may then be literally "plugged in" in order to provide control and communications with an external system. An example of the use of such directly compatible interface boards is the modem 42 which may be a Multitech Model 212 modem which is connected between the bus 12 of the central processor 10 and any external systems with which data communications may be established using a telephone line, such as a remote data base 44.

Another example of such a directly compatible interface board is the analog input interface 46, which provides an interconnection between the central processor 10, by means of its bus 12, with a plurality of analog sensors 48a and 48b. Such analog input interface 46 may preferably be a Microtech PC Didac 1, available from Microtech, of Longhorne, Pa. Examples of such analog sensors are those which monitor outside temperature, bath water temperature, etc.

It is also possible with the present inventive expandable home automation system design to connect to a completely external network such as Ethernet, by means of an Ethernet network interface board 50. Using such an interconnection, a wide variety of applications such as information retrieval and remote home automation control can be achieved, for example, utilizing multiple external terminals 52a, 52b, 52c or the network file server 51, connected to the Ethernet network interface 50, which is itself connected by means of the bus 12 to the central processor 10.

The central processor 10 may also be connected, by means of its bus 12, to a graphics interface 54, such as an EGA or VGA interface, which is in turn connected to a respective video display monitor 56 which provides the user with information regarding the operation of the home automation system.

Voice recognition circuitry may also be connected by means of the bus 12 to the central processor 10. A speech processor 58, such as, the Model TISPEECH available from Texas Instruments, Dallas, Tex., may be connected to one or more remote microphones 64, such as the Crown PZM microphone, available from Crown International, Inc., of Elkhart, Ind. Such remote microphones provide a means by which the user of the present expandable home automation system can communicate with the system by requesting tasks by voice. The home automation system may provide voice communications to the user by means of one or more remote speaker 66, which in turn are connected to the speech processor 58.

In addition, the central processor 10 of the instant home automation system may be connected to a home telephone system 62, such as the Panasonic KX-T61610 key system, or a single line standard telephone system, by means of a telephone interface 60. Such telephone interface may preferably be a Model TISPEECH Phone Interface available from Texas Instruments.

The home automation system, schematically shown in FIG. 1, achieves an unlimited expandability and compatibility by using multiple readily available (in most instances) subsystems that can be added without limit. That function is achieved by the use of multiple flexible standard interfaces for controlling and communicating with a variety of external devices and subsystems as well as translating modules which are used to communicate with and control systems which use nonstandard communication links. A more detailed description of the hardware implementation of the present expandable home automation system follows.

TOUCHSCREENS

The present invention utilizes a high resolution color graphics touchscreen to control certain specific features of the instant expandable home automation system. While at least two other home automation systems that utilize touchscreen control are presently known, such systems utilize either character-based graphics systems, low resolution color graphics systems, or monochrome graphics systems. Such systems attempt to minimize the cost of the system while at the same time maximizing display speed. Such graphics systems cost less per display screen by minimizing the use of color or by using graphics characters instead of full high resolution graphics screens.

While such method of display may be efficient for some limited home automation systems, it is only operable under circumstances where there are only minimal commands that can be given through such a graphics display. Where the automation system is more capable, it is useful for the touchscreen displays to convey more information as well as to effectively highlight touch sensitive areas on the touchscreen.

The present invention incorporates both the hardware and software necessary to provide screen resolution ranging from $640 \times 350$ pixels up to $1024 \times 768$ pixels with from 16 to 256 colors. Thus, depending upon the desired application and type of screen desired to be displayed, the touchscreen display can be provided with as much resolution and color as necessary. Such display flexibility allows the present home automation system to incorporate powerful graphics features for ease-ofuse, such as icons, pop-up windows, color-coding, direct manipulation and detailed floor plans.

It also allows the use of a wide range of colors in order to enhance the aesthetic appearance of the touchscreen displays and in order to color coordinate them with the surroundings in a home, commercial or other environment. Furthermore, as additional features not presently available become available on newer versions of graphics cards, such as animation and video mixing, the standard bus structure of the present invention will allow those features to be readily and easily added to the home automation system.

The preferred embodiment of the present invention incorporates as the graphics interface 54 the ATI VIP graphics hardware, available from ATI Technologies of Ontario, Canada. Under control of the system software, to be later described, this hardware can dynamically display graphic screens under either the EGA standard (640×350 pixels×16 of 64 possible colors) or the VGA standard (640×480 pixels×256 of 262,144 possible colors).

The present home automation system is also hardware compatible with many other readily available graphics boards which offer extended capabilities. For example, by incorporating a different graphics card and making minor modifications to the home automation system software, the present system can provide graphics up to 1024×768 pixels. Another readily available card offers compatibility with the standard NTSC video format used in United States television sets. The system may also include high performance graphics display processor cards for advanced graphics effects including animation.

Using the high resolution graphics discussed above in concert with high resolution touchscreens, many functions in a home or other environment can be controlled. For example, audio/video entertainment systems can be actuated and caused to perform all of the functions available by use of their respective remote controls. This feature is accomplished by means of an infrared emitter device which is utilized, under control of the central processor 10, to input to the audio/video device being controlled the appropriate code for controlling the desired function. Alternatively, a direct serial link or other electronic interface could also be used to control the audio/video device. For example, the present home automation system can, utilizing a touchscreen, energize a connected standard television receiver and control the volume, select the channel, select the stereo or mono mode, and, as described, control any function which can be controlled using that television receiver's remote control.

Audio entertainment equipment, such as remotely controllable receivers, amplifiers, turntables, cassette players and compact disk players, as well as video cassette recorders, can be controlled in the same manner. For example, a certain selection or series of selections can be made, using the touchscreen, for a compact disk. An AM or FM station can also be selected from the touchscreen menu. In addition, the user can use any touchscreen to distribute audio or video signals to any one or more high fidelity speakers or monitors contained in the home or other environment.

The instant home automation system also utilizes video monitoring cameras so that, for example, the user can elect to view the signal from such cameras on selected video monitors throughout the house.

Other functions which can be performed by the home automation system involve the filling of baths, pools and spas and the maintenance of a desired temperature in those facilities, as well as the control of any pumps associated with those facilities. The home automation system can also control individual devices and appliances such as kitchen appliances, exhaust fans, humidifiers, and dehumidifiers. It can control motorized devices such as skylights, draperies, furniture, walls, screens, ceilings, awnings, physical security barriers, door locks, and others. The home automation system can also control answering machines, voice mail systems, and provide maintenance reminders. Of course, all of these control functions can be extended to similar short term residential applications, such as boats, aircraft, office suites, conference rooms, auditoriums, classrooms, theaters, hotels, hospitals, and retirement homes. They also offer immediate application to the infirm or disabled population.

Still other systems which may be controlled by the disclosed touchscreen are sophisticated security systems with more than 32 zones, ice and snow removal by energizing, for example, heaters built into sidewalks and driveways when precipitation is detected and the outside temperature drops below a certain predetermined temperature, the opening of locked doors, the initiating of telephone calls and the logging of incoming and outgoing telephone calls. Information retrieval can also be accomplished utilizing the instant touchscreen as well as lighting moods throughout a home by which, under touchscreen command, certain predetermined settings for lights throughout the home can be readily set.

In fact, any system in a home or other environment that can be automated can be effectively automated utilizing the high resolution graphics displays described herein in concert with high resolution touchscreens. Such systems, in addition to those described above, would include telephone answering, controlling fountains or in-ground sprinkler systems, controlling kitchen and other appliances, controlling motorized drapes, windows and skylights and the scheduling of many of these functions and those functions previously described. In addition, local information display, such as time, temperature, etc., can readily be accomplished utilizing the instant touchscreens.

VOICE RECOGNITION CIRCUITRY

The use of voice recognition is an ideal user interface device for a home automation system because it allows the user to control functions in the home simply by speaking. Voice recognition is also useful in certain commercial environments. The use of the high resolution graphics display together with voice recognition allows the present home automation system to provide high quality visual cues to the user of the present control options, feedback of whether the user's command phrase has been recognized and the results produced for the user as the result of a commanded function.

One of the difficulties with the use of voice recognition in home and other environments is that such systems must perform under at least low level background noise and must be able to extract key words or phrases out of a speech or general noise background. The inventive expandable home automation system meets these performance specifications by the use of certain hardware, together with software to enhance the performance of the voice recognition functions in the home environment, as well a high resolution graphics display system.

The implementation of the voice recognition system described herein may be accomplished by means of the central processor 10 and its interconnection along bus 12 to a speech processor 58 which in turn is connected to a remote microphone 64 and a remote speaker 66. The central processor 10 may be, for example, an AT compatible 80286 based microcomputer, Model CAT-902 from Diversified Technology, of Jackson, Miss. and a Model CHI 626B AT-compatible passive backplane system bus, also available from Diversified Technology. As previously discussed, a hard disk storage device is connected to the microcomputer for permanent storage of trained recognition vocabularies. In addition, an extended RAM memory, as previously described, is also provided for connection to the microcomputer to provide rapid loading of new vocabulary data.

The speech processor 58 may preferably be embodied in the present system by one or more Texas Instruments TISPEECH speech processing boards for IBM and compatible personal computers. The system software is available from Texas Instruments as Model TISPEECH, which performs the basic voice recognition, vocabulary loading, and microphone control functions.

Each TISPEECH board is connected to a single crown PZM microphone for voice pickup, shown as remote microphone 64.

In order to effectively utilize the voice recognition system of the present invention, a graphics interface 54, which may be a Model VIP VGA video graphics display generator, available from ATI Technologies, is connected directly to the central processor 10 by means of the bus 12. The graphics display interface 54 is used to drive a video display monitor 56, which may preferably a Mitsubishi AUM-1381A high resolution color graphics display monitor. A separate video graphics display generator and high resolution color graphics display monitor are provided at each voice recognition area in the home, together with a separate microphone and speaker to effectuate control and aural feedback. Also, as described later herein, a portion of the software which operates the central processor 10 is dedicated to optimizing the voice recognition parameters of the speech processor 58 in order to maximize performance in a home automation or other environment.

Using such a system, the user's voice can be utilized in the present home automation system to provide either immediate or scheduled control of complete living moods, which are comprised of macros of multiple commands, audio/video entertainment system control, such as selection of the desired audio or video source, selection of the source parameters, such as channel selection, play, fast forward, rewind, volume, base, treble, balance control, etc., as well as the audio distribution network, for example, selecting which set of speakers the audio or video system will send its output to, as well as providing a muting function for each of those sets of speakers. In addition, the system can also both control and switch between a plurality of security video cameras, including panning, tilting, zooming of such security cameras. Finally, the voice recognition functions of the present home automation system can be utilized to control a complex home security system 38 having over 32 zones, which is connected to the central processor 10.

When the voice recognition functions of the present home automation system are utilized in concert with the high resolution color graphics display 56, immediate or scheduled control of many home automation features can be accomplished. Such features include direct control of the lighting within the home, or, if preferred, controlling the lighting mood (i.e. choosing from one of a predetermined number of preset lighting levels) either in one room or throughout many rooms of a home. Such a system can select complete living moods, which consists of macros of multiple commands, for various lighting, temperature, open or closed draperies, skylight settings, and entertainment system settings that have been predetermined and stored as data files.

The voice recognition system, in connection with the high resolution color graphic display 56, can also provide home appliance control as well as security system control for components connected to the central processor 10, as has been previously described. In addition, the audio/video entertainment system controls and audio distribution network described above in connection with the use of only a voice recognition system can obviously be controlled with the both the high resolution color graphics display and voice recognition systems.

Additional functions which can be controlled with the combination of voice recognition and high resolution color graphics displays are the security camera switching and control, security camera function and the complex security system 38, as previously described above. Also, local and remote information retrieval, such as time and weather and access to various remote data bases can be achieved using the voice recognition and high resolution color graphics display combination. Control of the locks for various doors of the home as well as bath and spa controls, for example, to run the bath, set the temperature and turn on any pumps or motors, as previously described, can also be achieved by the use of the voice recognition system and high resolution color graphics display system combination. In addition, the telephone system can also be controlled by that combination.

MULTIPLE TYPES OF USER INPUT DEVICES

The present home automation system, as has been previously described, by means of its extended bus and ability to interface with a wide variety of devices, can support any user device that can be controlled serially, controlled with a parallel port, or with a custom interface compatible with the standard AT bus used by the inventive home automation system. Since both the bus and number of serial or parallel ports can be increased as desired, the number of interface devices and thus the number of devices in the home environment or commercial environment that can be controlled can also be increased as desired. That allows the disclosed home automation system to be configured to meet the exact needs of each home owner or business user. The system can thus be tailored to the layout of the environment to be controlled. For example, a touchscreen display can be provided in the kitchen, a touch switch with nine buttons can be placed near the exterior doors, voice recognition can be installed in the master bedroom and any inside telephone can be used to control the system.

It should also be remembered that an important aspect of the present invention is the commonality of use between input devices. For example, both the computer keyboard 18 and the voice recognition system use the touchscreen displays for cues and visual feedback. Wall-mounted telephone touch-tone buttons can be used to control a subset of the touchscreen commands. In addition, although not shown specifically in FIG. 1, other user interfaces may be added to the home automation system, such as track balls, mice, joy sticks, light pens and other cursor control devices. In addition, while a hand-held remote control unit is presently used, wireless versions of any of the present interfaces shown in FIG. 1, such as wireless portable touchscreens and wireless microphones or radios for remote voice recognition, may also be used. Voice recognition may also be used over the telephone when that technology becomes available.

In order to implement the use of multiple types of user devices in a modular manner which allow for different types of devices in different parts of the home to be used to control the home automation system described herein, the following equipment may be simultaneously connected to the home automation system central processor: (1) a standard PC computer keyboard 18; (2) plurality of dry contact switches 28a and 28b may be connected to the central processor 10 by means of a solid state input module and a pull up resistor to a Metrabyte MSSR-32 solid state relay board which is shown as process controller 26b, which is in turn connected to the parallel interface 24b, which may be an MDB-64 parallel controller connected to the AT bus 12 of the central processor 10; (3) multiple Elographics Accutouch touchscreens 16a and 16b connected serially to the central processor 10 by means of the Digicom COM/8 multiport serial interface 14; (4) a plurality of hand-held remote receivers 20 may be serially connected to the central processor 10 by means of the serial interface 14; (5) a telephone system 62 with a plurality of hand sets, or a single line standard telephone system may be connected to the central processor 10 through a telephone interface 60 and the speech processor 58 and the AT bus 12; (6) multiple voice recognition locations may be connected to the central processor 10 through Crown PZM microphones or other remote microphone systems 64 which are in turn connected to respective TISPEECH speech processors 58 running standard voice recognition software which themselves are connected by the AT bus 12 to the central processor 10; and (7) multiple voice response locations with remote speakers 66 which provide spoken information and instructional cues to the user. All of the foregoing equipment is simultaneously connected to the central processor 10 and may be used to perform a plurality of functions.

TOUCH OR CURSOR-CONTROLLED GRAPHICS DISPLAY

One of the most important functions of a home automation system is the scheduling of actions in the home environment to be performed automatically by the system at a future date and time. The home automation system described herein incorporates dynamic, object-oriented, touch or cursor-controlled graphics displays for effectuating these scheduling functions.

One way in which the scheduling functions are accomplished is through the use of a dynamic graphics representation of clock faces, either 12 or 2 hour, calendar pages, either weekly, monthly or annually, time lines, or other pictorial representations of day, date and/or time as a data input/output display for entering and reviewing schedules in a home automation system. A touchscreen 16a or 16b or other cursor control device, is used to move the hands on the clock, select a day on the calendar, move an "on-flag" to a point on a time line, or otherwise select, in a dynamic, graphics manner, a date or time to schedule a home automation function. This type of system can also be utilized with other stand-alone systems such as lighting systems, entertainment systems, security systems, energy management systems and others.

Functions that can be scheduled in this manner include turning a light or appliance on or off, watering the lawn, turning on different lighting moods at different times of the day, turning on audio music or a television station, VCR recording of television programs, operating modes or features of the home automation system itself, operating modes of a security system, electric locks, reminders for the system user, operating modes of a telephone system and automatic information retrieval. As will be described further herein, the same types of displays may be used directly to control entertainment systems by working with a graphics representation of the entertainment system and its distributed speakers and sources. The user controls the system by selecting his audio or video source from a graphics display and then selecting the rooms in which he would like the audio and video played.

Figures 10E, 10F, 10G:
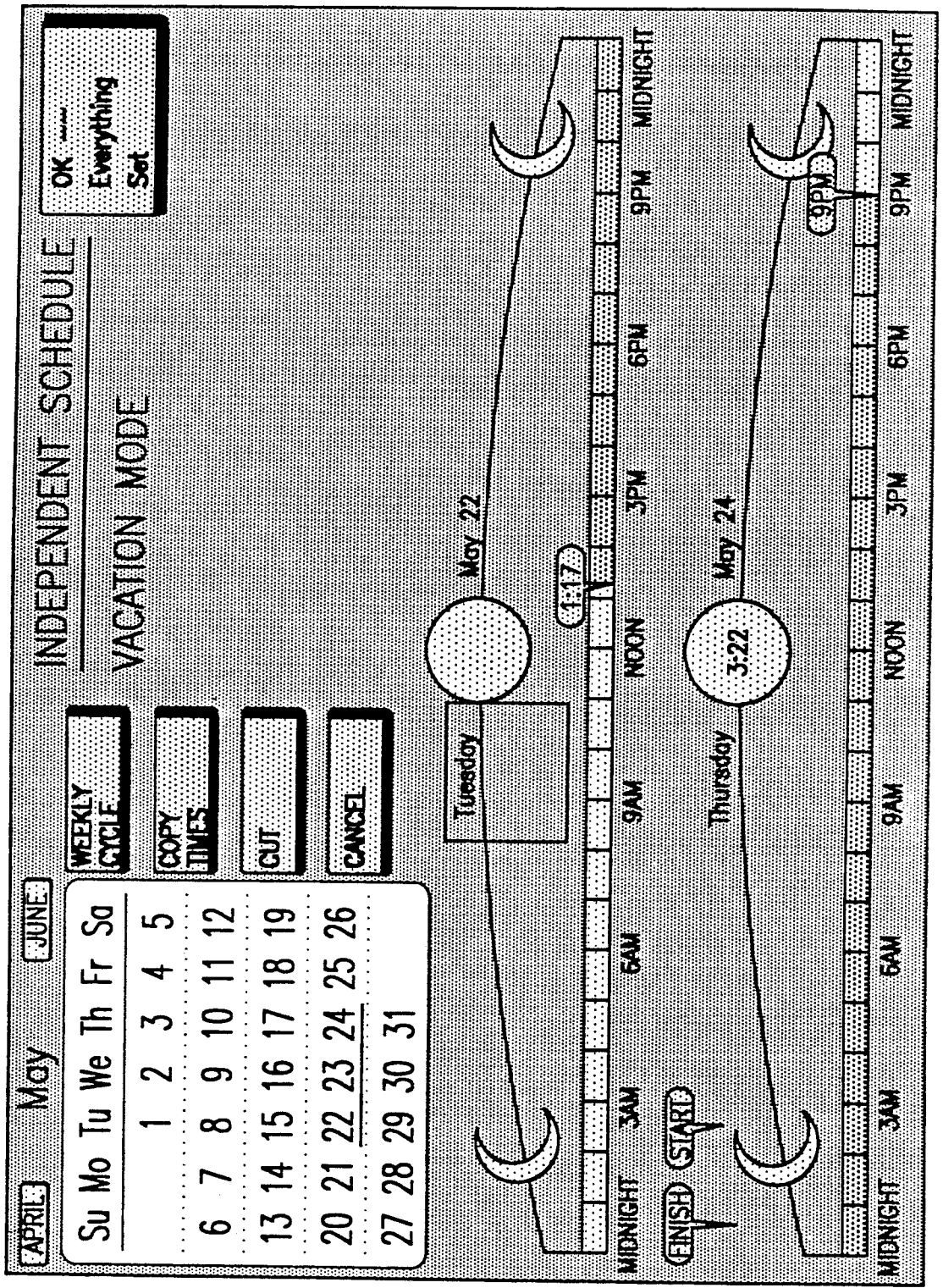

This particular feature of the inventive home automation system is implemented primarily as a software function of the instructions run by the central processor 10. It is communicated to and receives instructions from the user by implementation on the high resolution color graphics display monitor 56. First, a background screen is displayed on the monitor 56 with the appropriate graphical representation of the scheduling system, for example, a monthly calendar page as shown in FIGS. 10a or 10g, a start clock as shown in FIG. 10c and a finish clock as shown in FIG. 10d. Using a touchscreen 16 or other cursor control device such as a mouse or light pen, the user can dynamically select and/or move graphics elements to indicate a date and time to start and stop any action the home automation system is capable of performing.

One way in which this feature may be implemented, using the display shown in FIG. 10a, is as follows. The user first touches a date on the calendar shown in FIG. 10a. A colored box is drawn around the date to highlight it. Next, the user touches the hands of the start and finish clocks to drag them to the desired start and stop times. Finally, the user touches the "OK" box to confirm and activate the scheduled event.

Figure 3A:
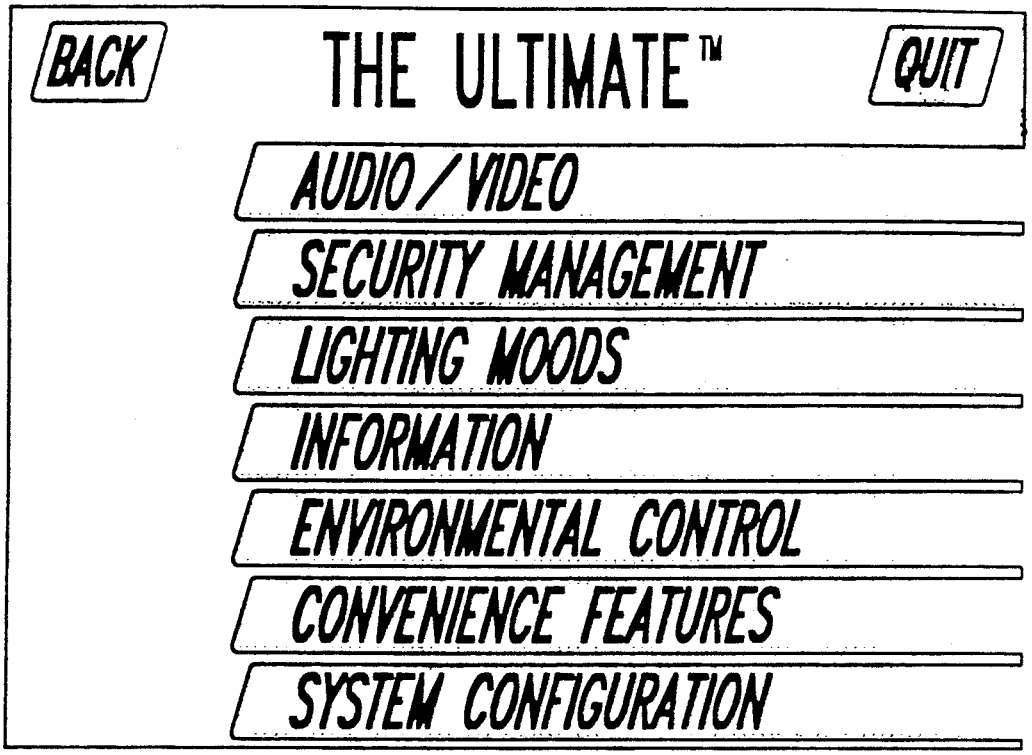
FIG. 3a shows the main menu touchscreen display used with the present invention.
Figure 3B:
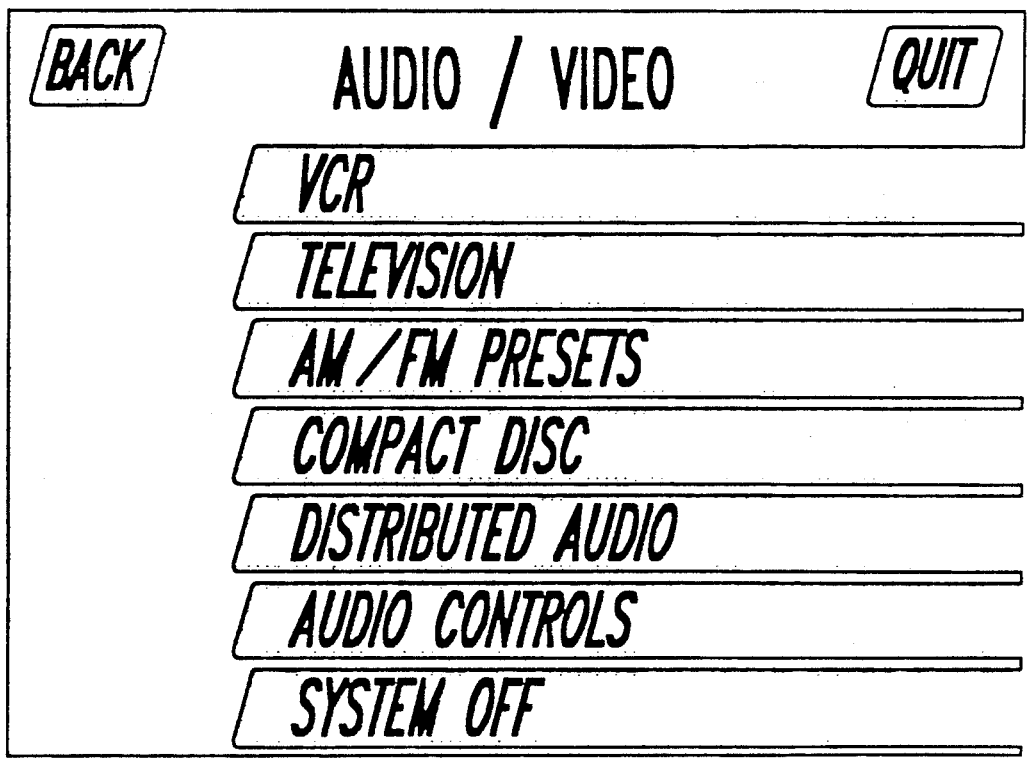
FIG. 3b shows an audio/video sub-menu touchscreen display which may be utilized with the present invention.
Figure 3C:
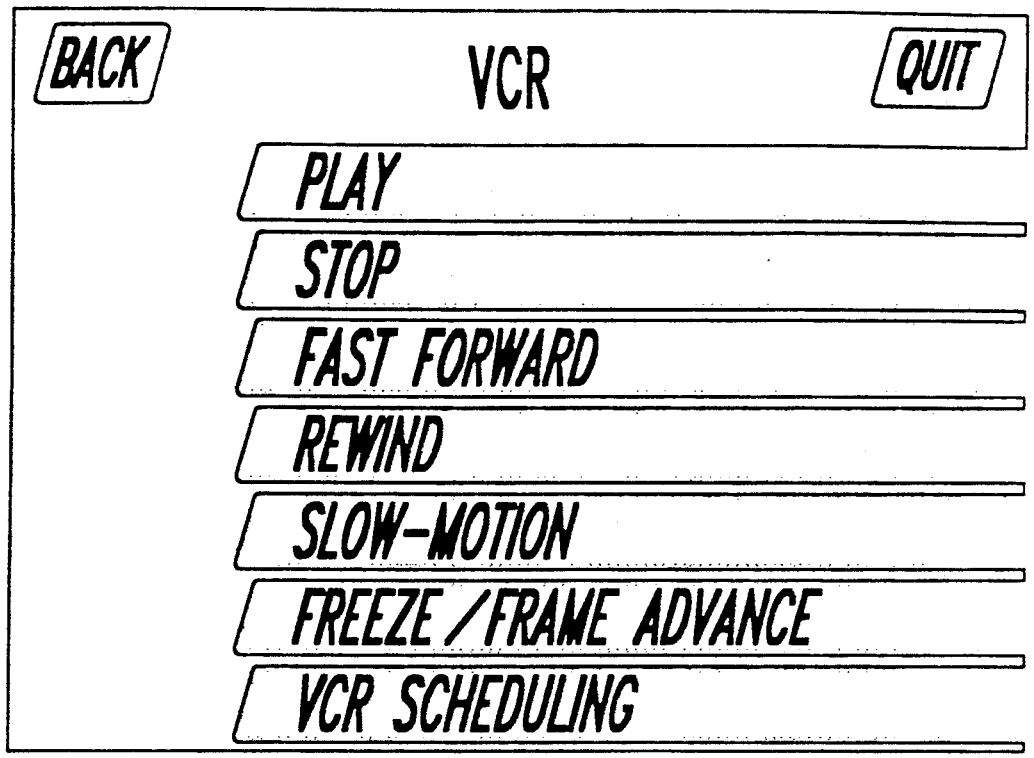
FIG. 3c shows a VCR sub-menu touchscreen display which may be utilized with the present invention.
Figure 3D:
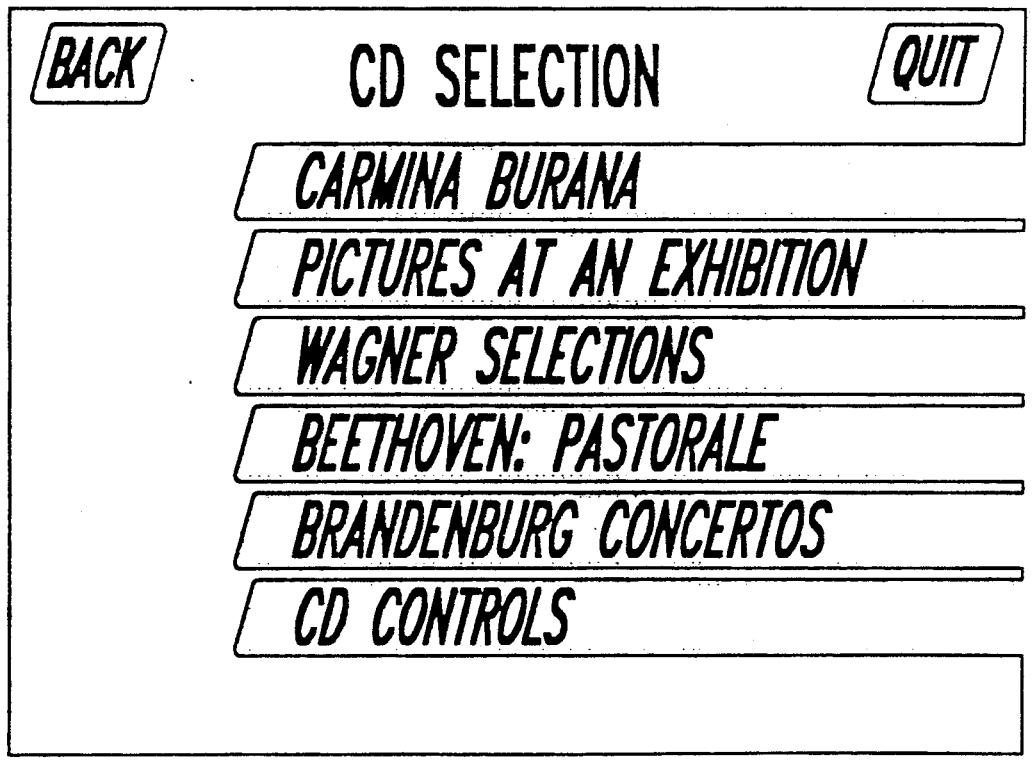
FIG. 3d shows a CD selection sub-menu touchscreen display which may be utilized, with the present invention.
Figure 3E:
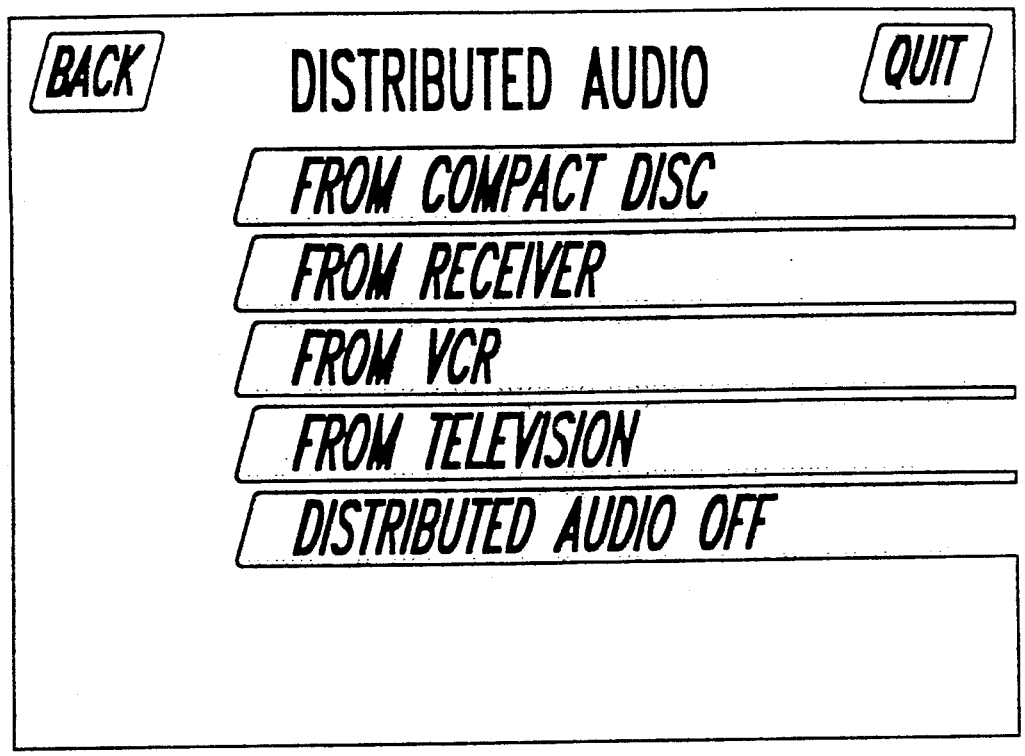
FIG. 3e shows a distributed audio sub-menu touchscreen display which may be used with the present invention.
Figure 3F:
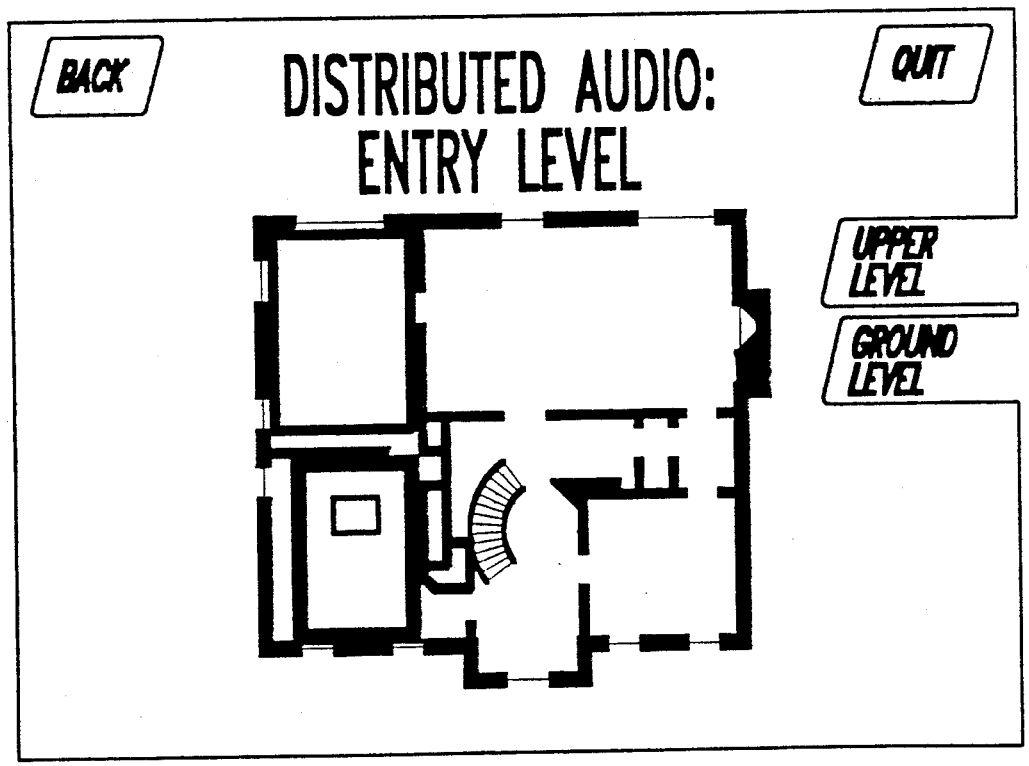
FIG. 3f shows a distributed audio location sub-menu touchscreen display which may be used with the present invention
Figure 3G:
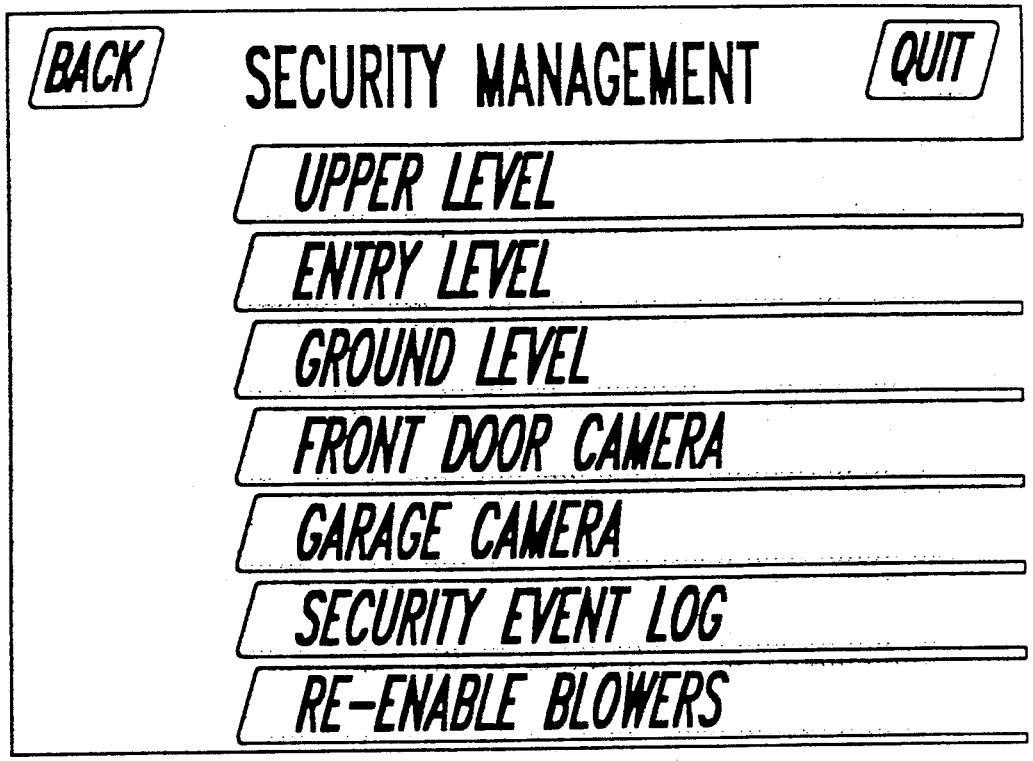
FIG. 3g shows a security management sub-menu touchscreen display which may be used with the present invention.
Figure 3H:
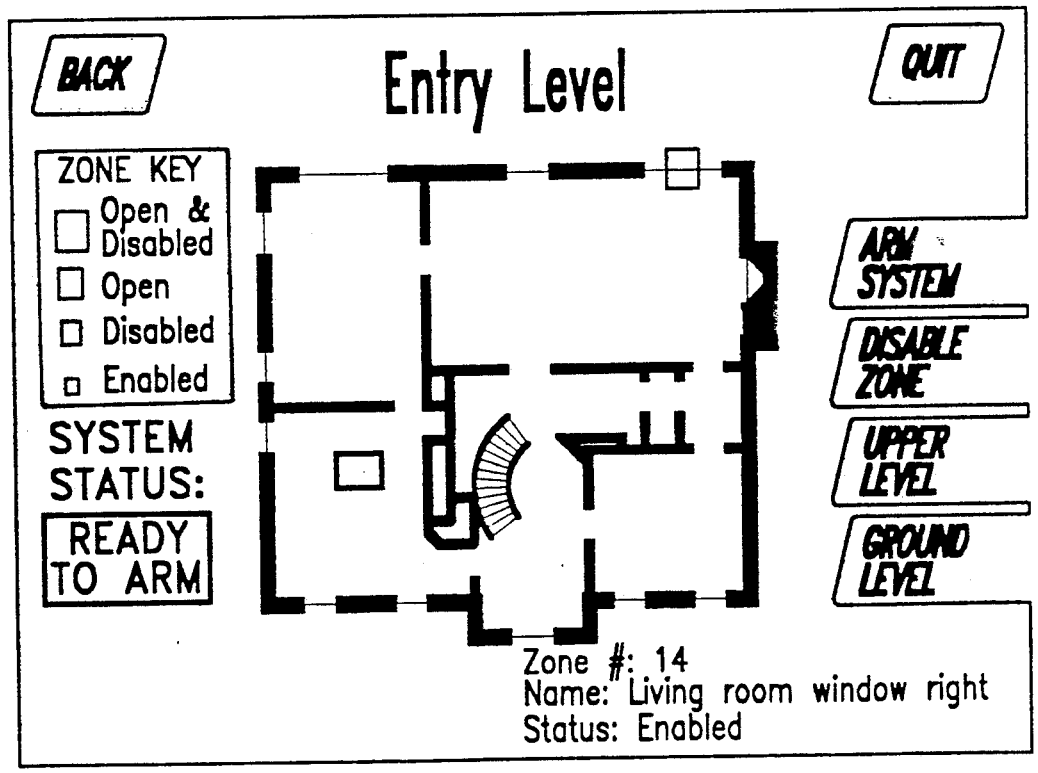
FIG. 3h shows a first state of the entry level floor plan sub-menu touchscreen display which is accessed as a function of the security management sub-menu of FIG. 3g.
Figures 3I, 3J:
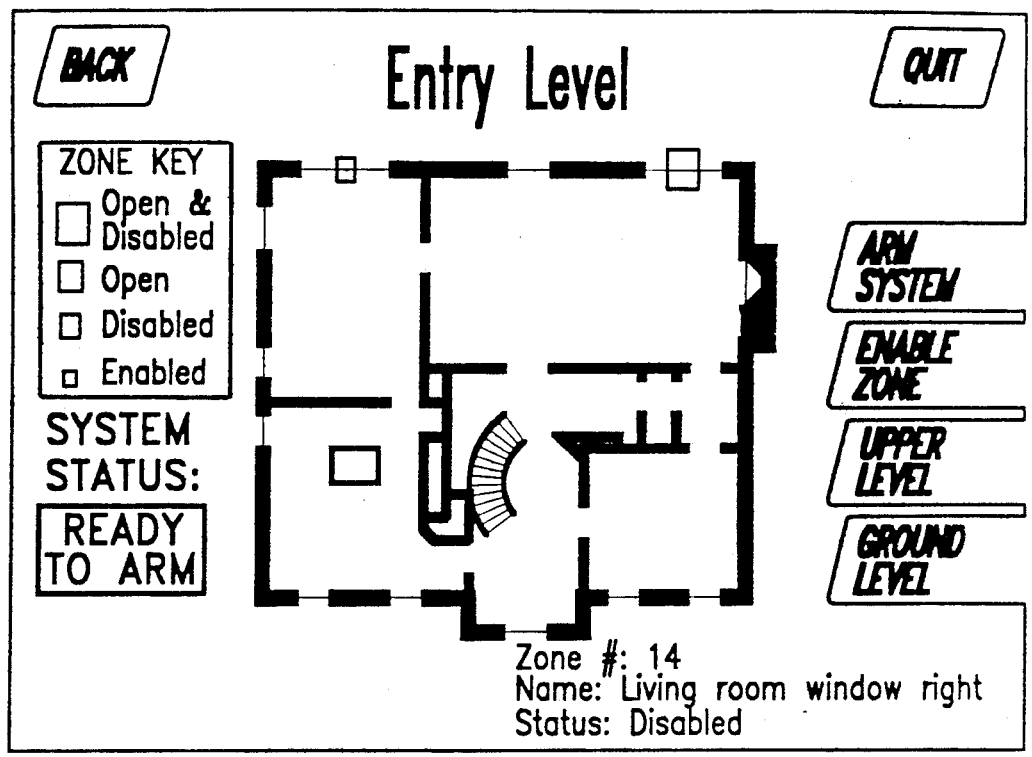
FIG. 3i shows a second state of entry level floor plan sub-menu touchscreen display of the entry level which is accessed as a function of the security management display screen of FIG. 3g.
FIG. 3j is a sub-menu touchscreen display of a pass code keypad which is utilized by the user to enter a password into the system of the present invention.
Figure 3K:
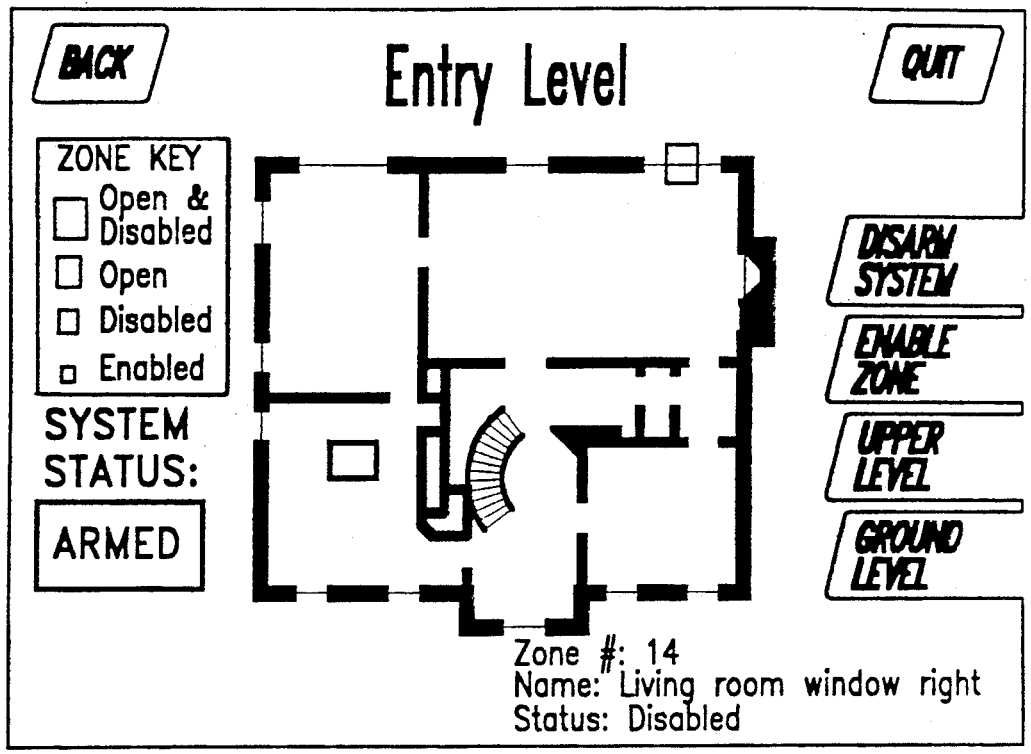
FIG. 3k shows a third state of an entry level floor plan sub-menu touchscreen display of the entry level which is accessed as a function of the security management display screen of FIG. 3g.
Figure 3L:
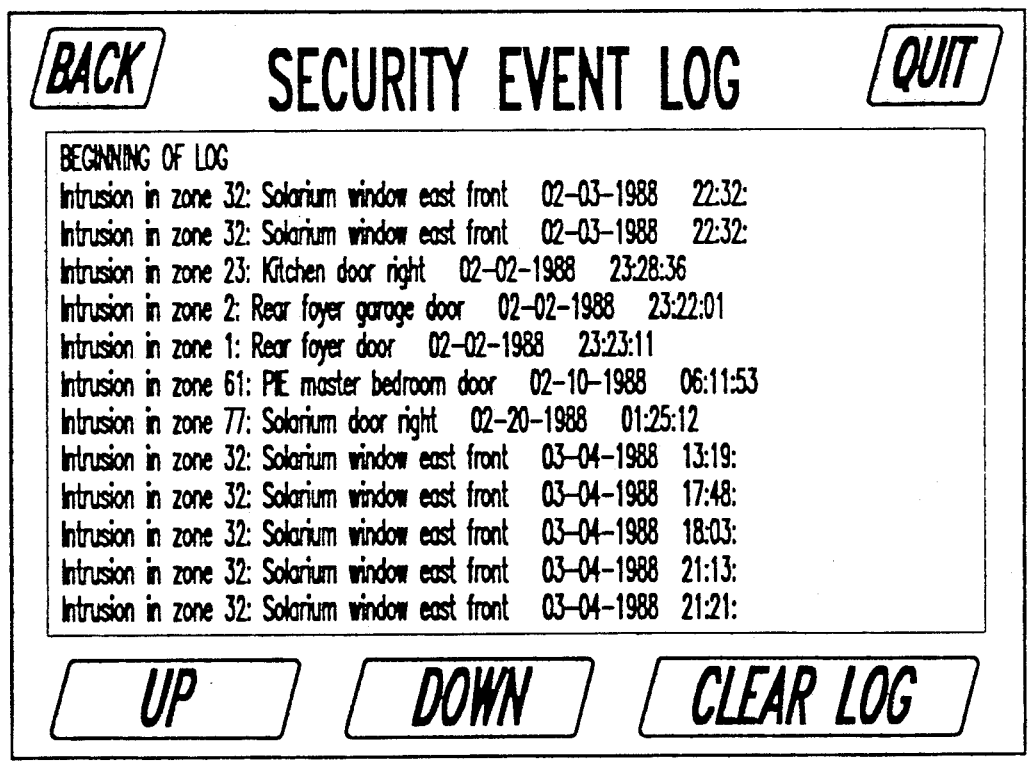
FIG. 3l shows the security event log display screen of the security event log function of the security management display screen of FIG. 3g.
Figure 3M:
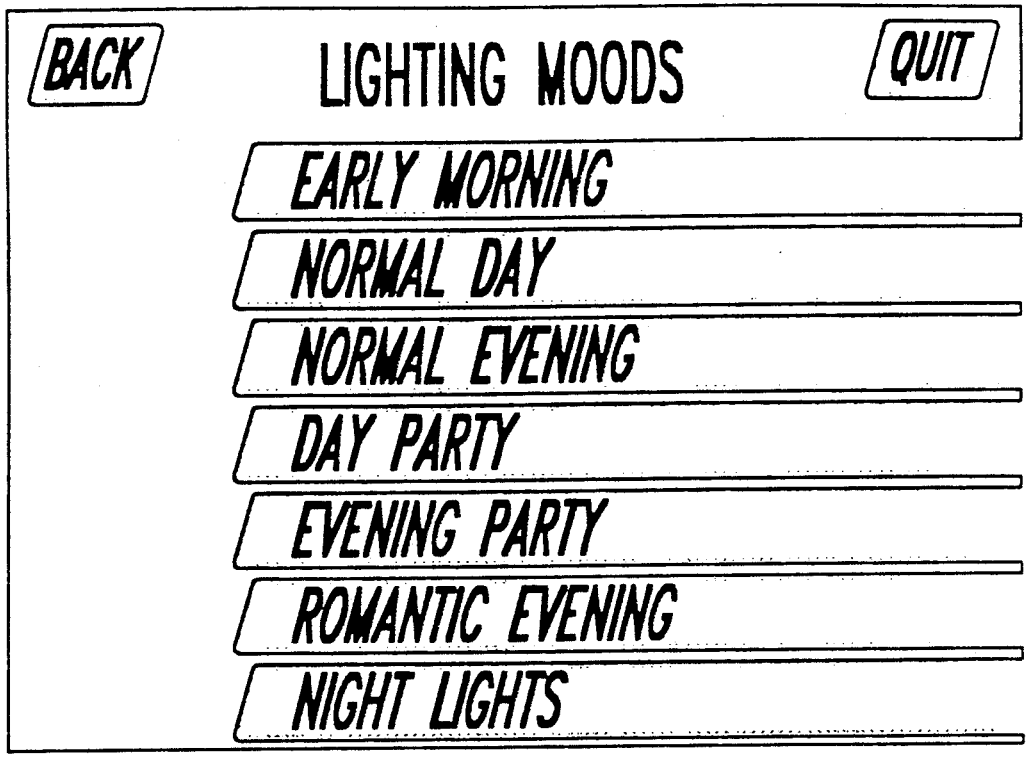
FIG. 3m shows the lighting moods sub-menu touchscreen display which may be used with the present invention.
Figure 3N:
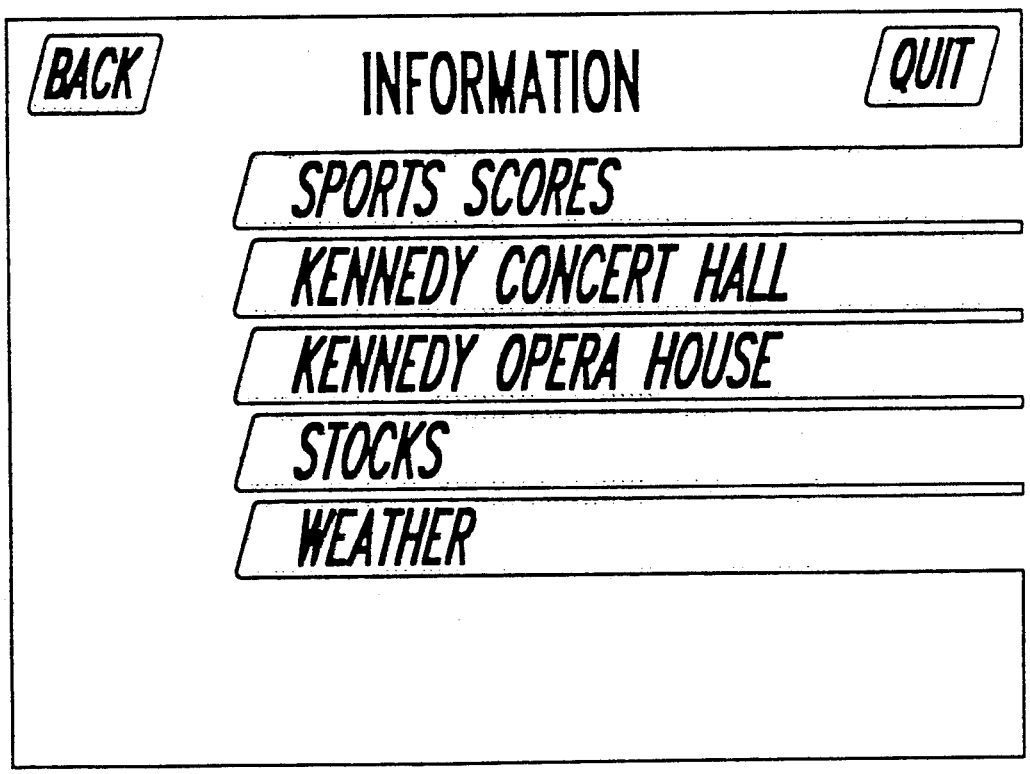
FIG. 3n shows the information sub-menu touchscreen display which may be used with the present invention.

Examples of the graphics screens through which the user of the instant home automation system may control the functions of the system are shown in FIGS. 3a–3n. FIG. 3a shows a preferred embodiment of the main menu screen which provides a plurality of different functions which may be called from the main menu. Such functions include control of the audio and video functions of the home automation system, security management functions, lighting moods, information, such as retrieval from remote data bases, environmental control, such as temperatures throughout the home etc., convenience features such as calling for a bath to be drawn and a certain temperature to be maintained and the system configuration functions.

FIG. 3b shows the first sub-menu which appears on the touchscreen when the audio/video function box is selected. When the user places his finger inside the appropriate box, the system determines which function has been selected, highlights that function box by, for example, changing the color of the box, and then displays the first (and sometimes only) sub-menu associated with that function. As shown in each of the FIGS. 3a through 3n, each of the touchscreens also contains two feature boxes in common, namely the Back and Quit function boxes. The back function box, as the name implies, functions to take the user back to the previous touchscreen display. The quit function box, on the other hand, functions to end a session of using the touchscreen and return the system to a dormant mode which may also display a custom introductory graphics screen or simply a blank screen which, when touched, will again cause the system to display the main menu screen.

The audio/video touchscreen sub-menu shown in FIG. 3b presents the user with the various functions which can be controlled by the present home automation system as disclosed herein. The system can control a VCR, a television, select certain AM or FM presets on a receiver, control a compact disk, distribute audio throughout the home, be used to operate the volume, tone and other controls associated with the audio and video equipment controlled from the audio/video touchscreen, and turn the audio/video system off. Obviously, additional similar pieces of equipment and functions may likewise be controlled.

FIG. 3c shows the VCR sub-menu touchscreen which is displayed if the VCR function is selected from the audio/video touchscreen shown in FIG. 3b. All of the functions which can be remotely controlled on a VCR, in addition to scheduling the VCR, can be controlled from the VCR touchscreen of FIG. 3c, although only seven frequently used functions are displayed in FIG. 3c. Thus, using FIG. 3c, the user can cause the VCR to play, to stop, to operate in the fast forward mode, the rewind mode, the slow-motion mode, the freeze/frame advance mode or the user can schedule the VCR to operate and record at a predetermined time. By selecting the VCR scheduling function, the scheduling screens shown in FIGS. 10a through 10d would appear on the touchscreen for the user to schedule the VCR event.

FIG. 3d shows the CD selection sub-menu touchscreen option which may be selected from the sub-menu touchscreen of FIG. 3b. Each of the selections which are currently available for play by the CD player are shown in the menu for selection by the user, as well as the CD controls function. The CD controls function allows the user to control the compact disk player using the touchscreens of the home automation system.

FIG. 3e shows yet another sub-menu touchscreen which can be accessed from the audio/video sub-menu touchscreen of FIG. 3b. The touchscreen shown in FIG. 3e allows the user to select an audio source which may then be distributed, selectively, throughout the home through high fidelity speakers placed strategically in different zones throughout the home. The selections include the output from the compact disk, from a stereo receiver, from the VCR, from a television and also a function to turn the distributed audio off.

FIG. 3f shows a distributed audio sub-menu touchscreen, which is displayed after an audio source is selected in FIG. 3e or after an intervening menu for a large house offers floor selections, and allows the user, by touching the appropriate portions of the particular level of the house shown as a floor plan on the touchscreen, to cause the audio output from the selected source from the touchscreen menu of FIG. 3e to be played through the speakers present in the particular rooms selected by the user. The touchscreen menu of FIG. 3f also provides two function boxes, marked as upper level and ground level, so that the other levels of the home can be selected to be shown on the screen. In that manner, the desired rooms on all floors of the home may be included to play the output from the audio source chosen by the user. Obviously, other graphics designs are possible.

FIG. 3g shows the security management sub-menu touchscreen, which is accessed from the main menu touchscreen of FIG. 3a. In addition to selecting one of the plurality of levels of the home as a function, which would then display, for example, the entry level sub-menu touchscreen of FIG. 3h, the user may also select to view the output of video cameras distributed outside or throughout the home, for example, a video camera at the front door or in the garage. The video output from those cameras is displayed on the monitor to which the touchscreen is attached. It replaces the security management sub-menu with the exception of the back and quit function boxes.

From the touchscreen shown in FIG. 3g, a security event log function may also be selected, the screen of which is shown in FIG. 3l. Also, the air conditioning or heating blowers may be reenabled by the user after they have been automatically shut down by the automation system as the result of a smoke or fire detection by the security system.

FIGS. 3h and 3i show the sub-menu touchscreens which appear when the entry level function is selected from the security management sub-menu touchscreen FIG. 3g. Referring first to FIG. 3h, it can be seen that the screen is dominated by a floor plan schematic of the entry level section of the home. By touching the appropriate secured zone, the user can arm the security system, or disable a particular zone, depending upon the current state of the security system and the selected zone. As shown in FIG. 3h, the user has touched the zone 14 which is the right living room window. The status information at the bottom of the screen, under the zone and name of the zone information, indicates that the zone is currently enabled. The system status information to the left of the floor layout indicates that the system is ready to arm. In a block above the system status information, a zone key is provided.

The sub-menu touchscreen shown in FIG. 3i is similar to the touchscreen shown in FIG. 3h, with the exception that the status of zone 14 is now disabled. Thus, the function box provided on the right hand portion of the screen is one which would allow that zone to be enabled, instead of allowing the zone to be disabled, as shown in FIG. 3h. In the upper left hand corner of the floor layout of FIG. 3i, it can be seen that the user has also disabled another window. Thus, the screen graphically shows the present status of all security zones on the system. In order to arm the security system, the user touches the "ARM SYSTEM" box on FIG. 3i and the touchscreen of FIG. 3j appears.

FIG. 3j shows the touchscreen keypad which may be utilized by the user to enter a password or pass code. A password is used by the system in order to prevent unauthorized control of certain functions, for example, the security function of the instant home automation system. After the user has entered his security pass code, the screen of FIG. 3k appears.

FIG. 3k shows a sub-menu touchscreen similar to that shown in FIGS. 3i and 3h, except that the status of the security system is now armed. Thus, in the lower left portion of the screen, the status "armed" is shown in place of the "disarmed" status shown in FIGS. 3*i* and 3*h*.

FIG. 3*l* shows the security event log sub-menu touchscreen which can be reached from the security submenu touchscreen of FIG. 3*g*. The touchscreen shown in FIG. 3*l* provides the usual back and quit functions and, in addition, provides for scroll up, scroll down and clear log functions. In the center of the screen, data is shown relating to prior intrusions in each of the zones.

FIG. 3*m* shows the lighting mood sub-menu touchscreen which is reached from the main menu touchscreen 3*a*. Each of the available functions, namely early morning, normal day, normal evening, day party, evening party, romantic evening and night lights set predetermined lights within the home to predetermined settings which are stored as data files on the hard disk of the home automation system and are called up merely by the user touching the appropriate function box on the lighting mood submenu touchscreen.

FIG. 3*n* shows the information sub-menu touchscreen which may be accessed directly from the main menu touchscreen shown in FIG. 3*a*. The available functions cause the telephone system in the home to dial a telephone number stored in a data file which accesses a remote data base. Once the data base is reached, the information, for example, in the case of weather information, is disseminated to the user either through spoken report by means of the high fidelity speakers placed adjacent to the touchscreen currently in use, or through a high resolution graphics display created from digital data received from the remote data base. Thus, the data can be presented in either audio or visual format.

Figure 9:
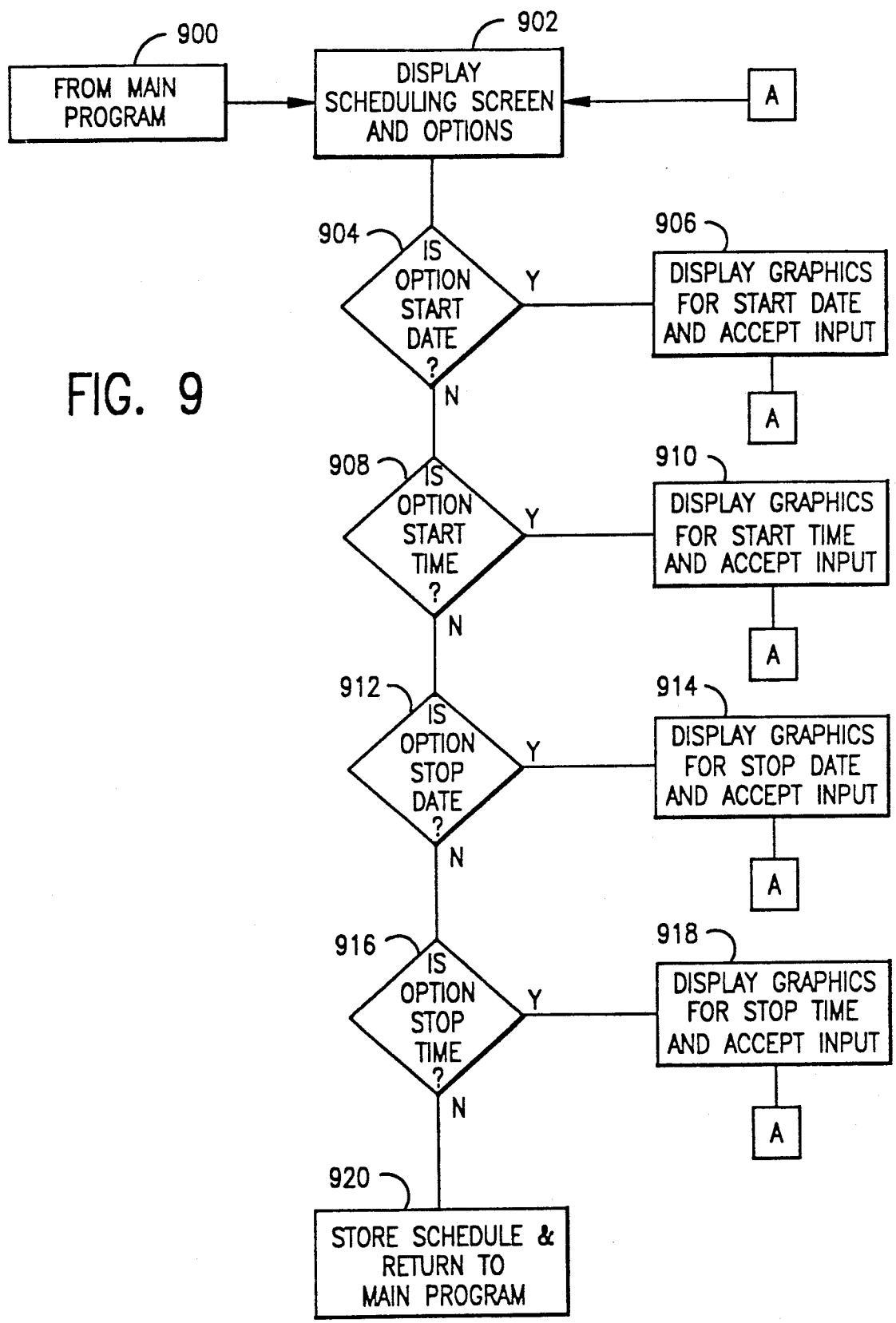
FIG. 9 is a flow chart of a dynamic, graphics-oriented touch or cursor-controlled event scheduling subroutine utilized by the invention.

The software to schedule a device using a graphics based system as described above, involves using the graphics capabilities of the display generator 54 in a way to produce pleasing picture elements that can be moved under cursor control. The result will be both visually pleasing and easy to understand and use. FIG. 9 shows a software flow chart of a preferred implementation of this type of system. Obviously, the software can be implemented in a variety of ways, depending upon the specific screen design.

Referring now to FIG. 9, from the main program 900, the user selects the scheduling screen options subroutine 902 and then selects the option desired. The scheduling screen options subroutine is accessed using the system configuration function from the main menu shown in FIG. 3*a*. The program then determines whether the option selected is the start date 904 and, if it is, displays the graphics for the start date and accepts that input 906. Once the user makes his selection for the start date, the program returns to A, displays the scheduling screen and options 902 and the user then picks the next option to be scheduled. In that manner, the user is led through a sequence of steps which result in the display, input and acceptance of the scheduling data for the selected device. If the option selected is not the option start date, then the program determines whether the option selected is the start time 908. If it is, then the graphics for the start time and acceptance of the start input are displayed 910 and the user is able to enter the start time. The program then returns to A, displays the scheduling screen and options 902 and waits for the user to make another selection.

If the option selected at 902 is not the start date or start time, the program then determines whether the option is the stop or finish date 912. If it is, then the graphics for the stop date and acceptance of the stop date input are displayed 914. Again, the user selects the stop date, requests that the stop date input be accepted and the program returns to A displays the scheduling screen and options 902.

If the option selected at 902 is not the start date, start time or stop date, then the program queries as to whether the option selected is the stop time 916. If it is, then the display graphics for the stop time and acceptance of the stop time input 918 are shown on the video display monitor 56. The user selects, using the touchscreen 16, the stop time and the program returns to A to display the scheduling screen and options 902. In the event that the option chosen by the user is not a start or stop option, but it is an option which indicates that the scheduling has been completed, the program stores the schedule and returns to the main program 920.

As previously described, this entire sequence can be accompanied by verbal prompts, generated by the voice recognition and speech synthesis circuitry 58, to prompt the user through the scheduling scheme. Many different types of events can be scheduled in this manner, such as a lighting system event, control of the audio/video entertainment system, the energy management system, individual appliances and the configuration of the system itself. Thus, system features and functions can also be scheduled by the user, such as spoken alerts, pass codes, etc.

FIGS. 10*a* through 10*g* show the touchscreens which may be displayed in order to enable the user to schedule events. For example, FIG. 10*a* shows a monthly calendar but also provides function boxes which, upon being touched, display either the month before or the month following the currently displayed month. The user selects a day of the month merely by touching that date on the screen. Other function boxes provide for a weekly cycle selection, copying the time selected, cutting and saving a schedule for use with another function or canceling the date.

FIG. 10*b* shows the particular mode which the user is currently setting and shows a summary of the settings for that mode. For example, as shown in FIG. 10*b*, the information indicates that the system will go into the vacation mode on May 24 from 4:30 a.m. to 6:30 a.m. and then from 6:35 p.m. to 8:00 p.m.

In the example shown, the appropriate portion of FIG. 10*c* has been touched by the user to indicate that the vacation mode should start at *6:35* p.m. and FIG. 10*d* has been touched by the user in the appropriate place to indicate that the vacation mode should finish at 8:00 p.m.

FIGS. 10*e* and 10*f* show alternative methods for utilizing the touchscreen of the present home automation system for setting the start and finish time. As indicated in FIG. 10*g*, the vacation mode is to run from May 20 to May 24. FIG. 10*e* shows that the vacation mode is to start at 1:17 p.m. on May 22 and continue until 3:22 p.m. on Thursday, May 24. By providing the touchscreen shown in FIG. 10, or various combinations thereof, the user may readily schedule the desired events merely by touching the appropriate places on the touchscreen of the present home automation system.

INFORMATION RETRIEVAL

The present home automation system provides an integration of tailored information and communication services in a home automation system environment with high resolution color graphics displays. Since the system disclosed herein can be connected to the outside world by both telephone and modem, it provides the capacity for remote communications and information retrieval.

As shown in FIG. 1, there are a plurality of ways in which the home automation system disclosed herein can be connected to sources of external information. Three of these are specifically shown as the telephone system 62, which is connected to the standard telephone network (not shown), the Ethernet network interface 50 and the multiple external terminals 52, and a network file server 51 which together form a local area network, and the modem 42 which may be connected to a plurality of remote data bases 44. Each of those modules is ultimately connected by means of the data bus 12 to the central processor 10.

Utilizing, for example, the proper telephone interface 60, and a speech processor 58, the present home automation system can make and answer audio telephone calls. This means that the home automation system can be directed from a touchscreen 16 to make telephone calls to information services which provide audio information. One such application is to retrieve single message recordings such as daily weather reports, financial reports or sports reports. An additional application is to access voice "data bases" such as individual stock prices or checking account balances, which requires that the home automation system send touch tone signals to retrieve the proper information. Alternatively, the information can be requested and retrieved in a digital format from a wide variety of available data bases utilizing the modem 42. The same is true when using a connection to a local area network that could provide local community information or, through a gateway, access to remote information.

The present invention, by its combination of information retrievable with high resolution color graphics, provides advantages both in requesting and in displaying information. For example, when requesting information, the displays can provide a well organized menu of options so that, with a single touch, the desired information can be retrieved. For displaying information, the color graphics capability allows the received information to be reformatted into highly readable displays or even into charts and graphs. In the future, as the technology used by on-line information services improves and additional services become available, pictorial or other information will be able to be retrieved and displayed by the home automation system, as well.

The foregoing types of information can also be requested with any wired or wireless cursor control or general input device, such as a mouse, touchscreen 16, light pen, joy stick, keyboard 18 or voice recognition system.

MULTIDIMENSIONAL INTERACTION AND CONTROL

The present home automation system provides the capability to the user to interact with and control a home in a variety of modes in order to increase both the capability and ease of use of the home automation system. For example, the present home automation system incorporates high resolution color graphics displays that are essentially menu oriented, partially floor plan oriented, and partially mood oriented. Each type of display has advantages in different control situations. Floor plans are best used when direct control options are required for many specific devices. The present home automation system utilizes floor plans to activate and deactivate individual security zones throughout the house by touching the location of that zone on a floor plan, using a touchscreen 16.

The present invention also, however, provides for "mood" control. Moods are macroinstructions of multiple commands that allow single commands to set an entire living environment in the home, such as all the lighting and music for an evening party. On the other hand, menus offer the best means to select options that are not necessarily related to a location in the home, such as a command to play a particular compact disk, request a certain type of remote information, or to switch to another sub-menu of options. The system is provided with the ability to use the floor plan mode to create the moods to be used in the menu of moods. Thus, the floor plan displays create and define lists of tasks to be performed in each particular mood.

The present home automation system, by reason of utilizing an AT compatible bus, allows the use of a wide variety of video options. For example, by use of certain display driver cards, a range of video resolutions from high resolution displays for use with detailed floor plans to lower resolution menus can be shown. That provides for faster loading of the information into the central processor and out to the monitor 56. Also, by using a monitor that can show both standard video as well as the high resolution display graphics, the display screens 56 can double as televisions or security monitors.

This function is accomplished by the use of a multi-resolution video display driver card such as the VGA VIP card or the VGA Wonder card, available from a ATI. It also uses as the primary video monitor, the Mitsubishi AUM-1381A which can display either computer-generated EGA/VGA video or standard NTSC television video.

INTERFACE TO A MULTI-ZONE SECURITY SYSTEM

Another capability of the present home automation system is its ability to interface to multi-zone security systems and to allow user control of such security systems by means of interactive touchscreens 16 and other alternative control interfaces. The present home automation system is designed to interface to and take advantage of the advanced features offered by sophisticated security systems Thus, the home automation system is designed to operate with an external security system, which provides several advantages.

First, the present system can be performing control tasks while the security system is calling the alarm service. One of those control tasks can be contacting someone else by telephone as a backup to the alarm service. Another advantage of being designed to operate with an external security system is that the present home automation system can monitor the performance of the security system and can keep a separate log of all security events. Still another advantage is in the use and power of the interaction by the user with the security system by means of a high resolution color graphics display and cursor control devices. Such an interaction allows the user interface to be greatly improved and simplified over those previously known. Further, the home automation system, since it is designed to operate with external security systems, can be utilized with the very latest security systems and can take advantage of improvements and updates to such security systems.

Another advantage of integrating a security system into the present home automation system is the ability to provide information to the user while announcing the alarm. The system can speak the location of the intruder or fire while displaying that location on a floor plan screen of the home. It also turns on all lights in the house to light exit routes and shut down heating system blowers to minimize smoke circulation in the house.

A preferred external security system to which the present home automation system may be interfaced is the Silent Knight 4000 security system, available from Silent Knight. That home security system is shown as element 38 in FIG. 1. It is interfaced to the central processor 10 by means of a custom RS-232-to-security system translator 36, which in turn is connected to the serial interface 34a and then through the AT bus 12 to the central processor 10. The interface or translator 36 is a microprocessor-based translator and controller.

In addition to connecting the home automation system to the security system bus, it listens to and interprets all data instructions generated by the security system on its bus, and translates commands from the home automation system to the security systems', data protocol so that the security system will receive the commands and respond appropriately. Besides allowing the security system 38 to receive and respond to commands from the central processor 10, which are ultimately generated by the user of the system, the home automation system is also able to record security events on a real time basis.

As shown in FIG. 2, a four wire bus is utilized by the Silent Knight home security system 38, two wires for power and the other two for data transmission. The interface translator 36 connects to all four wires of that bus. Data originating in the security system 38 is first level shifted from a data stream between +12 volts and ground to a data stream between +12 volts and −12 volts and then passed to an input bus of a Z80-based microcomputer. Under control of an EPROM resident program, the Z80 microprocessor translates data and instructions appearing on the bus. Such data and instructions exit the translator 36 in RS-232 format, from which they ultimately reach the central processor 10. When the home automation system gives a command to the security system, it passes through the Z80 microprocessor, is converted to the proper format and timing for the security bus, passes through another level shifter and is then converted to the +12 and ground format used by the security system 38.

SPOKEN MESSAGES AS CUES

The present home automation system also provides for the use of spoken messages as cues for touchscreen use, providing a great level of ease of use for non-technical users of the system. The present home automation system provides spoken cues to help guide the user when using touchscreens to the next step. The present home automation system incorporates hardware and software to support the playback of high-fidelity, digitally recorded messages to the user. For example, when the user touches one of the touchscreens 16 to request control of a type of function, a spoken phrase is played through one of the remote speakers 66 as each new screen graphic is displayed. For example, on the main menu, the user may select the "Security Management" option. If the user lived in a large house, his next step might be to select a floor or area of the house he wishes to control. By speaking the phrase, "please select your floor" upon displaying a floor selection menu, the user is assisted in continuously understanding the next function to be performed.

The foregoing function of the system is performed in software by calling a speech subroutine as each new graphics screen is displayed. The speech information is stored in the extended RAM memory of the processor 10, which has been previously described. The home automation system utilizes the speech processor 58 and a remote speaker 66 located at each touchscreen location in order to provide the spoken cues to the user while he is using the touchscreen.

THE SOFTWARE SYSTEM

As has been described herein, the present expandable home automation system is a distributed processor system, in which a central processor 10 is integrated with a collection of secondary processors associated with the various interface elements. The disclosed home automation system is preferably arranged with a star topology, in which the secondary processors serve to relay information to the central processor, or to translate commands received from the central processor into commands that their dedicated devices can understand. As has been described, the secondary processors manage the following subsystems: voice recognition and voice synthesis; telephone communication; touchscreen communication; hand-held remote control unit communication; input and output control and monitoring; security and fire system safety and monitoring; and other optional intelligent subsystems, such as lighting, audio and video and HVAC.

While the secondary processors generally run standard software available from the interface manufacturer, the instructions for running the central processor, however, have not been described and will thus be described in this section of the application. These instructions are termed the Home Environment Automated Real-time Transactor or HEART. The HEART instructions have been created in a standardized and modular form such that the instructions may be configured for each different home environment, as the user desires. The HEART instructions consist of six major portions, which are described hereafter. Those portions are (1) the Subsystem Interrupt Handler; (2) the Internal Scheduled Interrupt Server (ISIS); (3) the Polling Loop; (4) the Tasks; (5) the Device Drivers; and (6) the Support Environment.

Briefly, the Subsystem Interrupt Handler operates in the background in order to receive messages from the secondary processors and to build received message queues. The Internal Scheduled Interrupt Server handles the scheduling of timed events. The Polling Loop monitors the message queues and the ISIS and calls the appropriate Task. The Tasks respond to the messages from the secondary processors. The Device Drivers translate internal commands into the instructions necessary to execute the desired function. The Support Environment consists of the additional task-switching apparatus and internal tools that allow the various subsystems to function in a cohesive and multitasking manner.

THE SUBSYSTEM INTERRUPT HANDLER

A flow chart of the functions performed by the Subsystem Interrupt Handler is shown in FIG. 4b. All of the tasks and devices based on a serial line, such as the touchscreen, hand-held remote control unit and security system, are supported by the interrupt handler, running in the background. When a byte of data is received at any serial port, an interrupt request line is raised, which causes the interrupt handler to execute.

Figure 5A:
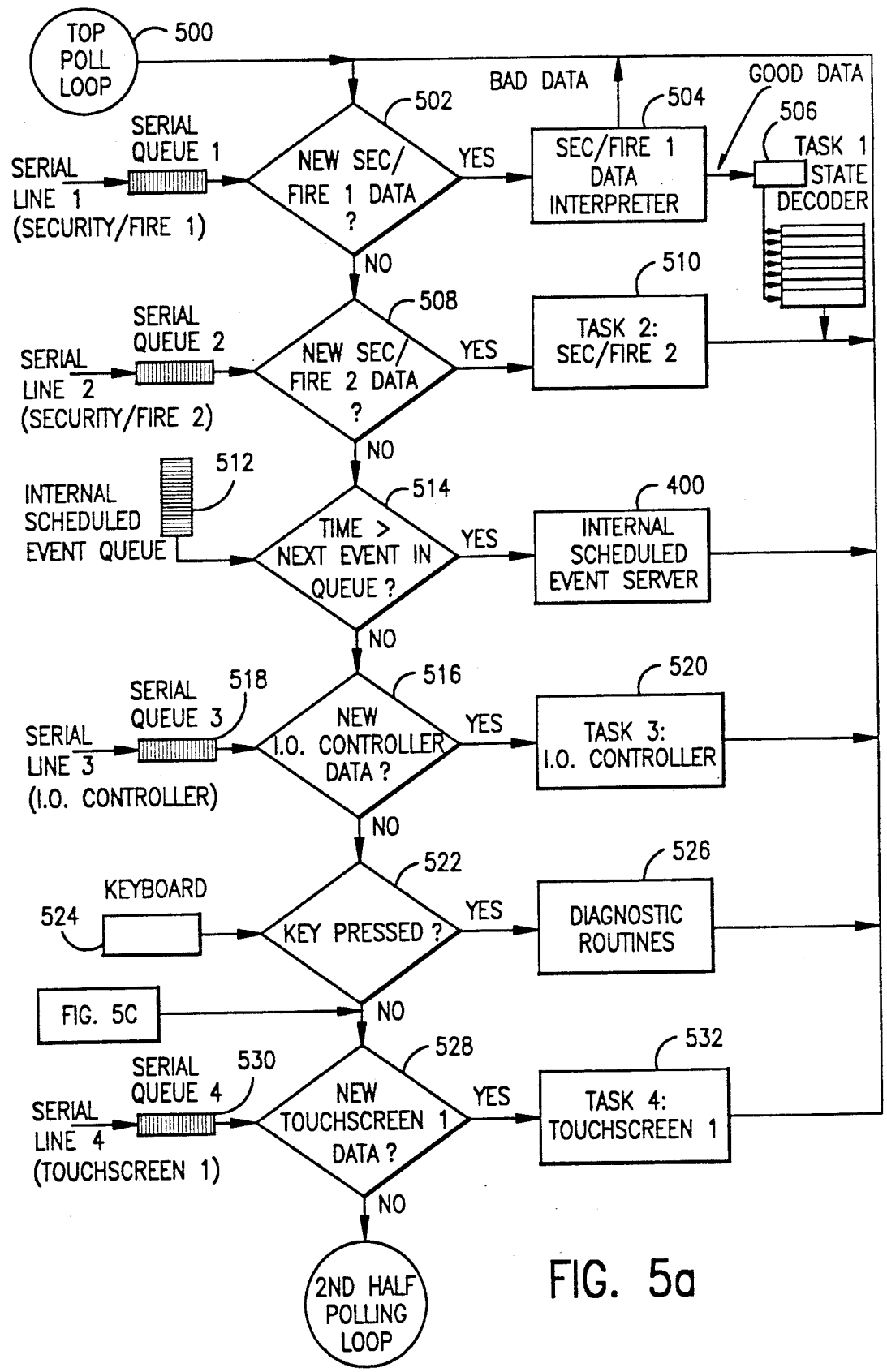
FIG. 5a is a flow chart showing part of the Polling Loop module of the HEART central processor software utilized with the present invention.
Figure 5B:
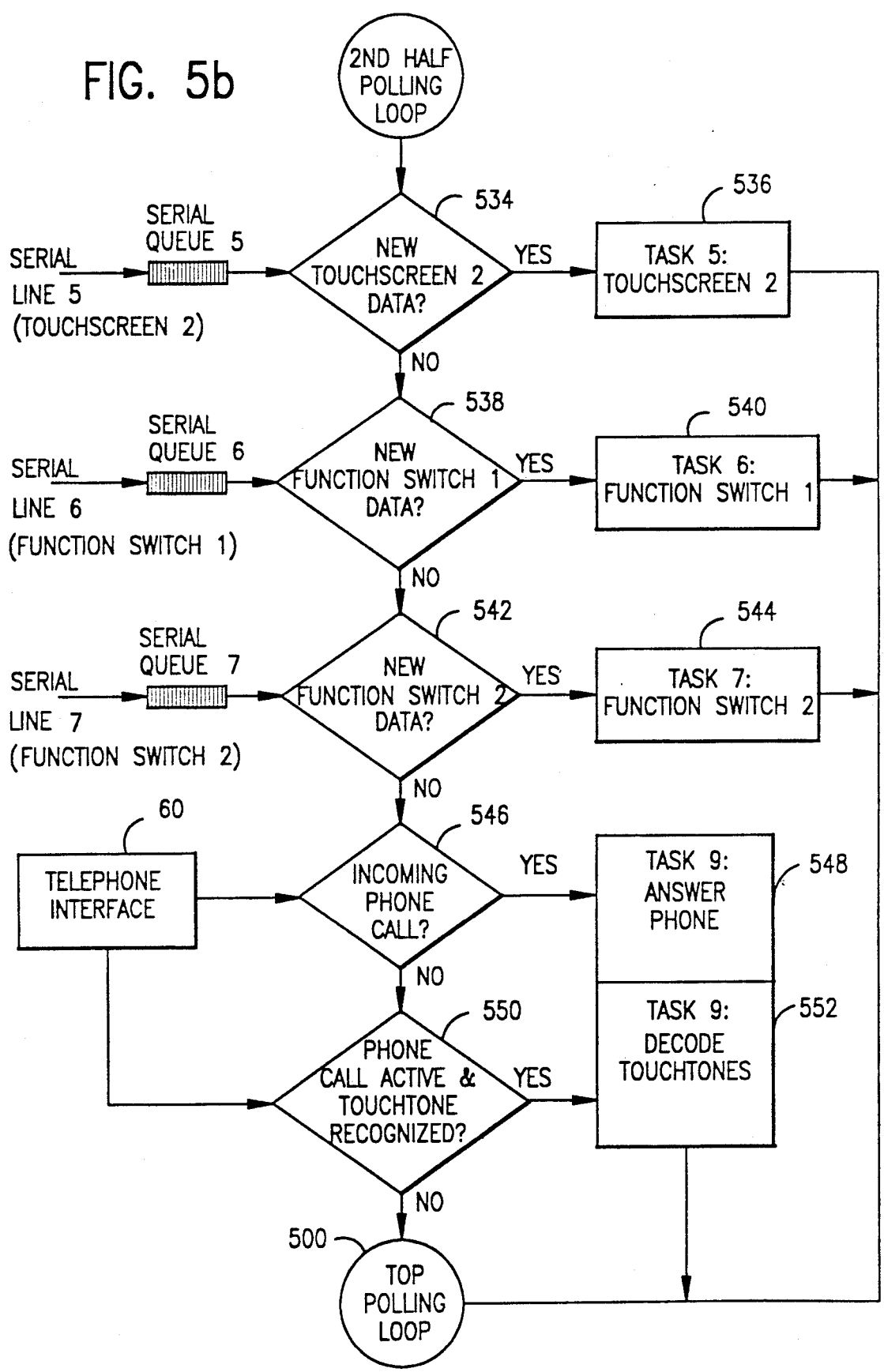

The interrupt handler determines which serial port caused the interrupt, copies the new data into that port's queue and then increments that queue's pointer. The Polling Loop, which is shown in FIGS. 5a and 5b, monitors the queue pointer and jumps to the queue's task when the queue pointer moves.

As shown in FIG. 4b, when the interrupt request line is raised the interrupt handler begins to execute. Initially, the interrupt handler jumps to the interrupt handler routine 300. The interrupt handler routine then determines, by asking each serial chip, which serial line generated the interrupt 302 which caused the interrupt request line t be raised. Upon determining which serial line generated the interrupt, the appropriate data byte is pulled from the identified serial lines, RX register 304 and is placed in the appropriate serial queue 306. That queue's pointer is then incremented 308. If the queue pointer is greater than the queue size, then the queue pointer is wrapped around. The interrupt handler routine then ends and returns to the normal program 310.

THE INTERNAL SCHEDULED INTERRUPT SERVER (ISIS)

The Internal Scheduled Interrupt Server or ISIS is a tool available to any task, device driver or ISIS event. It allows a routine to schedule a software event to occur any time within the next 24-hours. The ISIS load event routine is called with an event time, event number and optional data. The new event is inserted into the ISIS queue in accordance with its event time. The top of the ISIS queue is checked in the Polling Loop, and, if the current system time is equal to or greater than the time of the top event in the queue, that ISIS event is removed from the queue and then executed.

The types of ISIS events available are monitoring, scheduled subsystem events, wait for acknowledgment, wait for data, and support environment events.

FIG. 4a shows a flow chart of the operation of the internal scheduled interrupt server. As previously described, when this tool is called from the Polling Loop, the instruction at the top of the queue whose time has been passed is to be executed 400. Examples of the various types of ISIS events are described later in connection with FIGS. 13a through 13d.

THE POLLING LOOP

The Polling Loop forms a part of the virtual multitasking environment utilized by the instant home automation system, since all tasks are executed incrementally depending upon inputs noticed by the Polling Loop. The Polling Loop processes and checks the various inputs in priority order from high to low. Whenever an input presents data to be processed, the Polling Loop executes an immediate jump to that input's task. When the task has completed executing its current state using the new data, it immediately jumps back to the top of the Polling Loop. However, some tasks may immediately execute their next state without returning to the Polling Loop if more data is available.

Figure 5C:
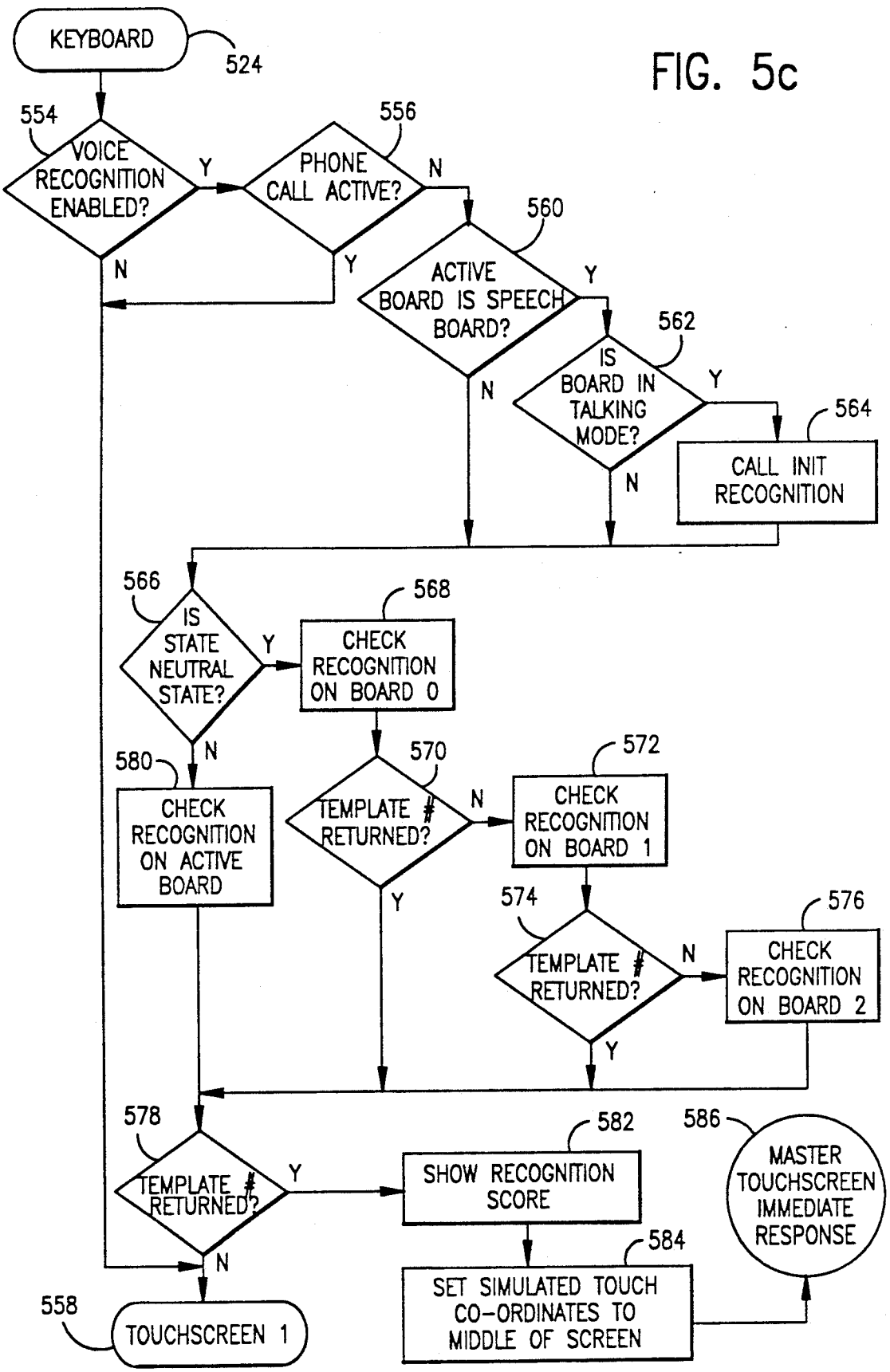
FIG. 5c is a flow chart showing the voice recognition function of the Polling Loop module of the present invention.

In its preferred embodiment, the Polling Loop monitors the following input sources in order of priority:
1. Fire/security 1
2. Fire/security 2 (optional)
3. Internal scheduled interrupt server
4. I/O controller
5. Keyboard
6. Voice recognition board 0
7. Voice recognition board 1 (optional)
8. Master touchscreen (1)
9. Secondary touchscreen (2) and other touchscreens
10. Serial wall switch bus
11. Telephone control interface
12. Other intelligent subsystem interfaces A flow chart showing the functions of the Polling Loop is shown in FIGS. 5a-5c. From the top of the Polling Loop, a determination is made as to whether new security or fire 1 data 502 has been received from the serial line 1, the serial line queue which corresponds to one line from the serial interface 14. If new data has been received, the data is interpreted 504 and, if found to be valid data, is sent for execution to a task 1 state decoder 506 which selects which section of code or state in the Task will process the new data. The program then returns to the top of the polling loop 500. If the new data is determined to be invalid data at the data interpreter step 504, then the program jumps immediately back to the top of the Polling Loop 500. All other tasks (2 through 9) follow the same format of "data interpreter" and "state decoder." Further discussion of specific Tasks follows.

If no new security and fire 1 data has been input, then a determination is made as to whether there is new security and fire 2 data 508. If there is, then Task 2 is executed 510 based upon that data and then the program returns to the top of the polling loop 500. If no new data is in the serial queue 2 at the step for determining whether new security/fire 2 data has been input 508, then the program next determines whether the current time in the Internal Scheduled Interrupt Server event queue 512 is greater than the next event in the queue 514. If it is, the Internal Scheduled Interrupt Server subroutine is called 400. After the execution of the ISIS subroutine, the program returns to the top of the Polling Loop 500.

If there is no internally scheduled event or interrupt to be executed at the current time 514, then a determination at step 516 is then made as to whether there is any new input/output controller data at the serial queue 3 at point 518. If there is, then Task 3 is executed 520 and the input/output controller subroutine is executed. The program then returns to the top of the Polling loop 500.

If there is no input/output controller data at step 516, a determination is then made as to whether a key has been pressed 522 on the keyboard 524. If a key has been pressed, then certain diagnostic routines 526 may be called and then the program returns to the top of the Polling Loop 500. Alternatively, although not shown in FIG. 5a, once a determination that a key has been pressed 522 is made, another determination as to whether a diagnostic routine has been called may be made. If a diagnostic routine has not been called, then the system will interpret the keyboard input to be instructions or data and will execute those instructions or data accordingly.

If the determination at step 522 of whether a key has been pressed is negative, then a determination is made as to whether data has been received from touchscreen 1 at point 528. If there is touchscreen data on the queue 530 from serial line 4, then the touchscreen Task 4 is executed 532. The program then jumps to the touchscreen 1 or master touchscreen subroutine, a flow chart of which is shown in FIG. 6. The program then returns to the top of the Polling Loop 500.

The second half of the Polling Loop is shown in FIG. 5b. As shown in that figure, a determination is then made as to whether there is new touchscreen 2 data 534 by examining the serial queue 5 connected to touchscreen 2. If there is data present, then the program executes Task 5 for the touchscreen 2 536 and jumps to the touchscreen 2 subroutine, which is similar to the touchscreen 1 subroutine shown in FIG. 6. Note that additional secondary touchscreen tasks may be inserted in the Polling Loop at this point.

If no new touchscreen 2 data is present at the serial queue 5, a determination is then made as to whether a particular function switch, for example, a serial wall switch 13 has inputted data on serial line 26 to the serial queue 6. If new function switch 1 data is present 538, then Task 6, the task associated with that particular function switch 540 is executed and the program then returns to the top of the Polling Loop 500. If no new function switch 1 data is present, then a determination is then made as to whether new function switch 2 data is present 542 on serial line 7 in serial queue 7. If new data is present, then Task 7, which corresponds to the function switch 2, is executed 544 and the program returns to the top of the Polling Loop 500. Note that additional function switch tasks may be inserted in the Polling Loop at this point.

If no new data from function switch 2 has been input on serial line 7, the program then determines whether an incoming phone call is being received 546 from the telephone interface 60. If an incoming telephone call is being received, then Task 8, answering the phone, is executed 548. If no incoming telephone call is being received, then the program determines whether the phone call is active and touch tones are recognized 550. If an affirmative determination is made, then Task 8 is executed, the incoming touch tones are decoded 552 and the program then returns to the top of the Polling Loop 500. If no touch tones are recognized, the program returns to the top of the polling loop 500.

FIG. 5c is a flow chart showing the voice recognition portion of the Polling Loop. After it has been determined that a key of the keyboard 524 has not been pressed, a determination is made as to whether the voice recognition circuitry is enabled 554. If that determination is affirmative, then a determination is made as to whether a telephone call is currently active 556. If a telephone call is currently active, then the system skips to the touchscreen 1 queue at step 558.

If, at step 556, there is no active telephone call, then a determination is made as to whether the current active board is the speech board 560 (the board also used to generate spoken responses). If the current active board is the speech board, then a determination is made as to whether the speech board is in the talking mode 562. If the speech board is in the talking mode, then the Initrecognition subroutine is called 564. The system then determines whether the current Master Touchscreen state is the Neutral State 566.

If a determination at steps 560 or 562 is negative, the system then proceeds to determine whether the current state is the Neutral State at step 566. If the current state is the neutral state, then the recognition on board 0 is checked 568 and then a determination is made as to whether a template number has been returned 570. If no template number has been returned at step 570, then the recognition on board 1 is checked at 572. A determination is again made as to whether a template number has been returned 574. If no template number has been returned, then the recognition on board 2 is checked 576 and the program again determines whether a template number has been returned 578.

If the current state is determined to not be the neutral state, then the system checks voice recognition to determine whether a template number has been returned from the currently active voice recognition board 580 at step 578. After steps 570 and 574, if it is determined that a template number has been returned, the program proceeds to again determine whether a template number has been returned at 578. If a template number has been returned, then the recognition score is displayed 582 and the simulated touch coordinates are set to the middle of the screen 584. The system then jumps to the master touchscreen immediate response module 586.

In the event that no template number has been returned at step 578 or if the voice recognition is determined to not have been enabled, the system moves to the touchscreen 1 queue 558.

THE TASKS

A Task, as that phrase is used herein, is a software module that supports one specific piece of hardware within the disclosed home automation system. The communication protocols of both the tasks and the secondary processors are designed in such a manner to allow the Tasks to run in a high-level simulation of a multitasking system. Each task is broken up into subtasks, which are in turn themselves divided into single "states." Each state is designed to execute in one second or less, and, on completion, returns to the top of the Polling Loop. Transitions between states are triggered by the interrupting events recognized by the Polling Loop.

The various devices controlled and monitored by the home automation system described herein are assigned to tasks in the following manner. Every secondary processor which communicates with the central processor over a serial line is assigned its own task. Devices on the internal AT bus 12, which use an Interrupt Request Line (IRQ Line) may be assigned their own tasks. The assignment of tasks to actual hardware occasionally demands that more than one device be tied to one task. Furthermore, the task number assigned describes that task's priority. That is, task 1 is the highest priority task in the system. The task assignments for the preferred configuration are set forth below.

Task 1: Fire and security interface
Task 2: Second fire and security interface (optional)
Task 3: Input and output controller interface
Task 4: Master touchscreen and voice recognition boards
Task 5: Secondary touchscreen (optional)
Task 6: Serial wall switch 1 bus
Task 7: Serial Wall Switch 2 bus (optional)
Task 8: Telephone control interface
Task 9: Other intelligent subsystem interfaces All tasks are structured in approximately the same manner and consist of the following pieces: (1) data validation routine: (2) immediate response routines: (3) neutral state: and (4) contextual states. Each of those components is described further below.

When a Task receives data, it must first evaluate it. The data validation routine (DVR) consists of a sequence of states, in which each state evaluates one byte of data. If the byte is rejected, the state resets the DVR. If the byte is not rejected, the state increments the state variable to the next DVR state and returns to the Polling Loop, thus allowing the next byte of data to cause the next DVR state to execute. The communication protocol for that task's device is encoded into the DVR, in order to form the criteria by which the DVR will accept or reject data. The DVR also simultaneously decodes the data to provide necessary information to the remainder of the task.

Immediate response routines—when a valid complete transmission has been received, most Tasks will perform some immediate action, such as acknowledging the transmission or displaying a cursor on the touchscreen. These immediate responses are performed regardless of the current state of the Task. Once the responses have been performed, the software will immediately jump to either the Neutral State or to the appropriate Contextual State.

Neutral State—The Neutral State is a catchall state which is executed when the Task has not been placed in any other (contextual) state. Most unpredictable and unexpected events, such as a fire alarm, are processed by a Neutral State. The Neutral State also serves to ignore garbled or meaningless transmissions.

Contextual States—Contextual States form the majority of the intelligence of the instant home automation system. When the data reaches the current Contextual State, it is acted upon in the context of that current state. For example, data indicating that the fourth touch box of the touchscreen menu has been touched when the touchscreen task is in the "lighting" mood Contextual State would be evaluated on that basis, resulting in some action, such as calling the lighting mood device driver to set lighting mood number 4. Some Contextual States may jump to the Neutral State if the data does not make sense to the current Contextual State. However, when that occurs, the Task's state variable will not change, and will still direct future data to the same Contextual State.

An example of a specific task description is given in Table 1 for Task 1, the Fire and Security Interface.

TABLE 1

Example of a Specific Task Description - Task 1: the Fire/Security Interface

Data Validation:
The data validation consists of the following states:

| 1st Synch byte: | Must be equal to 52 or data is rejected |
| 2nd Synch byte: | Must be equal to 126 or transmission is rejected |
| Length byte: | Receive length of message |
| Command byte: | Receive command byte |
| Data bytes: | Receive appropriate number of data bytes, if any |
| Checksum byte: | Must be equal to sum of all bytes in message MOD 256 or transmission is rejected |

Immediate Response:
Call security device driver to send acknowledgment of receipt of message.
Neutral State:
If command is Fire Alarm, then
set Master Touchscreen task to Fire Alarm State,
jump to Fire Alarm State in Master Touchscreen Task.
end if
If command is Security Alarm, then
set Master Touchscreen task to Security Intrusion State,
jump to Security Intrusion State in Master Touchscreen Task
end if
If command is any other type of alarm, then
call lighting moods device driver to turn on all lights
end if
ignore all other commands
return to Polling Loop
Contextual States:
Waiting for response to disarm system request:
if command is acknowledgment then
result = good
jump to Disarm Security System substate of Master TABLE 1-continued Example of a Specific Task Description - Task 1: the Fire/Security Interface Touchscreen Task
else if command is system already disarmed
result = already disarmed
jump to Disarm Security System substate of Master Touchscreen Task
else if command is password rejected
result = password rejected
jump to Disarm Security System substate of Master Touchscreen Task
else
execute Neutral State without changing Contextual State
end if
Waiting for a response to shunt zone command:
if command is acknowledgment then
result = good
jump to Shunt Zone substate of Master Touchscreen Task
else if command is rejected password then
result = rejected password
jump to Shunt Zone substate of Master Touchscreen Task
else
execute Neutral State without changing Contextual State
end if
Waiting for interface to return zone map
if command is zone map then
result = good
jump to substate that requested a zone map
else if command is rejected password
result = rejected password
jump to substate that requested a zone map
else
execute Neutral State without changing Contextual State
end if
Waiting for response to arm system request:
if command is acknowledgment then
result = good
jump to Arm Security System substate of Master Touchscreen Task
else if command is system already armed
result = already armed
jump to Arm Security System substate of Master Touchscreen Task
else if command is system not ready
result = not ready
jump to Arm Security System substate of Master Touchscreen Task
else if command is password rejected
result = password rejected
jump to Arm Security System substate of Master Touchscreen Task
else
execute Neutral State without changing Contextual State
end if A flow chart showing the function of Task 4, the touchscreen 1 or Master Touchscreen Task, is shown in FIG. 6. From the top of the Polling Loop 500, when the determination of whether there is new touchscreen 1 data 528 is in the affirmative, a determination is then made as to whether that data is valid 600. If the data is not valid, then the task is terminated and the program returns to the top of the Polling Loop 500. If the data is valid, a determination is then made as to whether sufficient data has been received to calculate the touchpoint 602. If insufficient data has been received, then the state variables are set such that further data will be used to complete the calculation, the task is terminated, and control returns to the top of the Polling Loop 500.

If, on the other hand, sufficient data to calculate the touchpoint has been received, then a determination is made of whether the touchpoint is greater than 7 pixels from a prior touch and, if so, a new cursor is displayed 604.

Figure 6B:
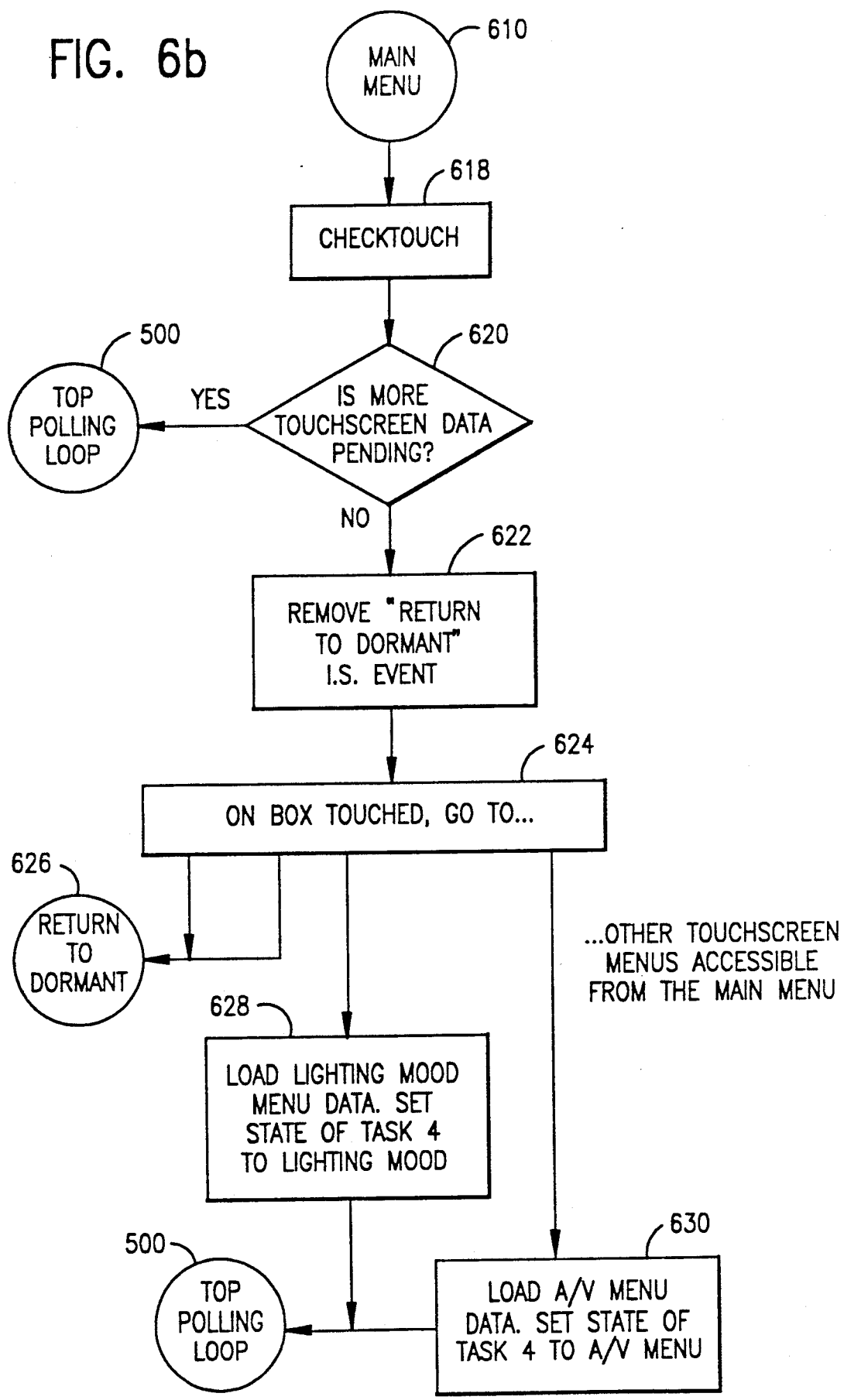
FIG. 6b is a flow chart showing part of the Task 4 module, the operation of the main menu of the present invention.

A determination is then made as to the state of Task 4 which causes the program to jump to a sub-task of Task 4 corresponding to the function selected by the user. For example, the program can jump to the dormant screen 608, to the main menu 610, to the lighting mood menu 612, to the audio/video menu 614, or to other menus to control other functions described in this application. A different subsystem can be controlled from each of those menus. For example, as shown in FIG. 6b, the main menu, which is a sub-task of Task 4, when selected, becomes the current state of Task 4. The program then calls the Checktouch subroutine 618 which is shown in FIG. 11.

After performing the Checktouch subroutine, the main menu subroutine determines whether more touchscreen data is pending 620. If there is more touchscreen data pending, then the program returns to the top of the Polling Loop 500. If there is no more touchscreen data pending, then the subroutine removes the return to dormant screen ISIS event 622, also described later as a "Screen Timeout" ISIS event, and then, according to the last box that had been touched from the touchscreen, goes to the appropriate subroutine 624. For example, the program can return to the dormant screen 626. If the last box touched on the touchscreen is the lighting mood menu, then the program will jump to the subroutine which loads the lighting mood menu and sets the state of the Task for the lighting mood 628. The program then returns to the top of the Polling Loop 500.

If another box from the main menu touchscreen has been selected, such as the audio and video menu, the program jumps to the subroutine which loads the audio/video menu data and then sets the state of the Task 4 to the audio/video menu 630. The program then returns to the top of the Polling Loop 500.

Figure 6C:
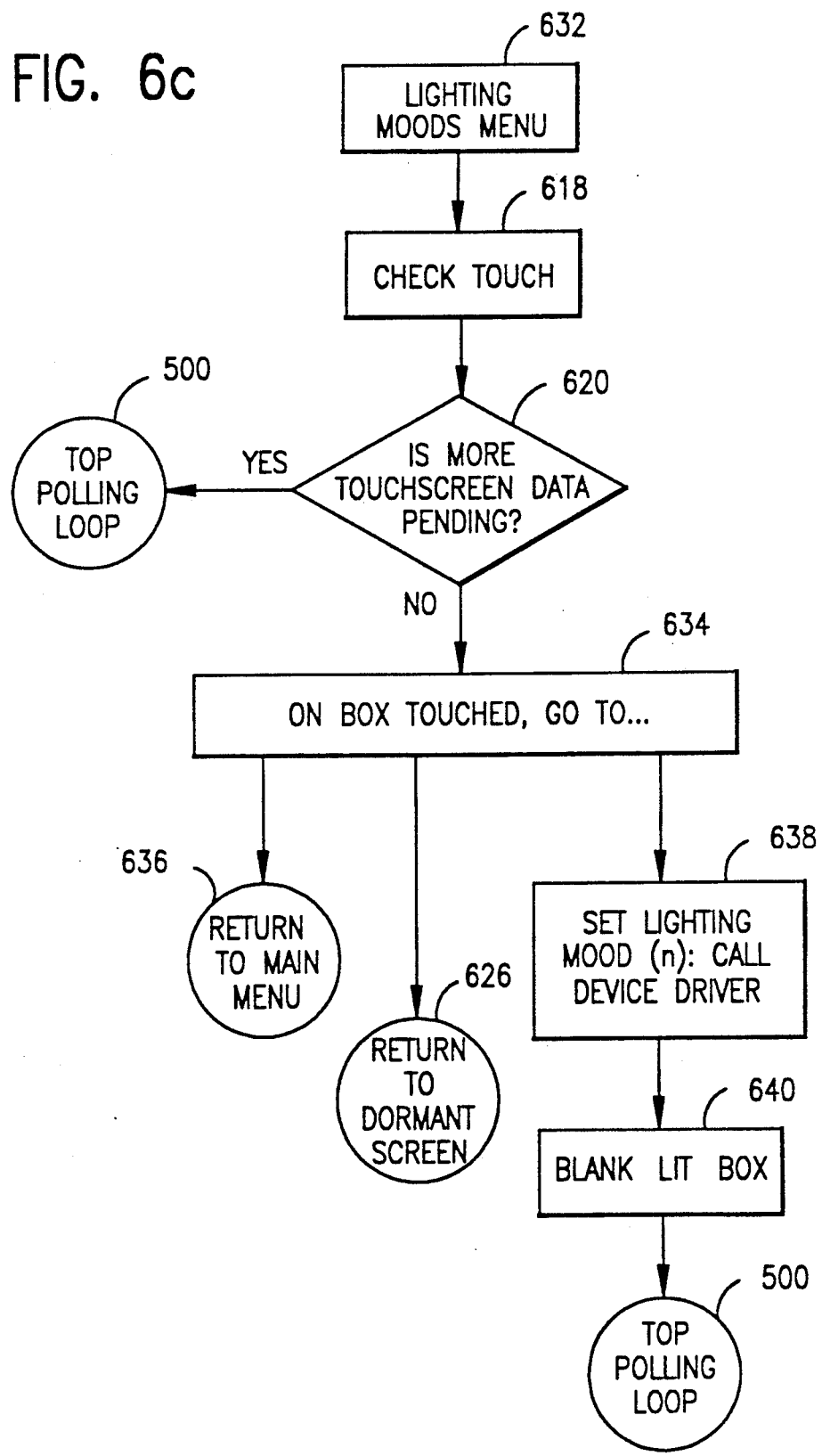
FIG. 6a is a flow chart showing part of the Task 4 module, the touchscreen functions, of the present invention.
FIG. 6is a flow chart showing part of the Task 4 module, the operation of the lighting moods menu, of the present invention.
FIG. 6d is a flow chart showing part of the Task 4 module, the operation of the dormant screen, of the present invention.
FIG. 6e is a flow chart showing part of the Task 4 module, the interaction of the main menu and dormant screen functions, of the present invention.
FIG. 6f is a flow chart showing part of the Task 4 module, additional functions of the dormant screen, of the present invention.

FIG. 6c shows the lighting moods menu subroutine which is one of the subtasks of Task 4. From the lighting moods menu 632, the Checktouch subroutine is called 618 and then a determination is made as to whether more touchscreen data is pending 620. If more touchscreen data is pending, the program returns to the top of the Polling Loop 500.

If no more touchscreen data is pending then, depending upon the box touched on the touchscreen, the program jumps to one of a plurality of subroutines 634. For example, the program can return to the main menu 636. It can return to the dormant screen 626, it can set the lighting mood selected by calling the appropriate Device Driver 638 which then shows a blank lit box 640 and the program then returns to the top of the Polling Loop 500.

Another subtask of Task 4 is the dormant screen, the functioning of which is shown in flow chart form in FIG. 6d. From the dormant screen 642, a determination is made as to whether more touchscreen data is pending 620. If more touchscreen data is pending, the program jumps to the top of the Polling Loop 500. If no more touchscreen data is pending, the program jumps to another subroutine 644 which initiates several functions. First, data corresponding to a greeting to be given the user is loaded from the processor memory into the central processor 10 from which it is sent to the speech processor 58 which speaks the greeting over one of the remote speakers 66. The main menu graphics and data are then loaded and the state is set to the main menu. The "return to dormant" screen ISIS event, also described later as the "Screen Timeout" ISIS event, is then set up to occur in n seconds. The program then returns to the top of the Polling Loop 500.

The functions which are performed when the program returns to the main menu 632, for example, as shown in FIG. 6c, are illustrated in flow chart form in FIG. 6e. After the program branches back to the main menu, the main menu subroutine removes the prior "return to dormant" interrupt server event 646, sets a new "return to dormant screen" ISIS event 648 and then loads the main menu graphics and data and sets the state of Task 4 to the main menu 650. The program then returns to the top of the Polling Loop 500.

In the event that the return to dormant screen subroutine is called out from, for example, the lighting moods menu as shown in FIG. 6c, the dormant screen subroutine, shown in flow chart form in FIG. 6f, is implemented. Upon returning to the dormant screen 632, the subroutine removes the prior "return to dormant" interrupt server 652 and then loads the dormant screen graphics and data and sets the current state to the dormant screen 654. The subroutine then returns to the top of the Polling Loop 500.

The Checktouch subroutine 618 discussed in connection with FIGS. 6b and 6c is shown in FIG. 11. The Checktouch subroutine functions to compare the touchpoint of the user with the touch boxes of the menu shown on the touchscreen. From an active menu 700, a determination is made as to whether the touchpoint of the user is within any of the menu's touch boxes 701. If the touchpoint on the touchscreen is within any of the boxes on the menu, then the box touched is lit up 706. If the touchpoint of the user on the touchscreen is not within any of the menu's touch boxes, then, if a box was previously lit, it is blanked. After the appropriate box has been lit up 706, if a previous box had been lit, then that box is blanked. In either event, after a determination is made as to whether a box was previously lit and, if so, it has been blanked, the program returns to the active menu 704 from which it jumped to the Checktouch subroutine.

From the Polling Loop shown in FIG. 5a, if new touchscreen 1 data is present 528, then the master touchscreen, Task 4, is executed. Initially, a determination is made as to whether a new byte is present in the master touchscreen queue 708. If a new byte is present in the master touchscreen queue, then the program determines which of the V-states 710 the Master Touchscreen Task or subroutine is currently in and then jumps to the entry point of the master touchscreen subroutine for the particular V-state condition. A V-state, for purposes of this application, is a state within a data validation routine of a Task or subroutine. V-state is also the name of a variable used by the state decoders of the present system to select which state within a Task or subroutine is the current active state.

Once the appropriate V-state 710 is selected, the program goes to that validation state. Assuming the current V-state is V-state 0, the program then determines whether the bits of the first byte in the master touchscreen queue indicate that the new byte is the first byte of a four-byte group describing the touchpoint 712. If the bits are synchronized, then the system calculates the upper half of the touchscreen X-coordinate 714, increments the current V-state 716 and then makes a determination as to whether more master touchscreen data is available 718. If no more master touchscreen data is available, then the program returns to the top of the Polling Loop 500. If a determination is made that the bits of the first byte are not synchronized at step 712, then the reset synchronization routine is executed at 720.

If the determination at step 710 is made that the current V-state is V-state 1, or if more data from the master touchscreen is available at step 718, then the program jumps to determine whether the bits in the second byte from the master touchscreen queue are synchronized 722. If they are, then the system calculates the lower half of the touchscreen X-coordinate and then the entire touchscreen X-coordinates 724. The program then increments the current V-state 726 and makes a determination as to whether more master touchscreen data is available 728. If no master touchscreen data is available, then the program returns to the top of the Polling Loop 500. As described above in connection with V-state 0, if the bits of the third byte are not synchronized at step 722, then the program executes the reset synchronization routine 730.

In the same manner as described above in connection with V-states 0 and 1, if at step 710 the current V-state is V-state 2 or if at step 728 more master touchscreen data is available, a determination is made as to whether the bits in the third byte are synchronized 732. If they are, then the upper half of the touchscreen Y-coordinate are calculated at 734, the current V-state is incremented at 736 and then a determination is made as to whether more master touchscreen data is available 738. If there is no more master touchscreen data available, then the program returns to the top of the Polling Loop 500. If, however, there is more master touchscreen data available, or if at step 710, the current V-state is V-state 4, then the program determines whether the bits in the fourth bit are synchronized 742. If they are, then the system calculates at 746 the lower half of the touchscreen Y-coordinates and then the touchscreen Y-coordinates themselves. The system then resets the V-state to the initial V-state 0 at 748 and then the master touchscreen executes an immediate response at 752.

The system operates in the same manner with respect to a determination as to whether the bits in the third and fourth bytes are synchronized as described above in connection with steps 712 and 722. If a determination at steps 732 and 742 is negative, that is, that the bits within the bytes are not synchronized, then the reset synchronization routine is executed at 740 and 750, respectively.

FIG. 7b shows the master touchscreen immediate response routine. After executing the master touchscreen immediate response 752, the system converts the touchscreen coordinates calculated in the master touchscreen validation routine to pixel coordinates 754. A determination is then made as to whether the particular touch of the touchscreen by the user being analyzed is greater than 7 pixels away from the last touch of the touchscreen 756. If an affirmative determination is made, then the prior cursor is erased, a new cursor is drawn and the new touch coordinates are stored 758. As previously described, the cursor may be shown on the screen as a highlighting or an inverse video function of the selected menu item on the touchscreen.

If the new touch is less than 7 pixels from the last touch or after step 758, the system sets a touch flag 760 and then jumps to the Master Touchscreen Task state decoder 762.

FIG. 7c shows the Neutral State subroutine of the Master Touchscreen Task routine. From the Master Touchscreen Task state decoder 762, the system pauses for a predetermined amount of time 764, for example, 0.1 seconds. A determination is then made as to whether more touchscreen task data is pending 766. If there is more touchscreen task data pending, then the system jumps to the top of the Polling Loop 500. If there is no Master Touchscreen Task data currently pending, then the system erases the cursor 768 drawn in step 758, and then turns on the speaker in the house closest to the active touchscreen 770.

The system then makes a determination as to whether there is an active phone call 772. If there is, then the message "I'm sorry, but the system is currently responding to a telephone call" is caused to be sent out over the speaker 774 and the program then returns to the dormant screen 776.

If there is no active phone call at step 772, then the system determines whether the password protection function has been activated 778. If it has, then the password sub-menu is called 780 which requests that the user input the password. If the inputted password is valid 782, or if password protection is not on, then the stored greeting selected by the user is sent out over the speaker at step 784 and the main menu state is initialized 786. If a determination is made that the password inputted by the user is not valid, then the program returns to the dormant screen 776.

If, as discussed in connection with FIG. 7c, the main menu state is initialized at 786, the master touchscreen subroutine jumps to the initialization entry point 786 shown on FIG. 7d, which is a flow chart of the general Contextual State of the master touchscreen task or subroutine. After the initialization entry point, the system sends a "prompt" phrase over the speaker 788, such as "enter your selection", or any other phrase preselected by the user and stored as a data file on the system hard drive. The general Contextual State master touchscreen subroutine then loads the main menu screen and indicates the status of the menu options, if necessary 790. The speech recognition vocabulary, if applicable, is then loaded 792 and the system then sets the state to the current Contextual State entry point 794 and returns to the top of the Polling Loop 500.

The entry point into the general Contextual State master touchscreen subroutine from the Polling Loop is shown at step 796, also in FIG. 7d. The system then calls the Checktouch subroutine shown in FIG. 11 at step 798 and then calls the display cursor subroutine shown in FIG. 7e, at step 799. A determination is then made as to whether one of the boxes on the main menu has been touched 711. If none of the boxes have been touched, then the program returns to the top of the Polling Loop 500. Boxes are defined as areas on the screen which are marked off in some way to indicate the user should touch there to execute an action. For instance, the current maximum number of boxes a standard menu may have is 9. They are Back, Quit, and up to seven other choices. See, for example, FIG. 3a.

If one of the boxes has been touched, the program determines which of the boxes have been selected 713 and jumps to the appropriate point. If the Quit box has been touched, then the system returns to the dormant screen 715. If the Back box has been touched, a determination is made as to whether the system is to go back to the main menu 717. If the answer is affirmative, then the system returns to the main menu 719.

If the back function selected by the user does not refer to the main menu, that is, if there are prior sub-menus between the main menu and the current sub-menu, then the system removes the "screen time out"

from the ISIS, inserts a new "screen time out" ISIS event and sets the touch flag to 0 at step 721. The prior sub-menu or state is then initialized 723.

If, at step 713, the box selected, instead of being a function box such as the Quit or Back function is a menu selection box, then the program executes the selected action 725 and determines whether the action selected requires branching to a sub-menu 727. If a new sub-menu is required, then the system removes the current "screen time out" event from the ISIS and inserts a new "screen time out" ISIS event 729. That causes the next screen shown on the graphics display monitor to remain there until the current "screen time out" event is removed from the ISIS. The sub-menu selected by the user is then initialized 731.

If a negative determination is made at step 727, that is, the program is not going to display a new sub-menu, then the current highlighted box is blanked 733, thus removing the highlighting of the selected box on the touchscreen. The active touchscreen serial queue is then cleaned out 735 and the system returns to the top of the Polling Loop 500.

The display cursor subroutine called at step 799 of FIG. 7d is shown in FIG. 7e. After being called from a Contextual State of the master touchscreen subroutine at step 799, the display cursor subroutine starts at 737 and then makes a determination as to whether more touchscreen data is available 739. If there is more touchscreen data available, then the system returns to the top of the Polling Loop 500.

If no more master touchscreen data is available at 739, then the system pauses for a predetermined time, such as 0.25 seconds 741. A determination is then made as to whether more touchscreen data is available 743. If there is no more master touchscreen data available, then the cursor is erased at step 745 and a determination is made as to whether a box on the menu has been touched 747. If more master touchscreen data is available at step 743 or if no box has yet been touched at step 747, the system returns to the top of the Polling Loop 500.

If a box has been touched from the touchscreen at step 747, then the system highlights the touched box 749 and then returns to the calling subroutine 751.

FIGS. 7g through 7n depict a flow chart for the security floor plan sub-menus for the master touchscreen subroutine. At the initialization entry point 410, the user has selected a security/fire option from the main menu and has selected from the security management menu shown in FIG. 3g one of the three levels shown of the home. The security floor plan sub-menu subroutine then stores the selected floor number, loads the selected floor plan screen data, speaks a responsive phrase through the speaker and voice synthesizing system, such as "Please wait for response form the security system" and then displays a "please wait" message 412. The subroutine then sends a "zone map request" to the security/fire interface shown and described in connection with FIGS. 8a–8c, sets the Security/Fire Task to the "zone map request" state; and inserts a "security response expected" ISIS event into the ISIS queue 414. The Master Touchscreen Task state is then set 416 and the system returns to the top of the Polling Loop 500.

When a response to a zone map request occurs on queue 1 or 2 of the Polling Loop, the Security/Fire Task (Task 1 or Task 2) jumps ( at 898 in FIG. 8c) to the security floor plan sub-menu subroutine, entering at point 424. Touches occurring while the system is waiting for a response from the Security/Fire Interface will show a cursor 799, but will not be compared with the touch boxes on the menu.

From the zone map request entry point 424, the program then receives the type of result from the Security/Fire Task. (Steps 824, 846 in FIG. 8c; or step 1320 in FIG. 13c.)

Depending upon the result determined at step 426, the system may go directly to decode the armed or ready conditions of the security system and determine that the security system is armed or ready at step 428. Or, it may reach step 428 either directly or after informing the user of the response received at step 426. For example, if no response was received at step 426, the system speaks the phrase "no response" at 430 and then moves to step 428. If, on the other hand, an "unexpected response" was received at step 426, then the system will inform the user by speaking the phrase "unexpected response" 432, before moving onto step 428.

After step 428, at step 434, the "please wait" message displayed at step 412 is erased from the screen of the monitor and the system then jumps to the show zone status entry point 436 which is described at 303 on FIG. 7h.

FIG. 7h shows the entry points for the redisplay security floor plans function 301, the show zones, status 303 and the show security system status 305, in addition to continuing the flow chart from the substate decoder 438. When the redisplay security floor plans 301 is jumped to, the system sets the fade color to black, loads the floor plan screen according to the current floor number and then sets the fade color to normal 307. The show zones, status 303 entry point occurs after step 307. The program then decodes the zones, status 309 and marks the zones on the screen as well as displaying the status of any open or shunted zones 311. After step 311, the system reaches the show security system status point 305. The security floor plan sub-menu routine of the master touchscreen task then shows the armed or ready status on the screen of the monitor 313 and determines whether the user has previously selected a zone 315. If the user had selected a zone at step 315, the selected zone is marked 317 and the print zone status subroutine is called at 319. If no zone is selected at step 315, the phrase "no zone selected" is printed or displayed on the screen 321.

After the print zone status routine is called at step 319 or the phrase "no zone selected" is printed at step 321, the system inserts a "screen time-out" ISIS event and sets the touch flag to 0, at step 323. The state is then set to "analyze floor plan touches" at 325 and then turns to the top of the Polling Loop 500.

After the current substate is obtained from the substate decoder at 438, the system then analyzes whether any floor plan touches have been made. The Check-touch subroutine of FIG. 11 is first called at 798 and then a determination as to whether a box on the touchscreen has been touched is made at 711. If no box has been touched, then a determination is made as to whether a new zone has been touched at 440. If a new zone has been touched, then a determination is made as to whether the previous zone has been marked 442. If a previous zone has been marked, then the previous zone marker is erased at step 444 and the new zone is marked 446. In addition to marking the new zone, the Call Print Zone Status subroutine 753, shown in FIG. 7f, is called.

If an affirmative determination is made at step 440 that a new zone has been touched, then step 446 is executed, causing the marking of a new zone and the calling of the Print Zone Status subroutine 753. The system then pauses for 0.1 seconds 448 and then determines whether more master touchscreen data is available 450. If an affirmative determination is made, then the subroutine returns to the top of the Polling Loop 500. If no more master touchscreen data is available, then a determination is made as to whether a box has been touched on the current touchscreen 711a. If no box has been touched, then the subroutine returns to the top of the Polling Loop 500.

If a box has been determined to have been touched at step 711, then, depending upon the function box touched, the security floor plan sub-menu subroutine will jump to the appropriate step to effectuate that function 452. Thus, if the Quit box as shown in FIG. 3i has been touched, the subprogram will return to the dormant screen 715. If the Back box has been touched, also as shown in FIG. 3i, then the subroutine will remove the current "screen time out" ISIS event and insert new "screen time out" ISIS event 454. The subroutine will then initialize the security management sub-menu 456, which is shown in FIG. 3g and display it on the touchscreen monitor.

Figure 7G:
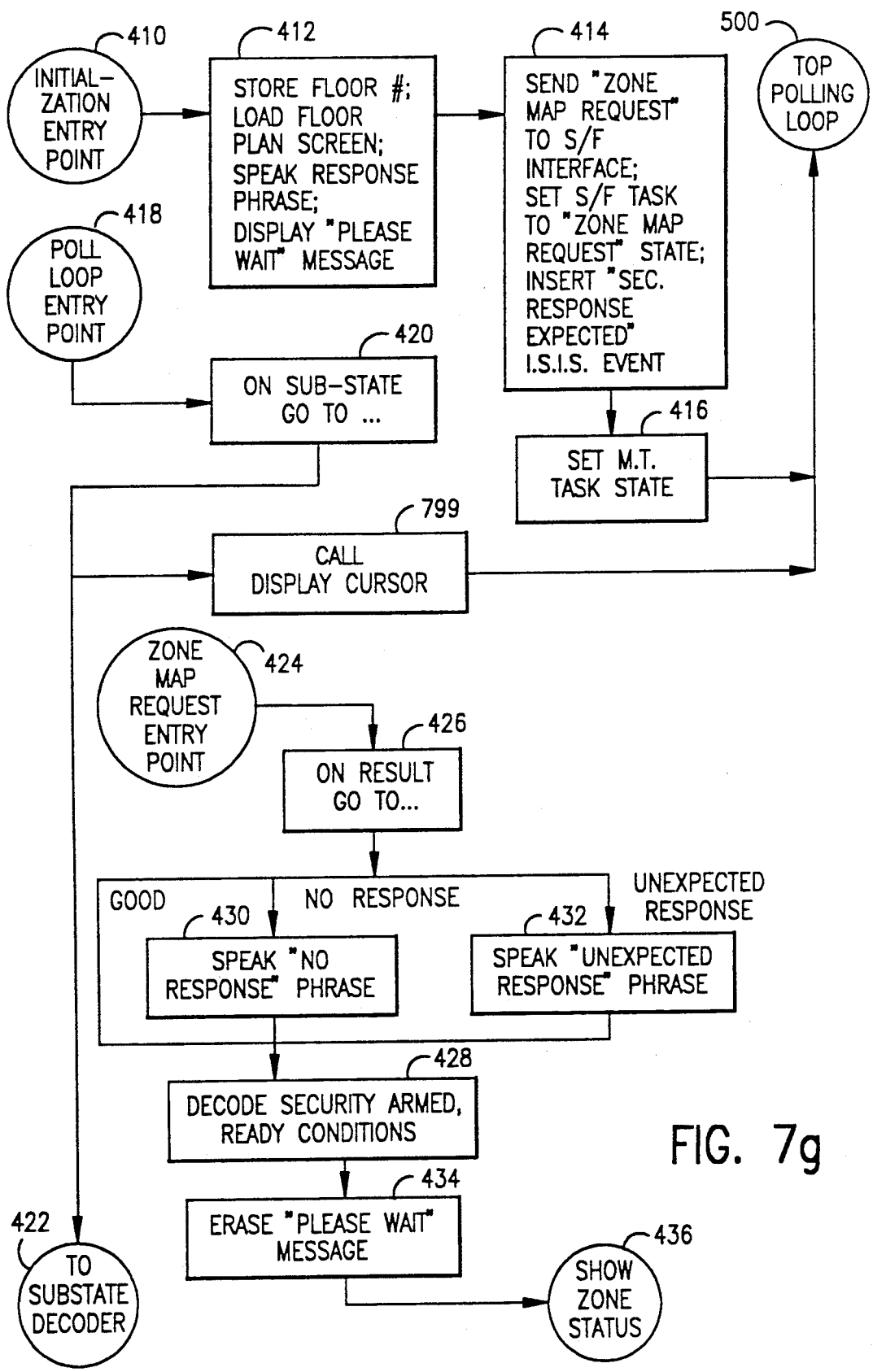
Figure 7J:
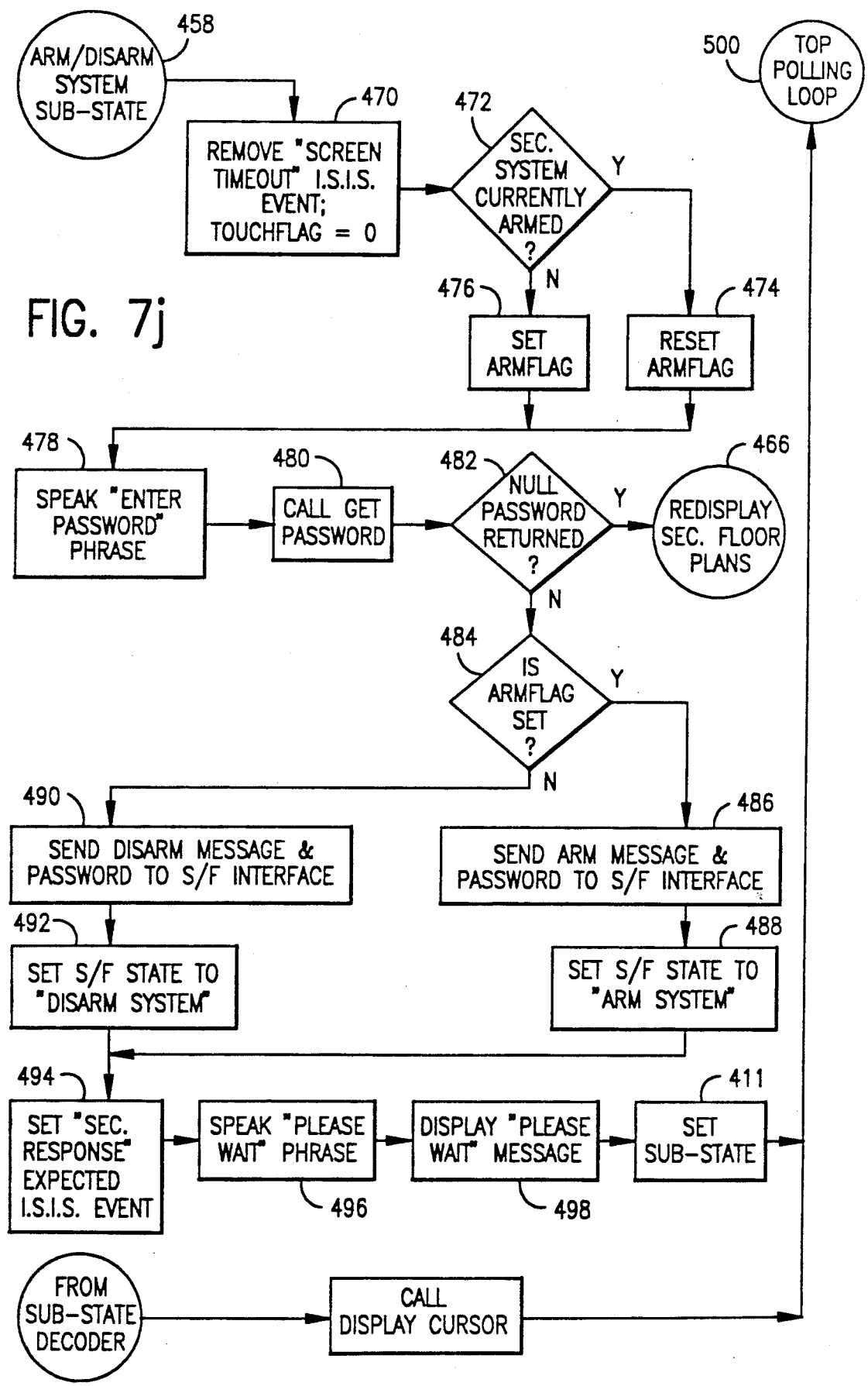

If the system arm/disarm function box has been selected at the box touched step 452, then the system jumps to the arm/disarm system substate or subroutine 458 which is shown in FIG. 7j. If the zone enable/disable function box was selected at step 452, then the system determines whether a zone has been selected at 460 and, if a zone has been selected, jumps to the shunt zone substate at step 462. If no zone has been selected at step 460, the subroutine returns to the top of the Polling Loop 500. If the highest alternate floor function box is selected at step 452, the subroutine sets the floor to the highest alternate floor at step 464 and then redisplays the selected security floor plan 466 (step 301 in FIG. 7h) on the touchscreen. If the lowest alternate floor function box has been selected at step 452, then the subroutine sets the floor to the lowest alternate floor 468 and then displays that security floor plan at step 466. (Step 301 in FIG. 7h)

The Print Zone Status subroutine 753 is shown in flow chart form in FIG. 7f. The subroutine initially erases any previous zone status message 755 and then prints the selected zone's number, name and current status 757. A determination is then made as to whether the selected zone is shunted (that is, disabled) and whether the enable/disable touch box shown for example in FIG. 3i displays the message "disable zone" 759. If the enable/disable touch box does display a "disable zone" message, then the "disable zone" touch box is replaced with the "enable zone" touch box 761. The subroutine then returns 763.

If a negative determination is made at step 759, then a determination is made at step 765 of whether the selected zone is not shunted and the enable/disable touch box displays the "enable zone" message. If the determination of that decision is negative, the program returns at 763. If, on the other hand, the determination of that decision is affirmative, then the "enable zone" touch box is replaced with the "disable zone" touch box 767 in a similar manner as described in connection with step 761. The program then returns 763.

If the arm/disarm system function box is selected at step 452, the security floor plan sub-menu subroutine branches to the arm/disarm system substate or subroutine 458 and first removes the current "screen time out" ISIS event and sets the touch flag to 0 at 470. A determination is then made as to whether the security system is currently armed 472. If the security system is currently armed, then the arm flag is reset at 474. If the security system is not currently armed, then the arm flag is set at 476. After the arm flag is either set or reset at steps 476 or 474, the voice synthesis system causes the speaker to transmit the phrase "Please enter your security pass code" to prompt the user to input the appropriate security system password so that the system will permit a change from the armed or disarmed state to the other. The user either speaks or in some other manner inputs the password and the subroutine then calls a Get Password subroutine 480 which captures the password. If no password is entered (a "null" password) 482, then the current security floor plan is redisplayed at 466.

If a password is captured by the home automation system, then a determination is made as to whether the arm flag is set 484. If the arm flag is set, then an arm security system message and the password are sent to the Security/Fire Interface. The Security/Fire Task state is then set to the "arm system" state 488 (step 899 in FIG. 8c). If it is determined that the arm flag is not set at step 484, then a disarm security system message and the captured password are sent to the Security/Fire Interface 490 and the Security/Fire Task state is then set to the "disarm system" state 492 (step 870 in FIG. 8c). After the setting of the Security/Fire Task state to either the "arm system" or "disarm system" states at 488 or 492, respectively, the subroutine sets the "Security Response Expected" ISIS event at 494 and informs the user to please wait by speaking that phrase 496 as well as displaying that message on the monitor 498.

The system then sets the appropriate Master Touchscreen Task state 411 and returns to the top of the Polling Loop 500. The Master Touchscreen Task state is set such that the substate decoder will cause any touches on the touchscreen to display a cursor, but the selected state will not compare touches with the touch boxes on the menu.

Once a result has been returned from the Security/Fire Task or ISIS event (step 880 in FIG. 8b, step 895 in FIG. 8c, step 1326 in FIGS. 13b and 13c), the system enters at point 491 and, depending upon the result 489, branches to one of six different places in the program. From point 489, the result can be determined to be good, which implies that the Security/Fire Interface has acknowledged the command, in which case the program then inserts a "wait for bad password" ISIS event 487, sets the substate to prevent any user actions 485 and then returns to the Polling Loop 500. If no "bad password" message is received from the Security/Fire Interface during the delay period, the ISIS event will return a result of "no bad password message during delay." The system then sends a zone map request to the Security/Fire Interface system interface, sets the Security/Fire Task state to "zone map request", sets a "security response expected" ISIS event 483, sets the appropriate substate 481 and then returns to the Polling Loop 500.

If no response is the result determined at point 489, then the system speaks the phrase "no response" at 479 and then redisplays the current security floor plan 466. That would occur, if, for example, the message to the Security/Fire Interface was garbled in transmission. If, on the other hand, a "bad password" result is returned, the system is caused to speak the phrase "unexpected response" at 475 and then redisplays the security floor plans at 466.

If the result at 489 is either "already armed" or "already disarmed", then the system determines whether the arm flag has already been set 473. If the arm flag had been set, then the phrase "already armed" is spoken to inform the user of that state at 471 and the current security floor plan is redisplayed 466. If the arm flag had not been set at 473, then the system speaks the phrase "already disarmed" at 469 and then redisplays the current security floor plan 466.

If the result at point 489 is the return of the zone map, then the system decodes the armed/disarmed status 467 and determines whether the system is armed or not at 465. If the system is armed, then the phrase "system armed" is spoken 463 and the current security floor plan is redisplayed 466. If the system is not armed at 465, then the phrase "system disarmed" is spoken 461 and the current security floor plan is redisplayed at 466.

If the shunt zone substate is selected at 462, as shown in FIG. 7i, then the program jumps to the shunt zone subroutine shown at point 459 in FIG. 7l. The shunt zone subroutine then removes the "screen time out" ISIS event and says that sets the touch flag to 0 457. A determination is then made as to whether the security system is currently armed at 455. If the determination of that decision is affirmative, then the system speaks the phrase "Please enter your security pass code" 453 so that the user may enter the appropriate password. The get password subroutine is called in order to capture the password entered by the user and then a determination is made as to whether a null password has been entered 451. If a null password has been entered at point 451, then the appropriate security floor plan is redisplayed 466. If the password entered is a potential password, then the shunt zone command and the password are sent to the security/fire interface 477 and the "security response expected" ISIS event and the zone number for the ISIS event are stored 449.

If, at step 455, a determination is made that the security system is unarmed, a shunt zone message is sent to the security/fire interface 447 and the ISIS event is set to "security response expected" and the zone number for the ISIS event is stored 449. After storing the zone number for the ISIS event, whether the security system is armed or unarmed, the shunt zone subroutine then proceeds to set the Security/Fire Task to the "shunt zone" state 445 and to inform the user to wait by both speaking the phrase "please wait for response form the security system" and by displaying "Please wait" as a message on the monitor screen 443. The appropriate Master Touchscreen Task substate is then set 441 to prevent further user actions until the security communication is resolved, and the program then returns to the Polling Loop 500.

The shunt zone substate is entered at point 439. Depending upon the result determined at 437, the subroutine then branches to one of several possible results. A first possible result is "good", which means that the Security/Fire Interface acknowledged the shunt zone command. A "wait for bad password" ISIS event is then inserted 487, the substate is then set 433 and the program returns to the Polling Loop 500. If the result at step 437 is that no response has been received, the system is caused to speak the phrase "no response" 479 and then redisplays the security floor plans.

If the result at step 437 is a bad password, then the "wait for bad password" ISIS event is removed 431 and the phrase "invalid password" is spoken 429. The program then redisplays the security floor plans. If the result at step 437 is in an unexpected response, then the system speaks the phrase "unexpected response" 475 and then redisplays the security floor plans.

If the result at step 437 is that no bad password has been detected, the Security/Fire Task state is set to "zone map request" and a zone map request is sent to the Security/Fire Interface 427. The ISIS event is set to "security response expected" 435 and then the Master Touchscreen Task substate is set 425 to prevent further user actions. The program then returns to the polling loop 500.

If the result at 437 is determined to be zone map returned, then a determination is made as to whether the current zone is now shunted 423. If the current zone is presently shunted, then the zone is shown as shunted on the touchscreen 421 and the system then decodes whether an armed or disarmed condition is present 419. If the current zone is not presently shunted, then the shunted indicator shown on the touchscreen is erased 417 and the program moves to the code the arm/disarm condition at 419.

The system then determines whether the security system is ready at 417. If the security system is ready, then a determination is made as to whether the security system was ready before the shunting occurred at 415. If the determination is made that the system was not ready before the shunting occurred, then the phrase "now ready" is spoken and the security floor plans subroutine continues to determine whether the security system is armed 411.

If a determination is made at point 417 that the security system is not ready, then a determination is made as to whether the security system was not ready before the shunting occurred 409. If the outcome of that determination is negative, then the phrase "now not ready" is spoken and the security floor plans subroutine then moves to a determination of whether the security system is armed at 411. In the event that the security system was not ready before shunting at 409 or whether the security system was ready before shunting at 415, the security floor plans subroutine then moves to determine whether the security system is armed at 411.

If the security system is armed at 411, then a determination is made as to whether the security system was already armed before the shunting 405. If that determination is negative, then the phrase "now disarmed" is spoken 403 and the system then determines whether the security system is armed 401.

If the determination at step 411 is that the security system is not armed, then a determination is made as to whether the security system was disarmed before the shunting occurred at 300. If the outcome of that determination is negative, the phrase "now disarmed" is spoken 302 and a determination is again made at 401 as to whether the security system is armed. If the outcome of the determination of whether the security system was disarmed before shunting at 300 is affirmative, the security floor plan subroutine then determines whether the security system is armed at 411. If the security system is armed at 411, then the current security floor plan is redisplayed 304.

If the security system is not armed at point 401, then the "please wait" message displayed on the screen is erased 306, the zone marker is erased and the current highlighted box on the screen is blanked at 308 and the system then displays the security system status at 310.

The redormant or return to dormant screen routine of the Master Touchscreen Task module is shown in FIG.

7o. From the redormant screen 312, the redormant subroutine turns off the voice response speakers 314 and then determines whether an outgoing telephone call is active 316. If an outgoing telephone call is active, then the system hangs up the phone 318. If no outgoing telephone call is active or after the system hangs up the telephone at 318, a determination is then made as to whether the video monitoring option is active at 320. If the video monitoring function is active, then the redormant subroutine turns off the video monitoring at 322. After turning off the video monitoring at step 322 or if there is no active video monitoring, the redormant subroutine loads the dormant screen 324 and then determines whether a telephone call is presently incoming 326. If the incoming telephone line is active, then the message "System is currently responding to a telephone call" is printed and the program returns to the top of the Polling Loop 500. If there is no incoming telephone call at step 326, then the Initrecognition subroutine is called 330 and the program then returns to the top of the Polling Loop 500.

Figure 7K:
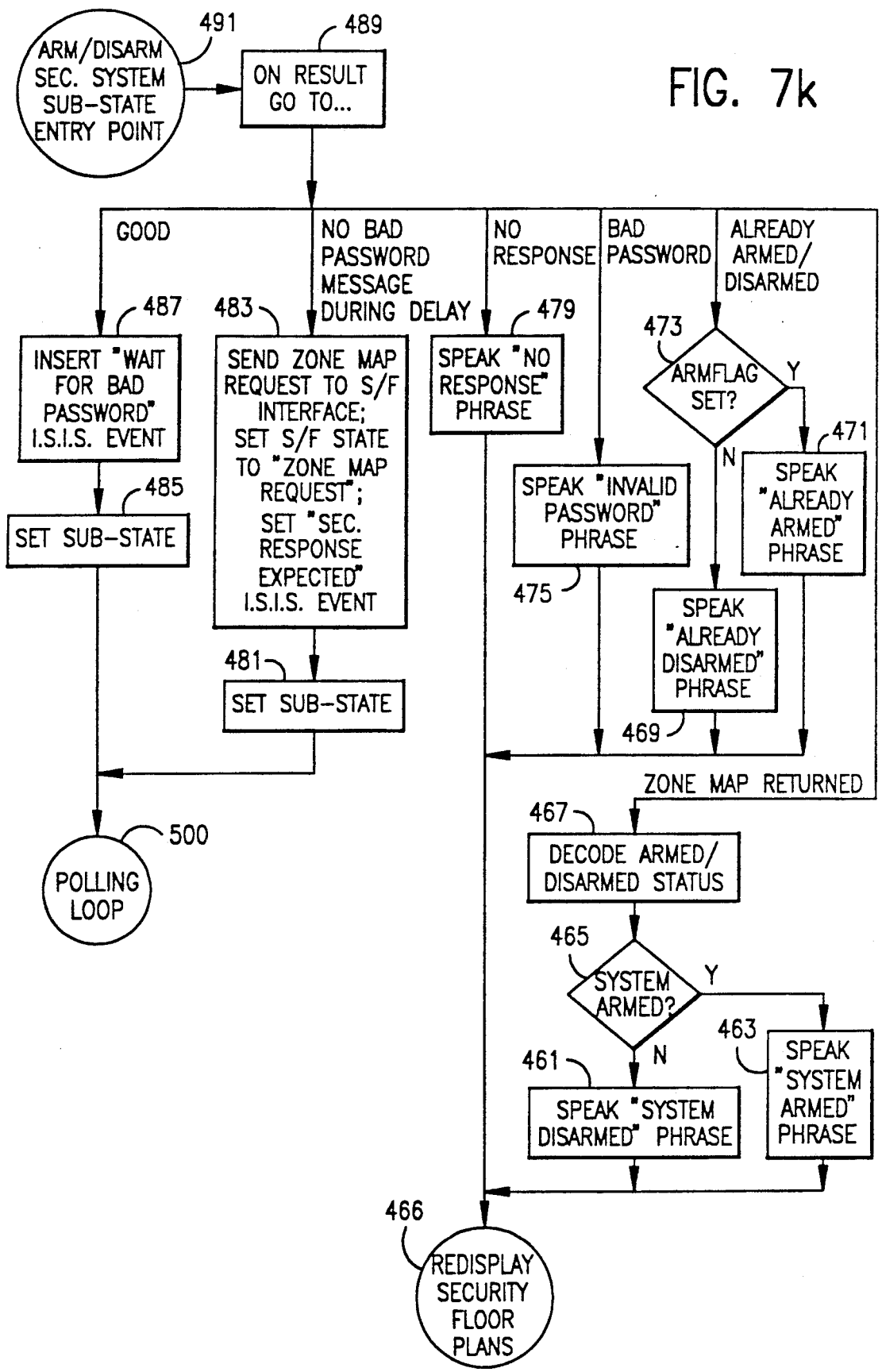
Figure 71:
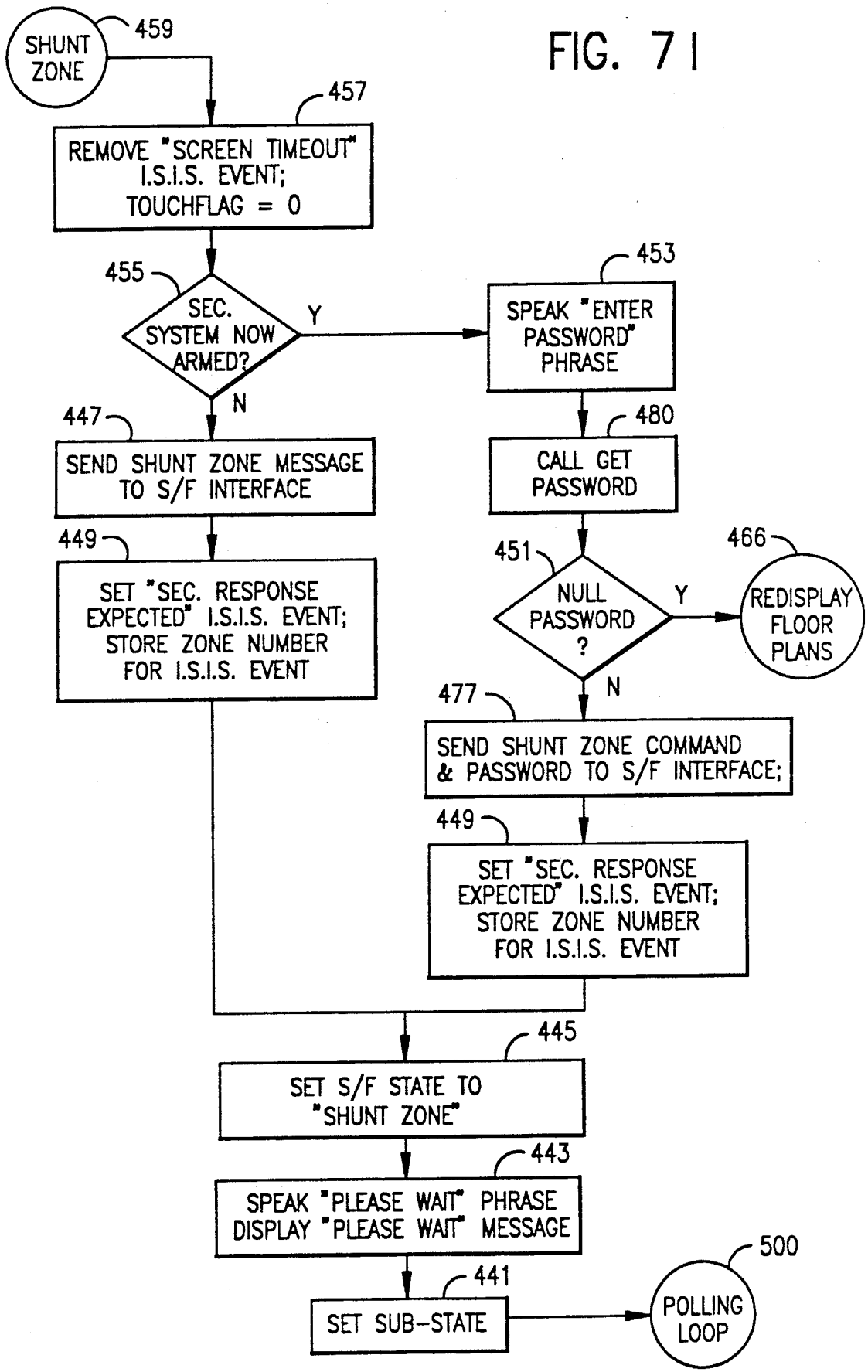
Figure 7M:
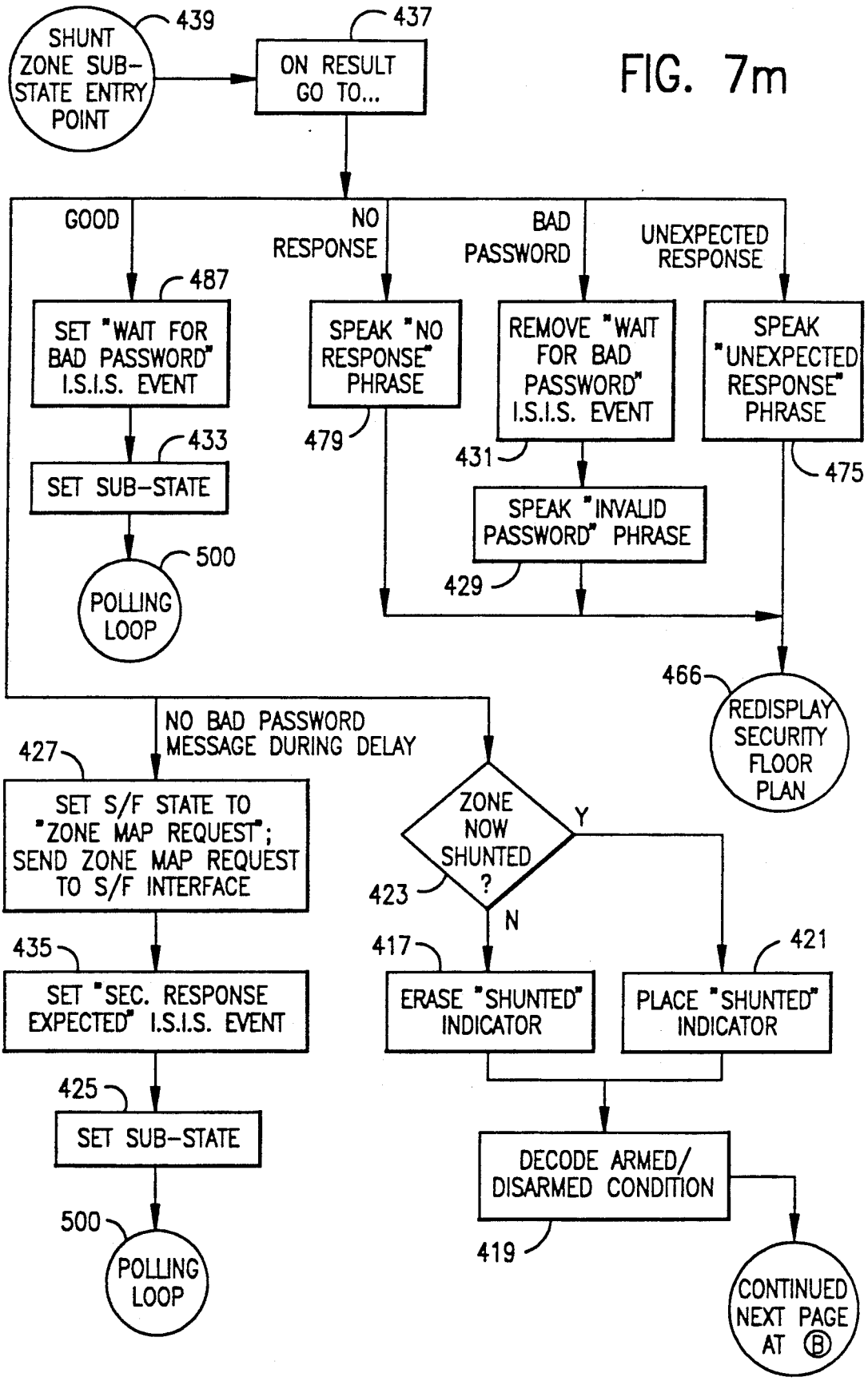
Figure 7N:
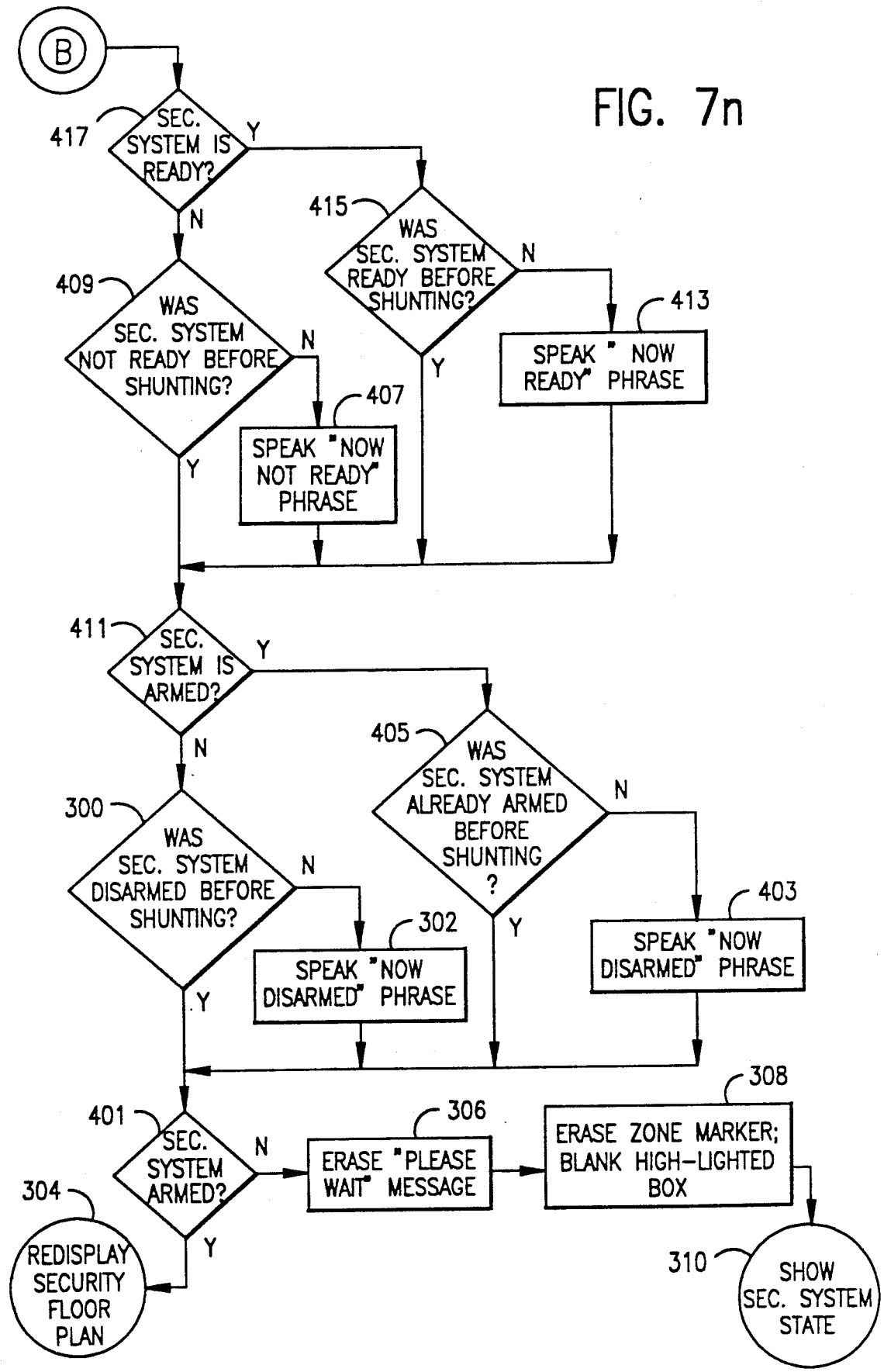
Figure 7O:
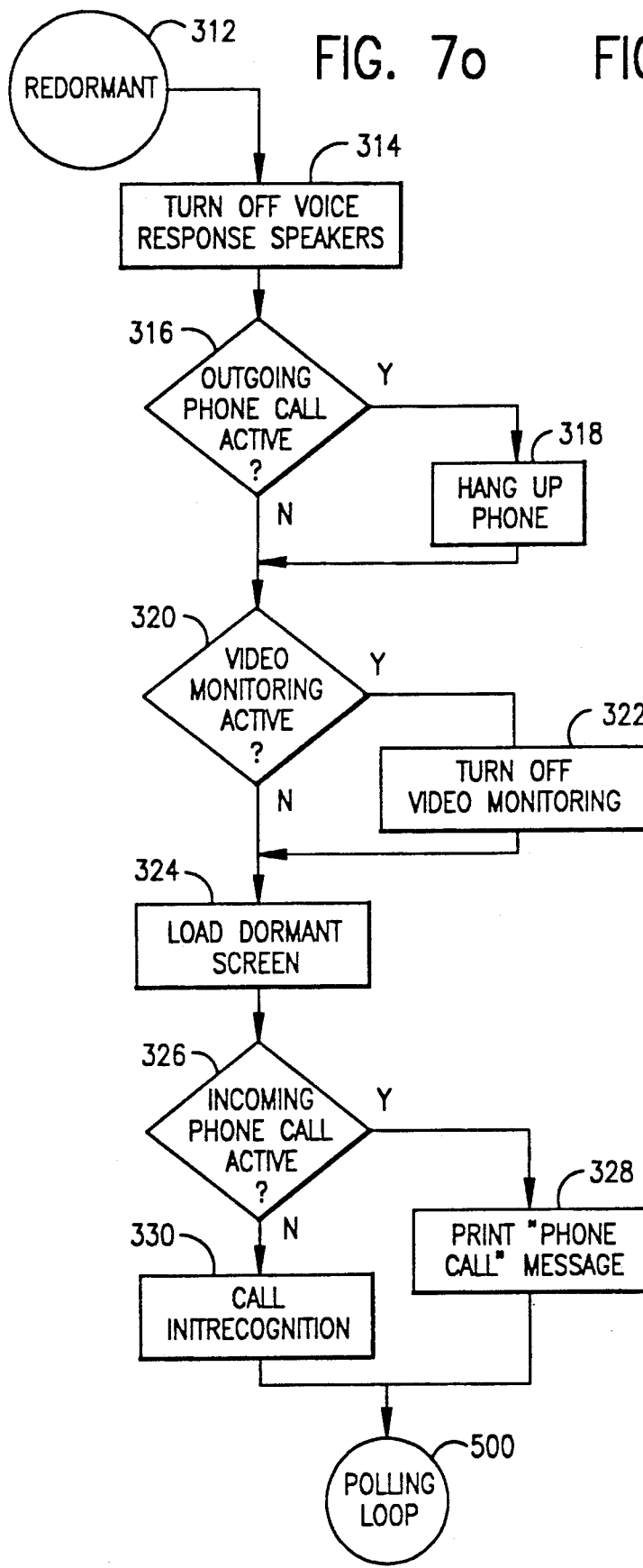
FIG. 7o is a flow chart of the redormant or return to dormant routine of the master touchscreen task module of the present invention.
Figure 7P:
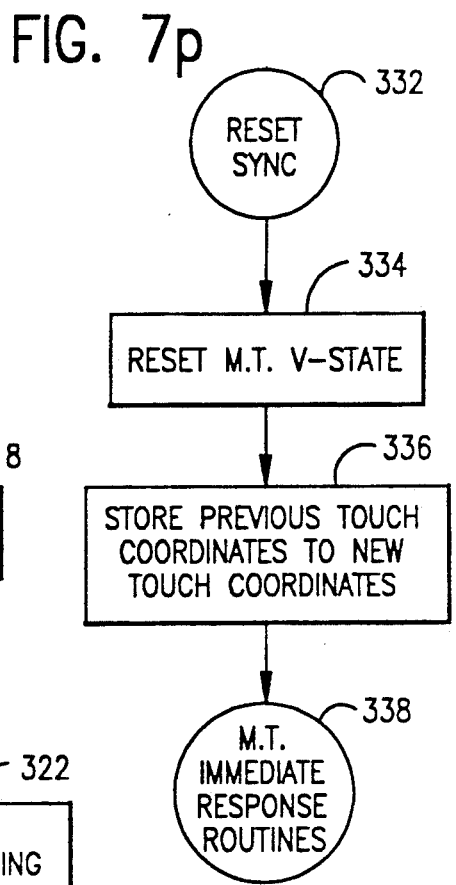
FIG. 7p is a flow chart showing the reset synchronization routine of the master touchscreen task module of the present invention.

FIG. 7p shows the Reset Synchronization routine 332 of the Master Touchscreen Task module. After the Reset Synchronization routine 32 is called, that subroutine resets the Master Touchscreen V-state 334 and then restores the previous touch coordinates to the new coordinates 336. The Reset Synchronization routine then jumps to the master touchscreen immediate response routine at point 338, allowing the immediate response routine to act upon the most recent touch before the touch that got out of synchronization.

Figure 8A:
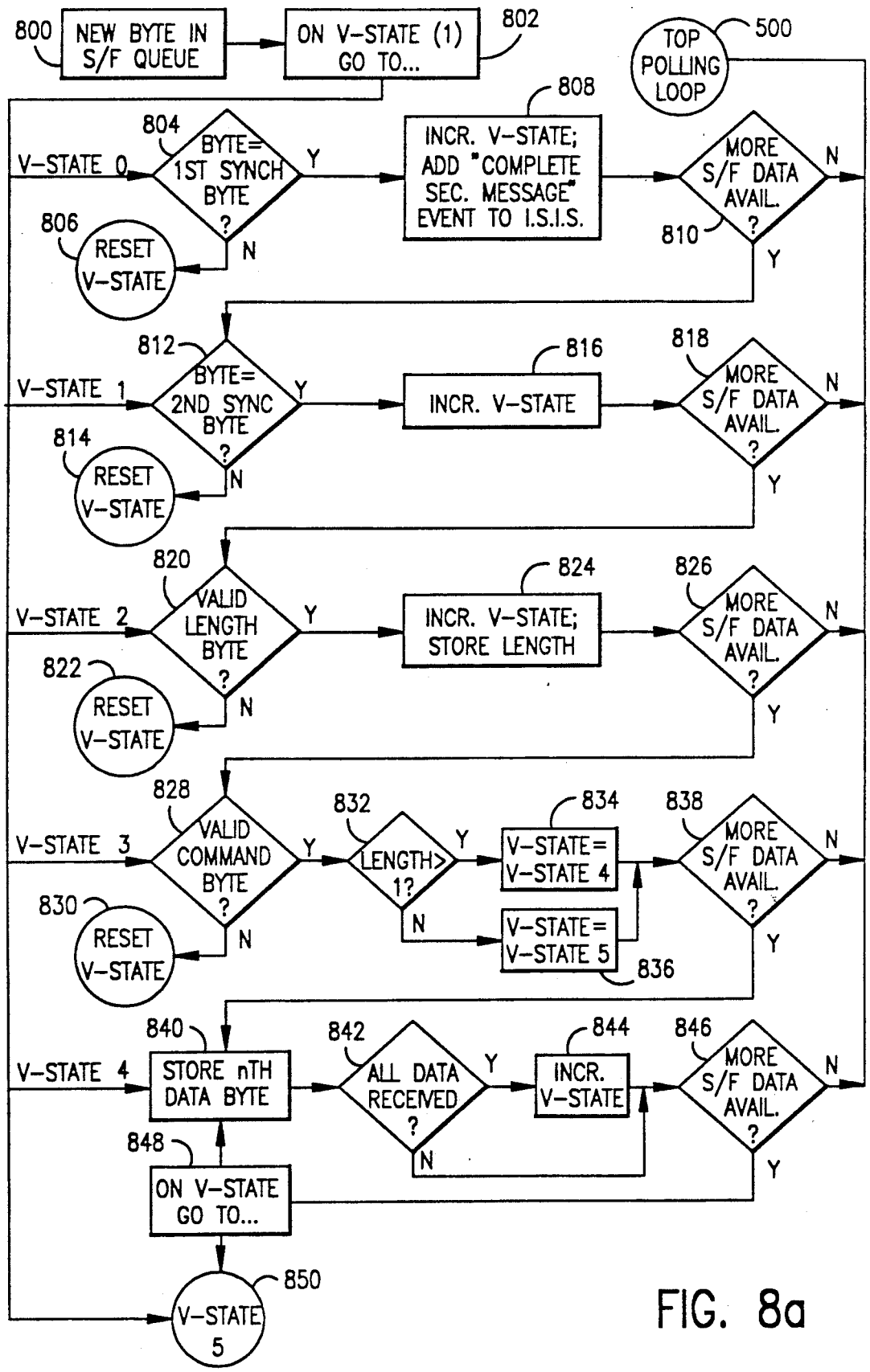
FIG. 8a is a flow chart showing the validation routine of the security/fire task of the present invention.
Figure 8B:
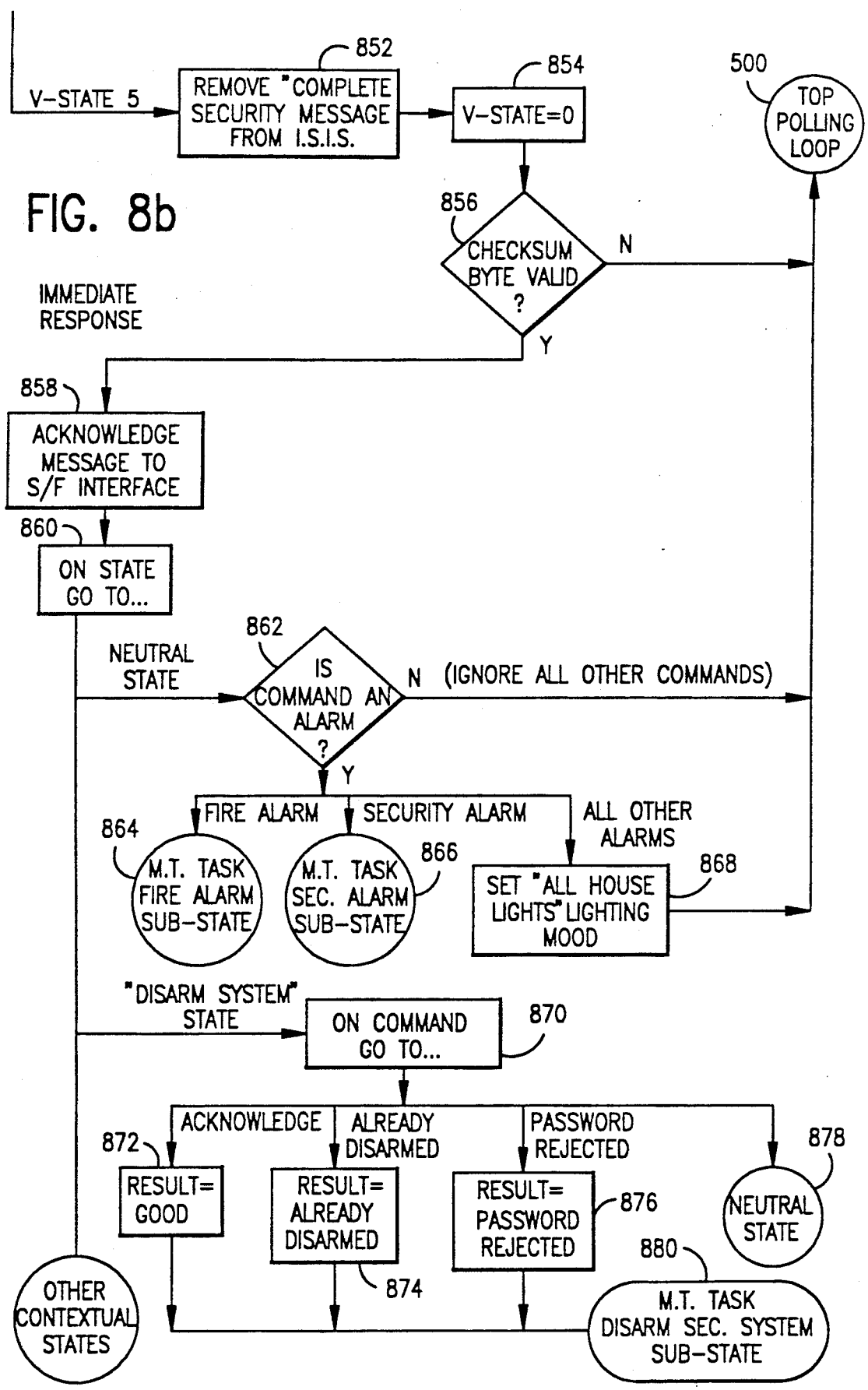
FIG. 8b is a flow chart showing the validation routine, immediate response, neutral and contextual states portions of the security/fire task of the present invention.

The Validation subroutine for the Security/Fire Interface program is shown in FIGS. 8a and 8b. When it is determined that a new byte is in the Security/Fire Interface queue 800, the validation subroutine, depending upon its current V-state 802, branches to one of several places in the Validation subroutine. If the V-state is 0, then a determination is made as to whether the byte is equal to the first synchronization byte 804. If it is not, then the V-state is reset 806. If the determination at step 804 is affirmative, then the Validation subroutine increments the V-state and inserts a "complete security message" ISIS event 808. The subroutine then determines whether more Security/Fire Interface data is available 810. If there is no more Security/Fire Interface data available, then the subroutine returns to the top of the Polling Loop 500.

If it is determined that more Security/Fire Interface data is available at step 810 or if the current V-state is V-state 1, then a determination is made as to whether the byte is equal to the second synchronization byte 812. If it is not, then the V-state is reset 814. If the current byte is equal to the second synchronization byte, then the subroutine increments the V-state 816 and determines whether more Security/Fire Interface data is available 818. If there is no more Security/Fire Interface data available then the program returns to the top of the Polling Loop 500.

In the event that there is more Security/Fire Interface data available at step 818 or if the V-state upon receiving a new byte in the Security/Fire Interface queue is V-state 2, as determined at step 802, then a determination is made as to whether the incoming byte is a valid length for a message 820. If it is not, then the V-state is reset 822. If the new byte in the Security/Fire Interface is of valid length, then the V-state is incremented by one and the length byte is stored 824. A determination is next made as to whether more Security/Fire Interface data is available 826. If there is no more Security/Fire Interface data available, the program returns to the top of the Polling Loop 500.

In the event that there is more Security/Fire Interface data available at step 826, or in the event that at the V-state determination 802, the current state is V-state 3, a determination is made as to whether a valid command byte is present 828. If no valid command byte is present, the V-state is reset 830. If a valid command byte is present, a determination is made at step 832 as to whether the length is greater than 1. If the outcome of that determination is affirmative, then the V-state is set at step 834 to V-state 4. If the determination of the length at step 832 is such that the length is less than 1, then the V-state at step 836 is set to V-state 5. After the V-state is set to either V-state 4 or V-state 5 at steps 834 or 836, respectively, a determination is again made as to whether more Security/Fire Interface data is available 838. If no more Security/Fire Interface data is available at step 838, then the program returns to the top of the Polling Loop 500.

If more Security/Fire Interface data is available at step 838 or if the current V-state at step 802 is determined to be V-state 4, then the data byte is stored 840 and a determination is made as to whether all data has been received from the Security/Fire Interface 842. If all data has been received from the Security/Fire Interface, then the V-state is incremented by one at step 844 and a decision as to whether more Security/Fire Interface data is pending is made at step 846. If it is determined at step 842 that all data has not been received, then the Validation subroutine moves directly to step 846 to determine whether more Security/Fire Interface data is available. If no more security/fire data is available at step 846, then the program returns to the top of the Polling Loop 500.

If the answer to the query at step 846 is that more Security/Fire Interface data is available, then the program goes to step 848, stores the nth data byte at step 840 and then goes to V-state 5. Obviously, as set forth in FIG. 8a, if at step 802 the current state is V-state 5, then the program would branch directly to V-state 5 at 850.

As shown in FIG. 8b, from V-state 5 at step 850, the program then removes the "complete security message" from the ISIS 852 and sets the V-state back to 0 at 854. A determination is then made as to whether the checksum byte is valid 856. If the checksum byte is not valid, then the program returns to the top of the Polling Loop 500. If the checksum byte is determined to be valid at step 856, then the program moves into the immediate response portion of the Security/Fire Interface subroutine and acknowledges the message received to the Security/Fire Interface 858. A determination is then made of the current state of the Security/Fire Interface, whether it is in the Neutral State, the "disarm system" or other Contextual States, at step 860. If it is in the Neutral State, the program proceeds to determine whether the current command is an alarm at 862. All commands that are not alarms are ignored and the program returns to the top of the Polling Loop 500.

If the current command is determined to be an alarm at step 862 then, depending upon the type of alarm, the program will branch to one of three places. If the command at 862 is a fire alarm, then the program branches to the Master Touchscreen Task fire alarm substate 864. If the command is determined to be a security alarm, then the program branches to the Master Touchscreen Task security alarm substate 866. If the command at step 862 is not a fire alarm nor a security alarm, then the program sets the lighting mood preset for "all house lights" 868 and then jumps to the top of the Polling Loop 500.

If the state at step 860 is to determined to be the "disarm system" state, then the program determines what type of command was received at step 870 and branches to the appropriate point. If the command received in the disarm system state is an acknowledgment, then the program sets the result equal to good at step 872 and then jumps to the Master Touchscreen Task disarm security system substate 880. (Step 491 at FIG. 7k) If the command at step 870 determines that the system has already been disarmed, then the result is set to already disarmed at step 874 and the program then jumps to the master touchscreen disarm system substate at step 880. If the command at step 870 is determined to be the rejection of the password inputted by the user, then the result is set to equal password rejected at step 876 and the program then moves to step 880. (Step 491 at FIG. 7k) If the command at step 870 is not one of the three commands already discussed, then the program goes to the Neutral State at step 878.

Figure 8C:
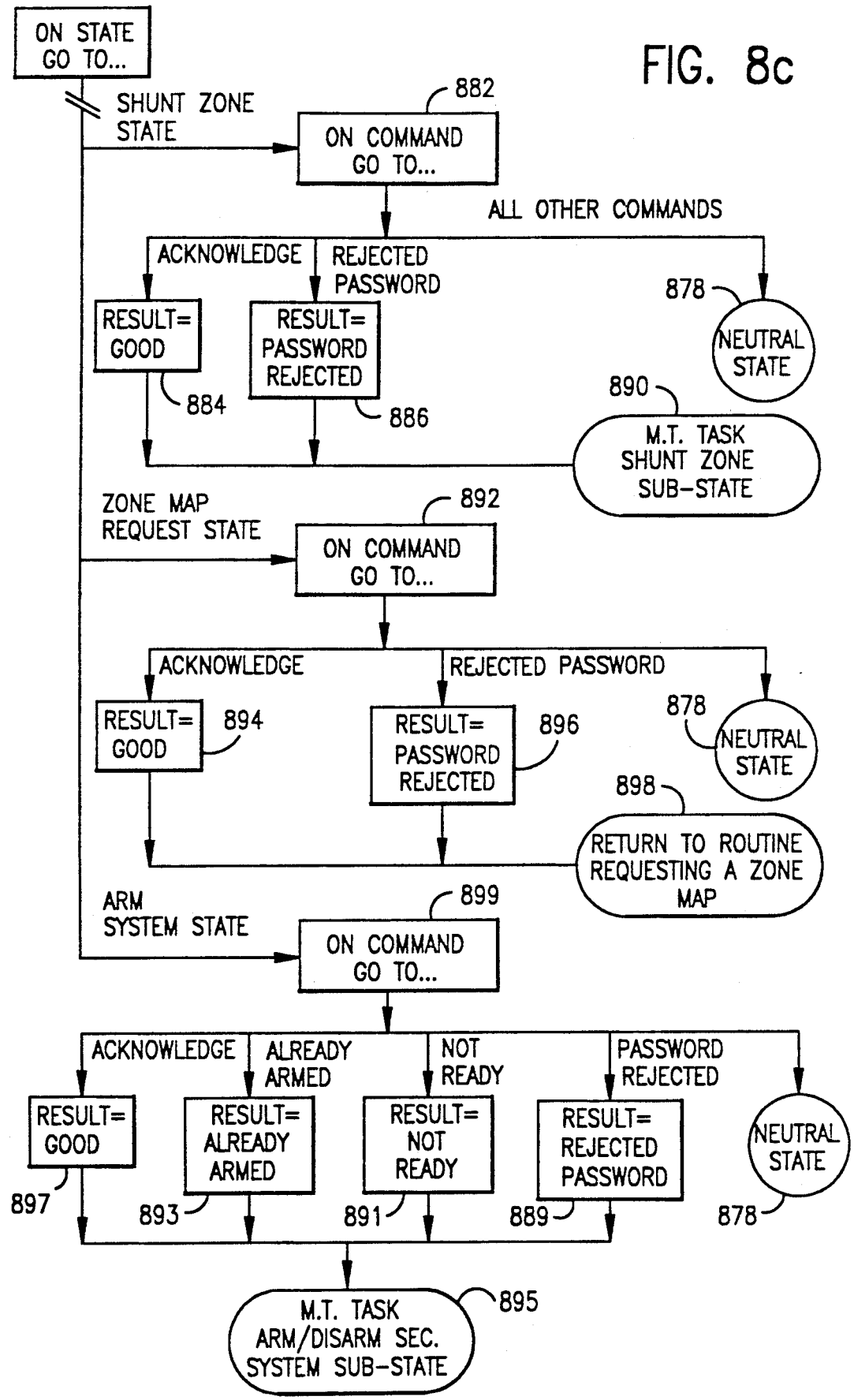
FIG. 8c is a flow chart showing additional contextual state functions of the security/fire task of the present invention.

The other Contextual States in addition to the disarm system state are shown on FIG. 8c. If, at step 860, the state is determined to be a shunt zone state, then the program determines which command within the shunt zone state has been received at step 882 and takes appropriate action. If an acknowledge command has been received at step 882, then the result is set to good at step 884. If the command step at 882 is determined to be a rejected password, then the result is set to equal rejected password at step 886. After the receipt of an acknowledge or rejected password (a rejected password is the same as a "bad password" in FIG. 7k) command and the setting of the result at steps 884 or 886, the program proceeds to the Master Touchscreen Task shunt zone substate 890 (FIG. 7m, step 439). For all other commands received at step 882, the program executes the Neutral State 888.

If the state at step 860 is determined to be the zone map request state, then a determination is made at step 892 of whether the command received is an acknowledge or rejected password or any other command. If the command received is an acknowledge command, then the result is set to good at 894 and the program returns to the routine requesting the zone map 899. If a rejected password command is received as step 892, then the result is set to equal rejected password (a rejected password is the same as "bad password" in FIG. 7m) at step 896 and the program then returns to the routine requesting the zone map 898. For all other commands received at step 892, the program returns to its Neutral State 878.

Lastly, if the Contextual State determination at step 860 indicates that the current state is the arm system state, then a determination is made at step 899 as to which command has been received. If an acknowledge command has been received at step 899, then the result is set to good at step 897 and the program then goes to the master touchscreen task arm/disarm security system substate 895. If the command received at step 899 is the already armed command, then the result is set to equal already armed at step 893 and the program then goes to the Master Touchscreen Task arm/disarm security system substate 895. If the command at step 899 is determined to be not ready, then the result is set equal to not ready at step 891 and the program then proceeds to step 895. If the command at step 899 is determined to be the password rejected command, then the result is set equal to rejected password (a rejected password means the same as "bad password" in FIG. 7k) and the program goes to the Master Touchscreen Task arm/disarm security system substate 895. (Step 491 in FIG. 7k) If the command at step 899 is determined to be any other command than those previously discussed, then the program executes to the Neutral State 878.

Figure 13A:
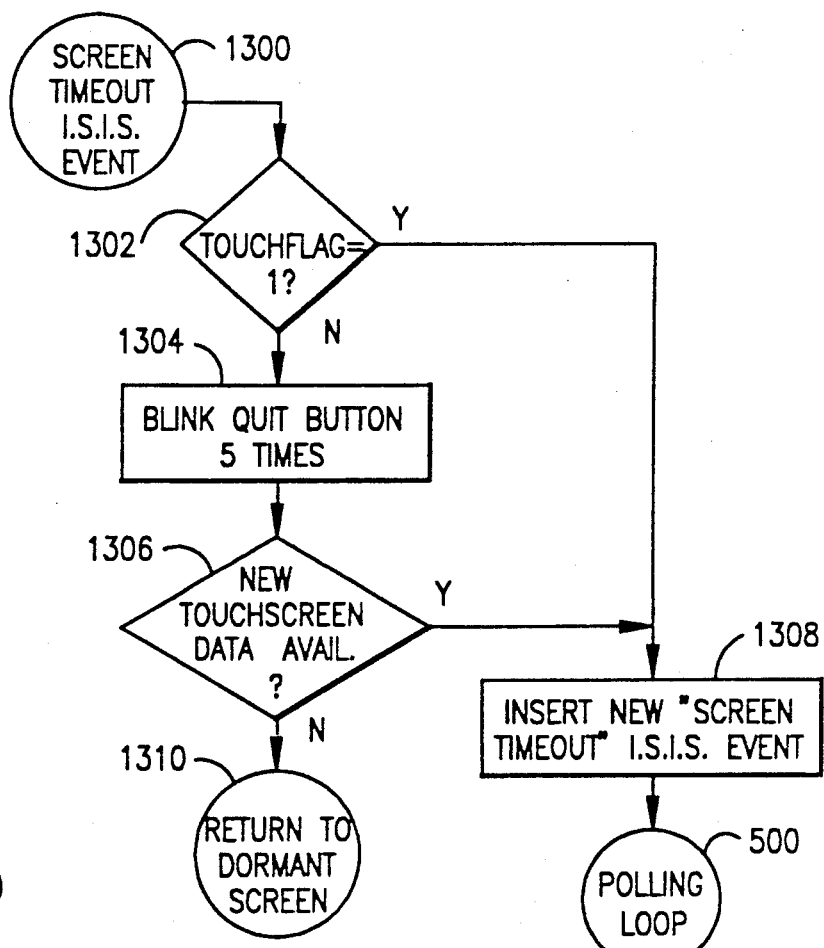
FIG. 13a shows a flow chart of the screen time-out subroutine of the ISIS events module for use with the present invention.

FIGS. 13a thru d show flow charts of the various components of the ISIS events system. Referring first to FIG. 13a, the screen time-out subroutine of the ISIS events system is shown.

When a screen time-out ISIS event is called, the program jumps to the screen time-out ISIS event entry point 1300. A determination is then made as to whether the touch flag is equal to 1 at 1302. If the touch flag is equal to 1, a new "screen time-out" ISIS event is inserted at 1308, the touch flag is set to 0, and the subroutine returns to the top of the Polling Loop 500.

If a determination at step 1302 is made that the touch flag is not equal to 1, then the Quit box on the touchscreen is blinked five times at point 1304. A determination is then made as to whether new touchscreen data is available at step 1306. If new touchscreen data is available, the a new "screen time-out" ISIS event is inserted 1308 and the subroutine returns to the Polling Loop 500. Inserting a new "screen time-out" ISIS event serves to maintain the present screen on the video monitor.

If new touchscreen data is not available at step 1306, then the subroutine returns to the dormant screen 1310.

Figure 13B:
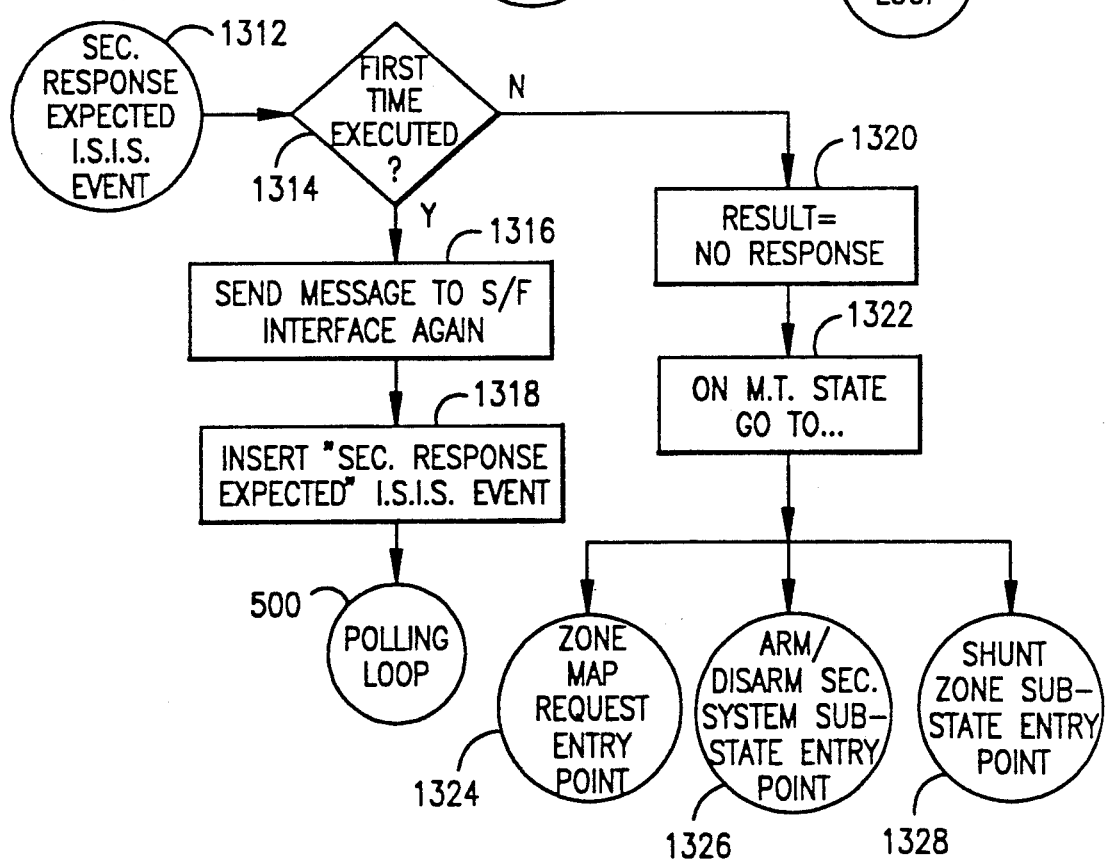
FIG. 13b shows a flow chart of the security response expected subroutine of the ISIS event module of the present invention.

FIG. 13b is a flow chart showing the Security Response Expected subroutine of the ISIS events system. After jumping to the security response expected ISIS event at 1312, the system determines whether this is the first time a security response expected ISIS event is being executed for that message at 1314. If it is the first time for execution of that event, the message is sent to the Security/Fire Interface again at step 1316 and a "security response expected" ISIS event is inserted at step 1318. The subroutine then returns to the Polling Loop 500.

If at step 1314 it is determined that the detected security response expected ISIS event is not being executed for the first time, then result is set to equal "no response" at 1320 and, depending upon the current master touchscreen state determination at step 1322, the subroutine jumps to the zone map request entry point (step 424 in FIG. 7g) at 1324, the arm/disarm security system substate entry point (step 491 in FIG. 7k) at 1326 or the shunt zone substate entry point (step 439 in FIG. 7m) at 1328.

Figure 13C:
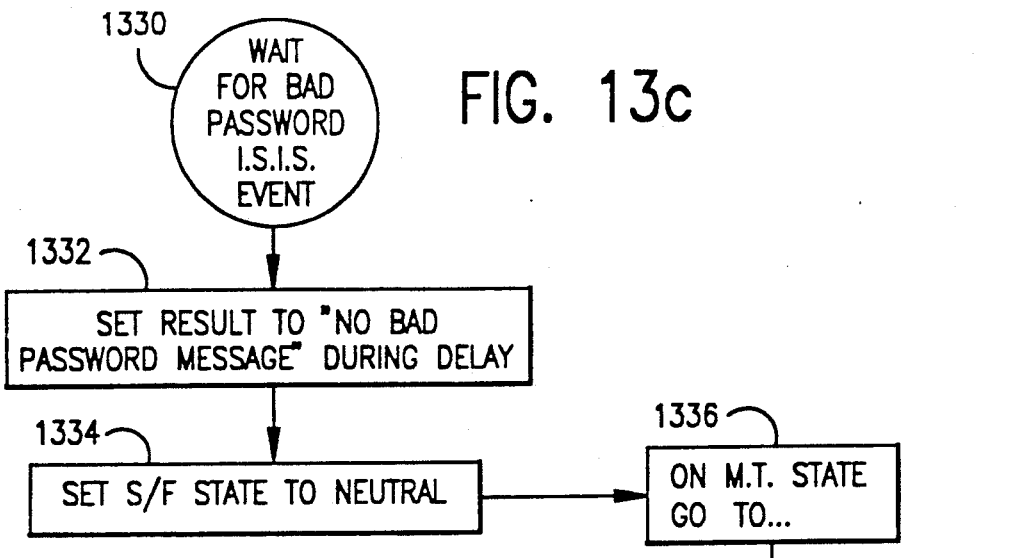
FIG. 13c shows a flow chart for the wait for bad password subroutine of the ISIS event module of the present invention.

FIG. 13c shows the flow chart for the Wait For Bad Password subroutine of the ISIS events. When a "wait for bad password" ISIS event is detected at 1330, the subroutine sets the result to "no bad password message" during delay 1332 and then sets the Security/Fire Task state to Neutral 1334. A determination is then made of the current master touchscreen state 1336. Depending upon the current state, the system either then moves to the arm/disarm security system substate entry point 1326 or to the shunt zone substate entry point 1328.

Figure 13D:
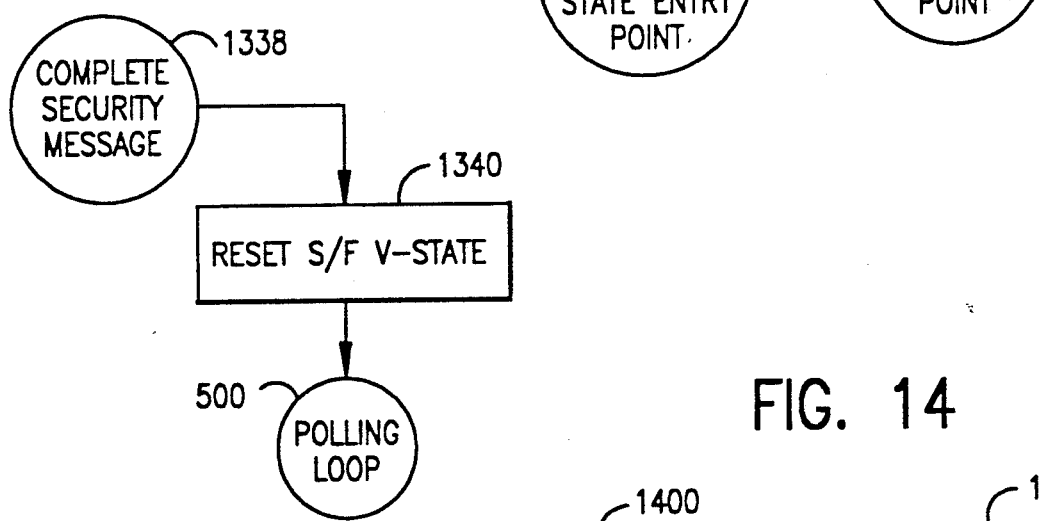
FIG. 13d shows a flow chart of the complete security message subroutine of the ISIS event module of the present invention.

FIG. 13d shows a flow chart of the Complete Security Message subroutine of the ISIS event system. Upon detecting a complete security message as an ISIS event at 1338, the system resets the security/fire V-state 1340 and then returns to the top of the Polling Loop 500.

This is used to prevent incomplete messages from the Security/Fire Interface from disabling subsequent messages.

Figure 14:
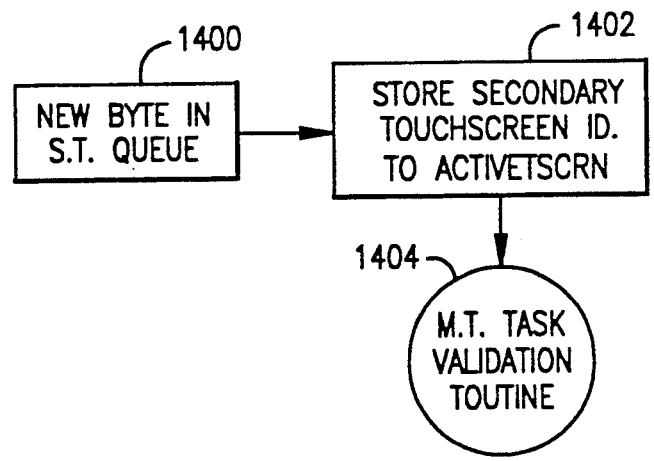
FIG. 14 shows a flow chart of the secondary touchscreen task module for use with the present invention.

FIG. 14 is a flow chart showing the operation of a Secondary Touchscreen Task module. The Secondary Touchscreen Tasks are empty shells which serve only to pipe their data to the Master Touchscreen Task. Although not shown explicitly in the master touchscreen flow charts, the Master Touchscreen Task pulls data from whatever queue corresponds to the current active touchscreen. Thus, any secondary task may use the master touchscreen routines by simply identifying itself as the current active touchscreen and then jumping into the master touchscreen validation routines. The variable used to identify the current active touchscreen is ACTIVETSCRN.

At the Secondary Touchscreen Task, a determination is first made as to whether a new byte is present in the secondary touchscreen queue 1400. The secondary touchscreen identifier is then stored to the variable ACTIVETSCRN 1402 and then the system jumps to the Master Touchscreen Task validation routine 1404.

The following discussion describes the Arm/Disarm Security System algorithm, assuming no errors occur.

After the setting of the security/fire state to either the "arm system" or "disarm system" states at 488 or 492, respectively, the subroutine sets the "Security Response Expected" ISIS event at 494. The Security/Fire Interface then sends an acknowledgment at 858.

The Security/Fire Task sets the result to "good" 872 and then jumps to the arm/disarm security system entry point 872 in FIG. 8b or point 897 in FIG. 8c.

Since the result is now set to "good", a "wait for bad password" ISIS event is inserted as shown in FIG. 7k at point 487. The master touchscreen substate is set to show a cursor at 485 but not to compare any touches with the function boxes shown on the touchscreen. The purpose for the "wait for bad password" ISIS event is to allow the Security/Fire Interface time to respond with a "bad password" message in the event that the password sent is invalid.

In the event that the password sent was an invalid password, then the Security/Fire Interface will send a "bad password" message, as shown on FIG. 8b at step 876 and FIG. 8c at step 889. If the Security/Fire Task receives a bad password message, then it will set the result equal to "bad password" and jump to the arm/disarm security system entry point at 876 in FIG. 8b or point 889 in FIG. 8c. If the result is a "bad password", then the system is caused to speak the phrase "Security system reports an invalid password. Please try again", at step 475 in FIG. 7k.

Once the "wait for bad password" ISIS event times out at step 1330 in FIG. 13c, the result will be set to "no bad password message during delay" at step 1330, the Security/Fire Interface state will be set to Neutral at step 1334 and the system will then jump to the arm/disarm security system entry point 1326.

Since the result is "no bad password message during delay", a zone map request is sent to the Security/Fire Interface at step 483 in FIG. 7k and the substate is set to prevent touches from initiating any new action, as described earlier in connection with FIG. 7k, step 483. Those steps are performed in order to determine the current armed or ready state of the security system.

The Security/Fire Interface then sends the requested zone. The Security/Fire Task sets the result equal to "zone map returned" and jumps to the arm/disarm security system entry point at FIG. 8c, steps 894 and 898. The zone map is returned prior to step 467 in FIG. 7k.

Depending upon the various combinations of current and previous armed and ready conditions of the security system, the system continues, and, by performing steps 467, 465, 463 and 461, informs the user of any changes.

The following describes the Enable/Disable Security Zone algorithm, assuming no errors occur.

Referring to FIG. 7o, if the system is armed, at 455, the shunt zone command, zone number and password are sent to the Security/Fire Interface at step 477. If, alternatively, the system is disarmed, then only the shunt zone command and zone number is sent to the Security/Fire Interface at step 447. The "Security Response Expected" ISIS event is set at step 449 and the Security/Fire Interface sends an acknowledgment.

The Security/Fire Task sets the result to good at step 884, in FIG. 8c. That Task then jumps to the shunt zone substate entry point from step 890.

Since the result is set to "good", a "wait for bad password" ISIS event is inserted at step 487 in FIG. 7m and then the master touchscreen substate is set to show a cursor but not compare user touches with the display boxes, at step 433. The purpose of the "wait for bad password" ISIS event is to allow the Security/Fire Interface time to respond with a "bad password" message in the event that the password sent is invalid, or the security system was armed and no password was sent with the shunt zone command.

If the password sent was an invalid password, then the Security/Fire Interface will send a "bad password" message. If the Security/Fire Task receives a bad password message, then it will set the result equal to "bad password" at step 886 in FIG. 8c and jump to the shunt zone substate entry point from step 890.

If the result is "bad password", then the system speaks "Security system reports an invalid password. Please try again" at step 429 in FIG. 7m.

Once the "wait for bad password" ISIS event times out, it will set the result equal to "no bad password message during delay" at step 332 and then jump to the arm/disarm security entry point at step 1328, in FIG. 13c.

FIGS. 15a-15d show the various routines associated with the Input/Output Task module.

Figure 15A:
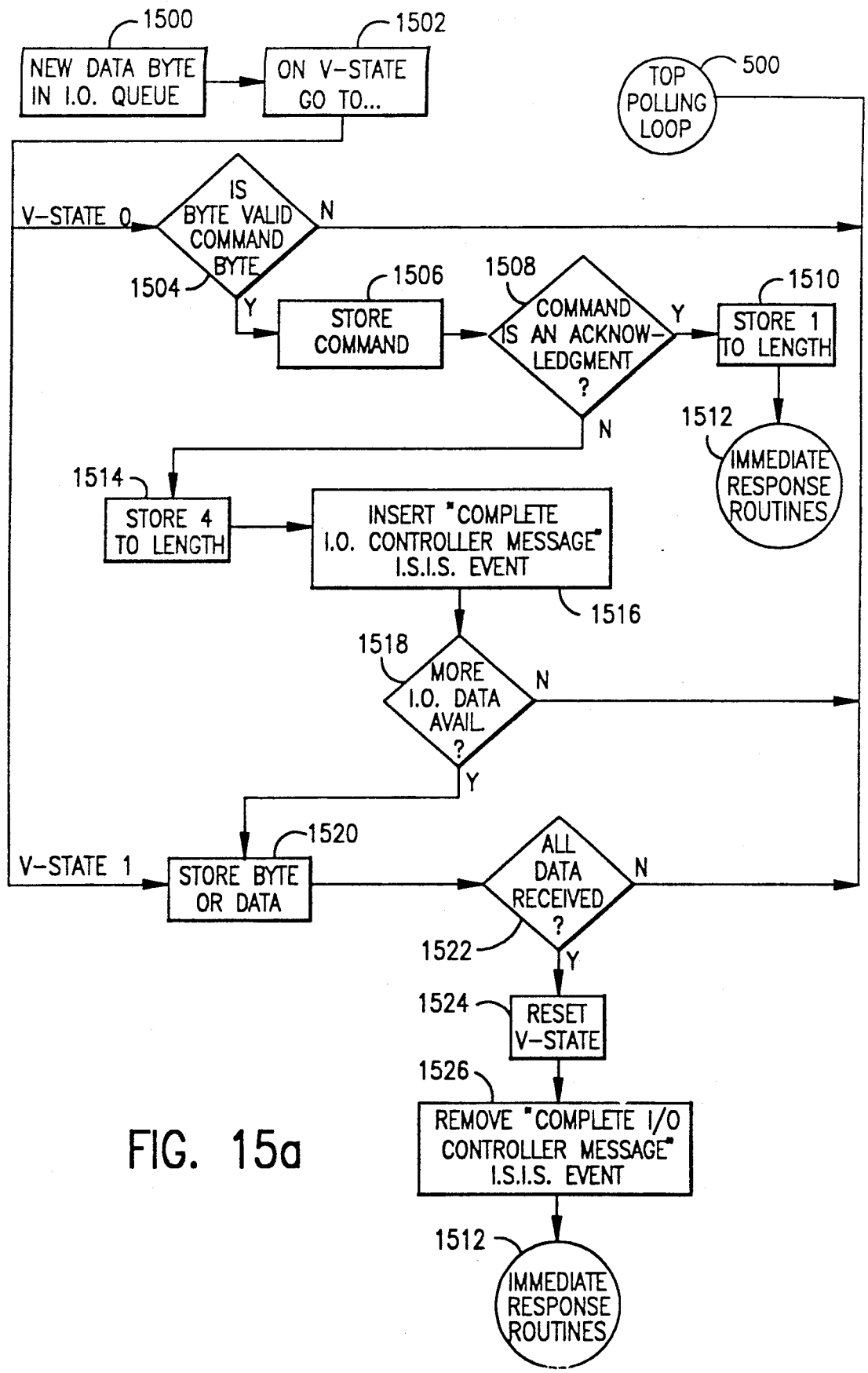
FIG. 15a shows a flow chart of the validation routine of the input/output task module of the present invention.

FIG. 15a shows a flow chart of the Validation routine of the Input/Output Task. Upon determining that a new data byte is present in the input/output queue 1500, a determination is made of the current V-state 1502 to which the program then jumps. If the current V-state at 1502 is V-state 0, then a determination is made as to whether the new data byte in the input/output queue is a valid command byte 1504. If the current byte is a valid command byte, the command is stored 1506 and then a determination is made as to whether the stored command is an acknowledgment 1508. If the stored command is an acknowledgment, then the value of 1 is stored to the variable length 1510 and then the system jumps to the Immediate Response routines 1512.

If the current byte is not a valid command byte at step 1504, the system then returns to the top of the Polling Loop 500.

If the command stored at step 1506 is not determined at step 1508 to be an acknowledgment, then the value of 4 is stored as the variable length at step 1514 and the "complete IO controller message" ISIS event is inserted 1516. A determination is then made as to whether any more input/output data is available 1518. If no more input/output data is available, then the system returns to the top of the Polling Loop 500. If more input/output data is available at step 1518 or if the V-state at step 1502 is determined to be V-state 1, then the new data byte in the output queue is stored as data 1520 and then a determination is made as to whether all data has been received 1522. If all data has not been received, then the system returns to the top of the Polling Loop 500. If all data has been received at step 1522, then the V-state is reset 1524 and the "complete I/O controller message" ISIS event is removed at step 1526. The system then jumps to the Immediate Response routines 1512.

Figure 15B:
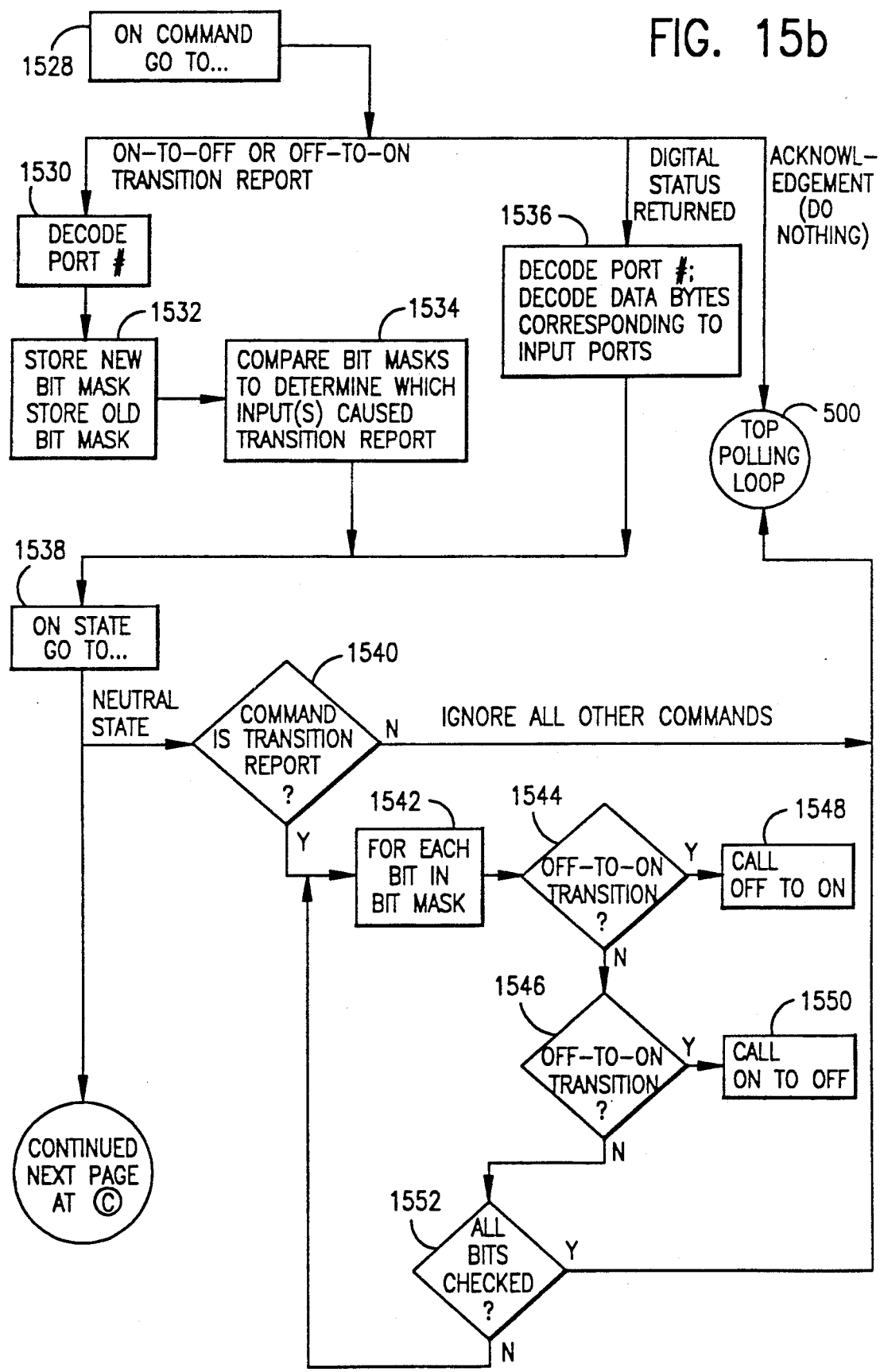
FIG. 15b shows a flow chart of the immediate response and neutral state routine of the input/output controller task module of the present invention.

FIG. 15b shows a flow chart of the Immediate Response routine 1512 and also the Neutral State, both of which are components of the Input/Output Controller Task module. Upon jumping to the immediate response routine, a determination is made at step 1528, of the present command. If the present command is an acknowledgment, then the Immediate Response routine does nothing and the system returns to the top of the Polling Loop 500.

If the present command is an on-to-off or off-to-on transition report, then the port number is decoded 1530 and the new bit mask and old bit mask are stored 1532. The two bit masks are then compared to determine which inputs caused the transition report 1534.

If the command at step 1528 is a digital status command, then the system decodes the port number, decodes the data bytes corresponding to the input board 1536 and then goes to determine the current state at 1538. Likewise, after the new and old bit masks are compared and a determination as to which inputs caused the transition report is made at step 1534, a determination is then made of the current state 1538. If the current state at step 1538 is the Neutral State, then a determination is made as to whether the current command is a transition report 1540. If the current command is not a transition report, then all other commands are ignored and the system returns to the top of the Polling Loop 500.

If the current command is a transition report, then for each bit in the bit mask 1542, a determination is made as to whether the transition was an off-to-on transition 1544. If it was not an off-to-on transition, then a determination is made as to whether the transition was an on-to-off transition 1546. If the determination at step 1544 is that the transition was an off-to-on transition, then the subroutine Off-To-On is called at 1548. In a similar manner, if the determination at step 1546 is that the transition was an on-to-off transition, then the subroutine On-To-Off is called at 1550.

Figure 15C:
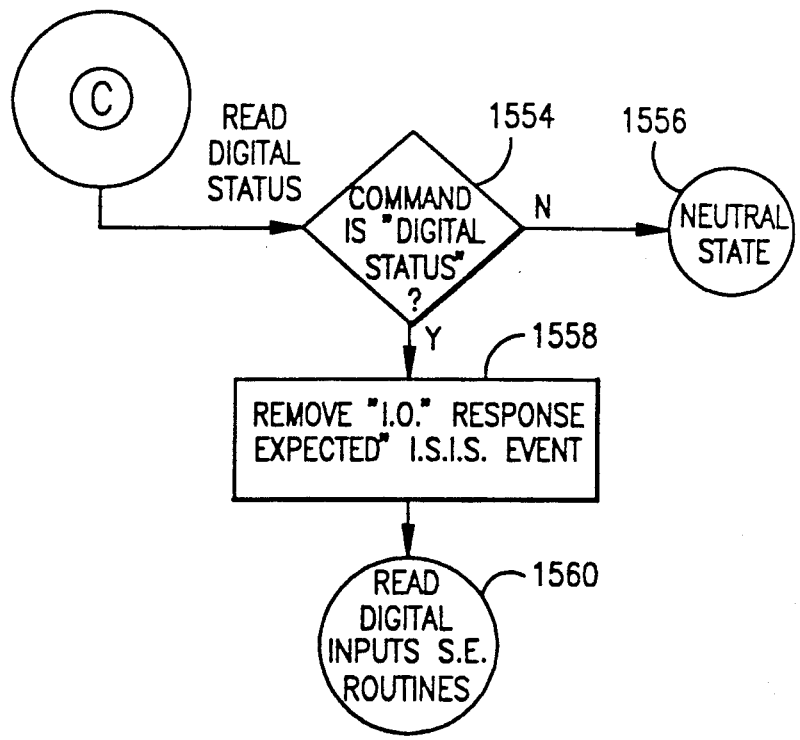
FIG. 15c shows a flow chart for the contextual state routine of the input/output controller task module of the present invention.

If the transition at step 1546 is not an on-to-off transition, then a determination is made as to whether all bits received were checked 1552. If not, the program checks the next bit. If all of the bits have been checked, then the program returns to the Polling Loop 500. If the state at step 1538 is determined to be the read digital status state, then a determination is made as to whether the current command is a digital status command 1554. If the current command is not a digital status command, then the program enters the Neutral State 1556. If the current command is a digital status command, then the "I/O controller response expected" ISIS event is removed 1558 and the program jumps to the read digital inputs Support Environment (step 1560) routine. The read digital status Contextual State of the Input/Output Controller Task is shown in FIG. 15c.

Figure 15D:
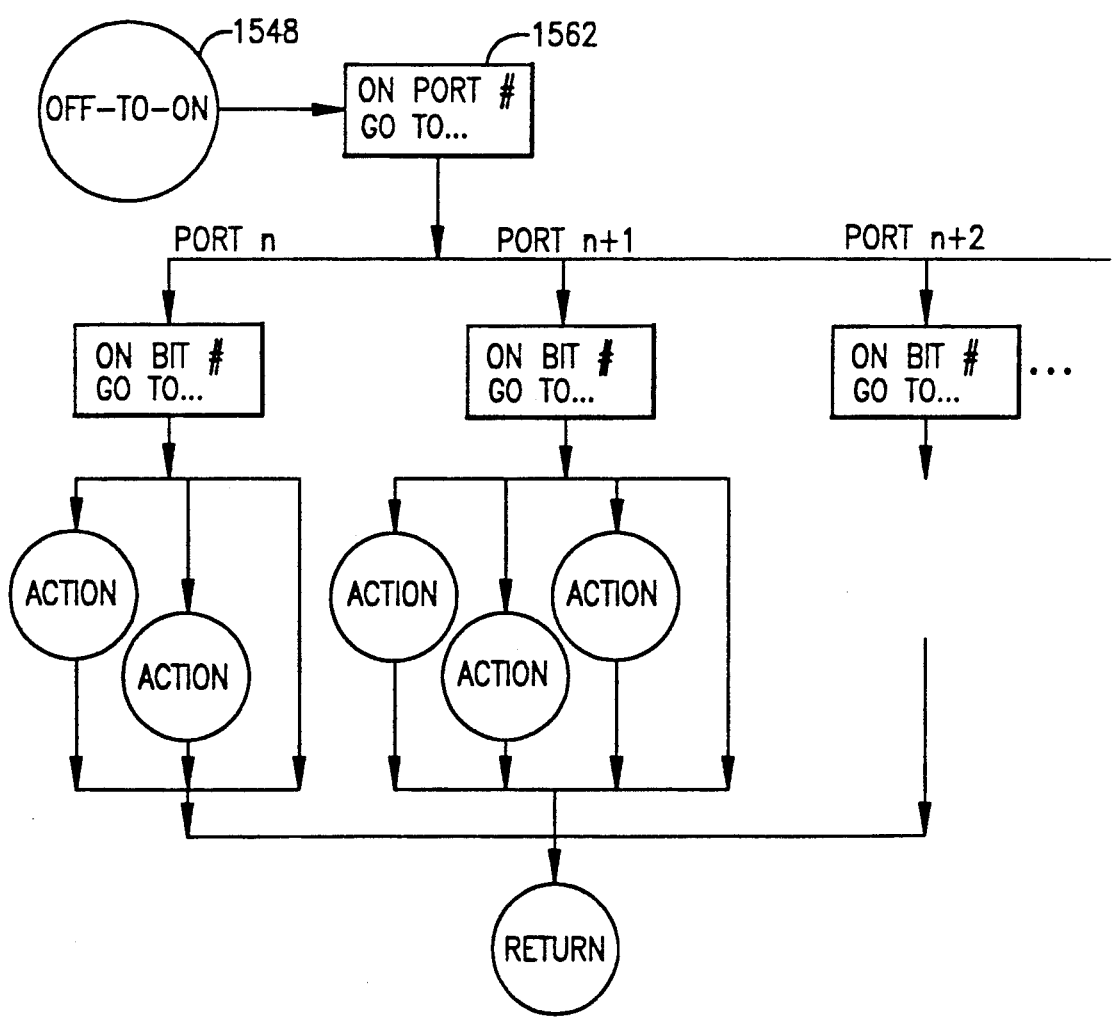
FIG. 15d shows a flow chart of on-to-off and off-to-on routines of the input/output controller task module of the present invention.

Referring now to FIG. 15d, a flow chart of the On-To-Off and Off-To-On routines which may be called from steps 1548 of FIG. 15b are shown. Since both of those routines operate in the same manner, only the Off-To-On routine 1548 has been illustrated.

Once the Off-To-On routine has been called at 1548, the program jumps to the current port number as determined at step 1562. Depending upon whether the current port number is port N, port N+1 or port N+2, etc., the system then jumps to the appropriate port number and takes the appropriate action depending upon the number of the bit in the bit mask and then returns.

As will be apparent in light of the above, the Neutral State of the input/output controller takes action based upon the number of the input and type of transition, either off-to-on or on-to-off that caused an interrupt. For example, a message consisting of the numbers 101, 14, 255, 127 would be decoded as shown in Table 2:

TABLE 2

| 101 - | command indicating an interrupting transition message. |
| 14 - | indicates that the transition occurred on the 14th group of 8 input modules. |
| 255 - | indicates the bit mask of a group of modules after the transition (the new mask). |
| 127 - | indicates the bit mask of a group of modules before the transition (old mask). |

As described above, the two-bit masks would be compared to determine that the 7th input (reading from 0 to 7) made an off-to-on transition and that the action assigned to that transition would be executed. Some transitions may be ignored, since they correspond to the return transition of a device. For example, a push-button being pressed would cause an off-to-on transition report, but when it is released, it would cause an on-to-off transition report. The system controller 10 would take action on the off-to-on report, but not the on-to-off report.

The following are some possible actions that would be taken based upon the detection of a transition: announce the presence of a car in the driveway, announce the presence of a person at the front door, announce that a bath is ready, and execute any action routines, for example, in response to a transition that was caused by a decorative touch switch. Such examples include lighting moods, bath controls, vacation mode, random lighting, controlling voice alerts and setting a distributed audio system to send music to preset areas of the home.

THE DEVICE DRIVERS

The Device Drivers perform the translation between the internal central processor commands and the commands necessary to achieve the desired function. Since there are many varieties of home subsystems, the central processor software has available a range of unique device drivers to support each type of a certain type of subsystem. For example, although several different lighting control systems are known, and each has its own unique device driver, all lighting mood device drivers are called in the same manner from within the central processor software In the future, any new types of a subsystem could be easily incorporated into the present system by developing a new standard Device Driver for that type of the subsystem.

Some of the more complex device drivers include a change to the current state of the Task assigned to their device. Alternatively, they may place an event on the Internal Scheduled Interrupt Server. For instance, some Device Drivers expect an acknowledgment from a secondary processor that their command has been understood and executed That acknowledgment will come back over a serial line and be processed by a Task, rather than by a Device Driver. In that case, the Device Driver will place that device's task in a state where it is expecting that acknowledgment. It would also place an event on the ISIS that would notify it if the acknowledgment had not been received within a certain period of time.

The categories of Device Drivers available in the preferred embodiment are listed below in Table 3. However, the present home automation system is designed to allow for additional device drivers to be added as desired.

TABLE 3

| Simple Device Drivers are as follows: |
| --- |
| Analog input driver |
| Audio and video driver |
| Bath and spa |
| Bus digital input driver |
| Digital output driver |
| Lighting mood driver without acknowledgment |
| Random lighting driver |
| Vacation mode driver |
| Voice recognition |
| Voice synthesis (low priority) |
| The following complex device drivers are available: |
| Lighting mood driver with acknowledgment |
| Security Interface Driver |
| Serial Digital Input Driver |
| Voice Synthesis (high priority) |

The system utilizes the following action routines and Device Drivers as shown in Table 4:

TABLE 4

| Action Routines & Device Drivers | |
| --- | --- |
| Musicon: | Turn on distributed audio system to a set source to a set group of zones. |
| Musicoff: | Turn off distributed audio system. |
| HVACzone#setbackon: | Sets a Heating/Cooling zone to an energy saving temperature. |
| HVACzone#setbackoff: | Sets a Heating/Cooling zone to a normal temperature. |
| Unlockdoor: | Unlocks a given door. |
| Lockdoor: | Locks a given door |
| Bathtempveryhot: | Sets bath temperature to equivalent of very hot. |
| Bathtemphot: | Sets bath temperature to equivalent of hot. |
| Bathtempwarm: | Sets bath temperature to equivalent of warm. |
| Fillthebath: | Fills the bath to a preset level and temperature. |
| Emptythebath: | Empties the bath. |
| Setvacmode: | Turns on vacation mode for the home. |
| Resetvacmode: | Turns off vacation mode for the home. |
| Randomlightson: | Turns on random lighting. |
| Randomlightsoff: | Turns off random lighting. |
| Ltmoods: | Sets a certain lighting mood according to the value passed it. |
| Speakerson: | Turns on speech response speakers according to the values passed it. |
| Speakersoff: | Turns off speech response speakers according to the values passed it. |
| AMX: | Formats and transmits a message to the Audio/Video Controller (IR Emitter). |
| Sentoioc: | Formats and transmits a message to the IO Controller. |
| Sendtosec: | Formats and transmits a message to the S/F Interface. |

THE SUPPORT ENVIRONMENT

The available Support Environment Functions are as shown in Table 5:

TABLE 5

| Support Environment Functions: | |
| --- | --- |
| Display Cursor: | Handles cursor movement and touchbox dynamics. |
| Pullbyte: | Pulls a byte of data from a specified Serial Input Queue. |
| Colorchange: | Changes any color within a specified rectangular area to any other color, according to the values passed it. |
| Instimeevent: | Inserts an event into the ISIS queue, according to the event type and event time passed it. |
| Deltimeevent: | Deletes an event from the ISIS queue, according to the event time passed it. |
| Checktouch: | Compares recognition templates and touch coordinates with the locations of the current touchboxes on the screen, and returns the number of any activated touchbox. |
| Reloadsched: | Reloads the daily schedule from a data file, screening out events that are not to occur on that day. |
| Playafile: | Speak a phrase. |
| Playmemsequence: | Speak a phrase followed by individual words, such as numbers. i.e. "The temperature is", "90", "5", "degrees". |
| Loadscreen: | Load a new menu screen and reset various graphics status variables. |
| Loadslice: | Load a portion of a screen. |
| Loadvocab: | Load a voice recognition vocabulary into a speech board. |
| Initrecognition: | Initialize voice recognition for a menu. |
| Spchutil: | A variety of routines designed to manage the speech boards in a cohesive, non-interfering manner. |
| Commbyport: | A general serial transmission routine. |
| Avrsofterror: | Error handler for code-detected error conditions. |
| Codeerror: | Error handler for software run-time errors. |
| Readana: | Reads an analog voltage and/or temperature from an analog input. |
| Readdigio: | Reads the current values of all the interrupting digital inputs. |
| Metrabyteread: | Reads the current values of a group of passive digital inputs according to the value passed it. |
| Metrabyteon: | Turns on a digital output according to the values passed it. |
| Metrabyteoff: | Turns off a digital output according to the values passed it. |
| Metrapulseon: | Pulses a digital output on for the duration passed it. |
| Metrapulseoff: | Pulses a digital output off for the duration passed it. |

There are several components of the support environment, each of which will be discussed separately. They are: initialization, graphics routines, error logging and response, task switching and controls, and user-scheduled events.

The initialization phase, as the name suggests, takes place when the home automation system is first run. At that time, various actions must be taken to ensure that the run-time portion of the software begins from a known state. Thus, all variables are initialized to values that reflect the most common expected state of the various subsystems. Interrupt and schedule queues are established to service the various devices. The devices on the AT bus 12 are reset and are brought to their active state. The remote secondary processors are sent interrogatory commands in order to ascertain that they are operative.

Additionally, any user-scheduled events subsequent to the current time and date are loaded into the ISIS. Depending upon the time of day, scheduled device driver routines may be activated, such as photo cell monitoring. At this point, the touchscreen "redormant" substate is executed to begin the run-time software. If any problems have occurred up to this point, the initialization software will report and log the problem and then attempt to recover and continue the initialization. Due to the modular nature of the system, and the fact that systems will be "rebooting" themselves subsequent to power failures, the software is designed to try to run a partially functioning system rather than to shut down completely.

Another component of the support environment is the graphics routines. The EGA monitors placed throughout the home environment provide the major means of communicating information to the user. A variety of standard routines are thus provided in order to control the usage of this screen. They consist of the following routines: load screen, load local image, highlight touch box and large font.

The third component of the support environment is the error logging and response function. Within the system, there are two types of errors that may occur; Code errors and System errors. Code errors are those generated by the run-time portion of the BASIC compiler. Those errors are of the type such as "divide by 0". Usually, the central processor software will recover from such errors, but, occasionally, the system may crash due to a particularly unpleasant error. Code errors are not reported to the user, but are logged with the error number, time, date and current state of the master touchscreen task.

System errors, on the other hand, occur when a routine detects a problem. These errors result from conditions that are actively examined by a particular software routine. Examples of system errors are voltage readings out of a normal range, failure of a secondary processor to respond, or inability to open a data file. System errors are logged with the error number, a text description of the error that may include some variable values, time, date, and the current state of the master touchscreen task. The central processor almost always recovers from system errors. System errors may or may not be reported to the user, at the option of the routine which detected the error.

The fourth component of the support environment is the Task Switching and a Controls Subpart. As discussed, all tasks are structured in approximately the same manner. Usually, states and state transitions are selected and executed based upon data processed from that task's assigned device or devices. However, a task's current state may occasionally be set or altered by an external software module, such as a device driver expecting an acknowledgment over a serial line. ISIS events are also used to select and execute a state in a task under certain circumstances. Tasks may also select and execute a state within another task. Such external tasks-mandated state execution usually occurs between the master touchscreen task and another task.

Due to the lack of multi-tasking capabilities in the operating system and the high-level language, there are no software controls to limit such nonstandard state selection and execution, as described above. Thus, the functionality of the nonstandard task-switching is checked through software validation and verification during software development.

The final component of the support environment is the User-Scheduled Events Module. The present home automation system allows the user to schedule events to occur at a future date and/or time, such as setting a "vacation mode" to occur while one is away for two weeks. The list of scheduled events is maintained in a disk file which is loaded when the program is run, and which is reloaded in the first few seconds of each day. When the schedule file is loaded, the dates of the events in the file are compared with the current date. If the dates coincide, then an event is inserted in the ISIS queue according to the time and type of event in the schedule file. That line is then erased from the schedule file.

OPERATION

There are two phases to the operational sequence of the disclosed home automation system, the system initialization and normal operation phases. When the home automation system is fully installed in a home and the power switch is then turned on, the system initialization phase begins under the control of a batch file of operating system commands. Near the end of the initialization phase, the home automation real-time software, HEART is loaded and control is then passed to that system. The HEART software performs the remaining initialization tasks and then enters the normal operation phase. Each of the system initialization and normal operation phases is described below in more detail.

At power on, the system initialization phase begins. The central processor 10 executes its standard boot-up procedure and runs a predetermined auto-execute batch file designed to initialize the disclosed home automation system. In the preferred embodiment, this batch file is set up as a series of MS DOS commands. The main functions of this batch file are to configure the present home automation system hardware and to load data files into memory. The initial portion of the batch files serves to change hard disk directories where data files are located and copies files from those directories to the system extended memory or RAM. That is done so that the computer can load and use the data more rapidly than if it had to rely on hard disk access. The following are examples of the various classes of files which are stored as shown in Table 6:

TABLE 6

| | |
|---|---|
| *.pic: | Full screen color graphics files in a format compatible with the hardware's color graphics controller board. These files are loaded by the HEART program into graphics memory to show a full-screen, high-resolution, color-graphics display on a monitor or touchscreen. |
| *.fnt: | Color graphics type fonts consisting of large characters and symbols to be dynamically displayed on the screen. |
| *.icn: | Icons and other graphics images designed to be displayed on the screen under program control. |
| *.sct: | Multi-word or complete phrase Speech Response data files in the proper format for the speech response hardware. |
| *.spk: | Single word or partial phrase Speech Response data files in a format for appending with other .SPK files to build variable speech phrases compatible with the TISPEECH board. |
| *.voc: | Vocabulary template data compatible with the TISPEECH board's recognition mode. When these files are loaded into the TISPEECH board by the HEART program, they define the active recognition vocabulary. |
| *.img: | software files containing routines to be loaded for the TISPEECH board. Depending on which routine is loaded, the TISPEECH board will |

TABLE 6-continued perform voice recognition, speech response, or telephone functions.

After all the files have been copied, the auto-execute batch file runs the other initialization software necessary to initialize system hardware. One such example of such initialization software is a program called tispeech which is run to initialize the TISPEECH hardware contained in the speech processor 58.

The last function of the auto-execute batch file is to load and run the HEART operating software.

The HEART software begins by performing its own initialization routines. Variables are initialized, the interrupt and scheduling queues are established, system devices are reset and made active, other processors in the home automation system are interrogated for proper operation and active schedules are loaded. After initialization, the HEART software executes the touchscreen "redormant state". From that point on, the system is then in the normal operation phase.

After the inventive home automation system has been initialized, the normal operation phase begins. In normal operation, the system usually appears to be "dormant" with no apparent actions being performed. However, the system software is busy in its Polling Loop (shown in FIGS. 5a-5c) checking all of the input queues for data. Based upon the data received at the input queues, the present home automation system will take appropriate action. An example of one of the possible operational sequences follows.

In order to describe the operation of the disclosed home automation system in normal use, the following describes how the user would utilize the touchscreen to control the security system. It should be understood, however, that controlling the security system is only one of the functions as described herein, but is believed to be representative of how the instant home automation system operates. The following example shows, how, using touchscreen commands, a user would disable a security zone, and then arm his security system.

In preferred installation, the user steps up to the touchscreen which is recessed in a wall and is displaying a "dormant screen" display, which can range from a blank screen to a logo to a custom graphic designed for the user. At this point, the Master Touchscreen Task is in the Neutral State and the software is in the Polling Loop, FIGS. 5a-5c. To enter a command, the user touches the display screen anywhere on its surface. The user's touch causes the touchscreen internal electronics to begin sending touch position locations on a communications cable connected to a serial port on the system controller, namely through serial interface 14. The Validation routine shown in FIG. 7a interprets the data and enters the Immediate Response routine shown in FIG. 7b.

While the user keeps his finger on the touchscreen, a small cursor is continually displayed beneath his finger. The cursor will follow the user's finger if he moves it around the screen. When the user lifts his finger from the screen for longer than 0.1 seconds, the disclosed home automation system will recognize that as a valid touch event on the dormant screen, speak an optional greeting and then initialize the main menu state, which is shown as a flow chart in FIG. 7c.

While in the main menu mode, the system displays a new graphic such as that shown in FIG. 3a, a menu of the general features that the system can perform. The main menu touchscreen task operates as a general Contextual State, as shown in flow chart form in FIG. 3d. Unlike the dormant state, however, where, in this example, only one action was possible through the touchscreen, the main menu state will perform different functions depending upon where the touchscreen is touched. Once again, a display cursor "follows" the user's finger as he slides it about the screen, but now, when his finger moves across any touch active area or function box (called a box in FIG. 7d), that area is highlighted by changing its color. If the user lifts his finger while an area is highlighted, then the software will recognize an input and perform the action appropriate for that location in the main menu state. (See bottom of FIG. 7d).

In this example, the user touches the main menu function box titled Security Management. The home automation system responds by displaying a Security Management menu, as shown in FIG. 3g. The software then enters the Security Management state.

The Security Management screen shown in FIG. 3g is a menu screen of the available security features. (It should also be noted that the Security Management state is also a Contextual State as shown in FIG. 7d).

In this example, the user will disable a single security zone so that a window can be left open, and then arm the security system using a floor plan screen display. To do this, the user touches the menu box labelled ENTRY LEVEL on FIG. 3g, since the zone to be disabled is on that floor. The menu box is highlighted, and when the user lifts his finger, the display changes to show a floor plan of the entry level of the home, FIG. 3h.

After displaying the floor plan, the home automation system requests the status of all of the security zones on that level from the security interface 14, as shown in FIG. 7g. Next, the system displays the security status of each zone on the display, as shown in FIG. 7h. This display, which is shown in FIGS. 3h and 3i, indicates with a colored icon whether each zone is enabled, disabled or open. (The touchscreen state is set to analyze floor plan touches in the middle of FIG. 7h).

In order to disable the right living room window, the user first selects that window by touching it on the floor plan display. The system responds by highlighting the window with a colored box, and describing the associated security zone and its status at the bottom of the screen. To disable the zone, the user then touches the white box labelled disable zone. (See FIG. 7i). The system responds by requesting the home security system to disable the zone and awaits confirmation of its request from the security system. (See FIG. 7l).

When the zone disable request is accomplished and confirmed, the system modifies the zone icon and changes the status description on the screen, as shown in FIG. 3i. The flow chart for accomplishing those features is shown in FIGS. 7m and 7n.

The next step in this example is for the user to arm the security system. To do that, the user touches the white box labelled ARM SYSTEM. (See FIG. 7i). The box is highlighted, and the display changes to a pass code display as shown in FIG. 3n. (The flow chart of FIG. 7j calls another Contextual State, which is shown in FIG. 7d).

The next step is for the user to enter a security password code, one digit at a time, followed by the command OK. If the code is correct, the system sends an "arm" request to the security system, as shown in FIG.

3j. When confirmation is received, the Entry Level screen is again displayed with the green "ready to arm" indicator replaced by a red "armed" indicator as shown in FIG. 3m.

The last step in this example is for the user to communicate to the home automation system that he has completed his task and is through with the system. To do this, he touches the white box marked "Quit" which highlights and returns the system to its dormant screen and dormant state. Thus, from the flow chart shown in FIG. 7i, the system jumps to the redormant routine flow chart, which is shown in FIG. 7o.

As has been described previously herein, the present inventive expandable home automation system can be utilized to control numerous environments. One such environment which can be controlled in a manner similar to that disclosed herein is a media or conference room, as shown in FIGS. 12a–12g.

Figure 12A:
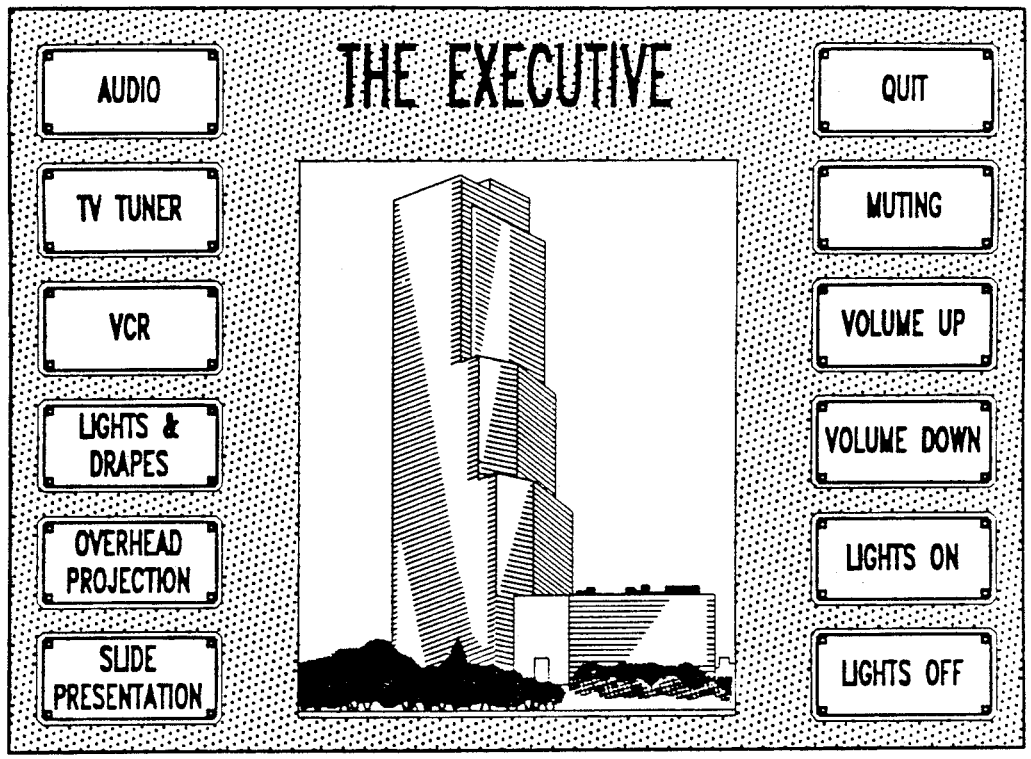
FIGS. 12a–12g show an example of a series of touchscreen menus which may be utilized to control an electronic conference room or an entertainment media room.

As shown in FIG. 12a, the main menu of a touchscreen control-based system similar to that disclosed herein in connection with the expandable home automation system is shown. Equipment such as audio equipment, TV tuners, VCRs, lights and drapes, overhead projection and slide presentation equipment can be controlled merely by touching the appropriate function box on the touchscreen menu shown in FIG. 12a. Other functions such as quitting, muting the sound, volume up and down, and lights on and off may also be provided.

Figure 12B:
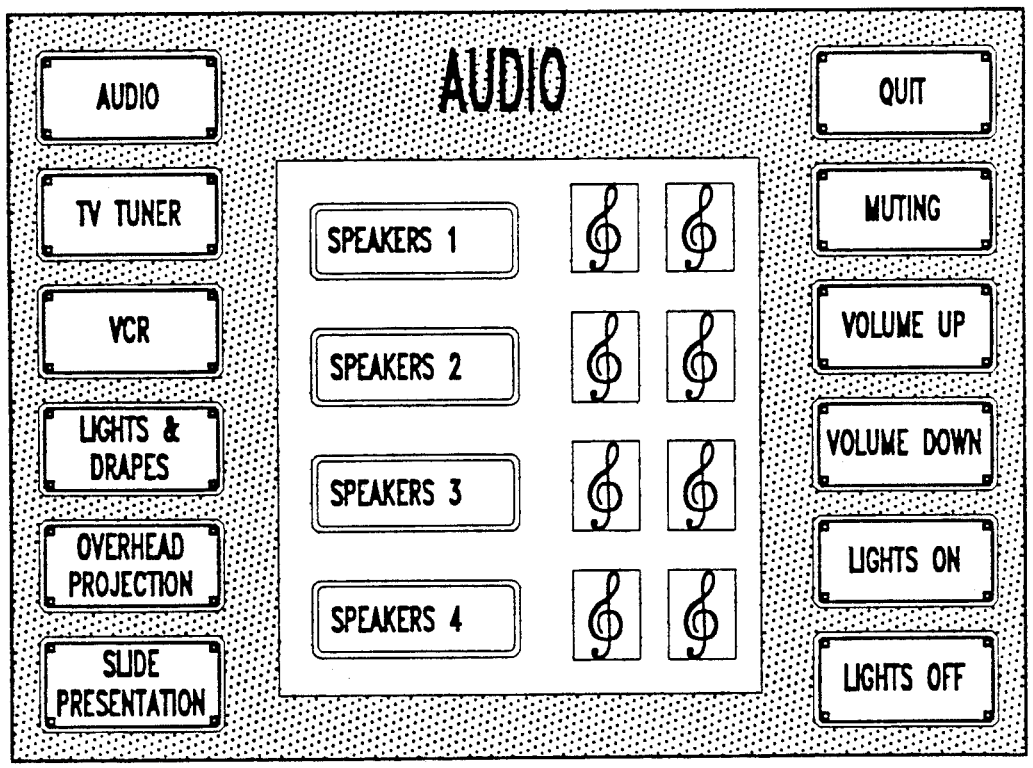

FIG. 12b shows the audio sub-menu touchscreen for the main menu touchscreen shown in FIG. 12a. In addition to containing the functional control block contained in the main menu touchscreen of FIG. 12a, the audio sub-menu touchscreen allows the user to enable a plurality of high fidelity speakers, four being shown in this specific example.

Figure 12C:
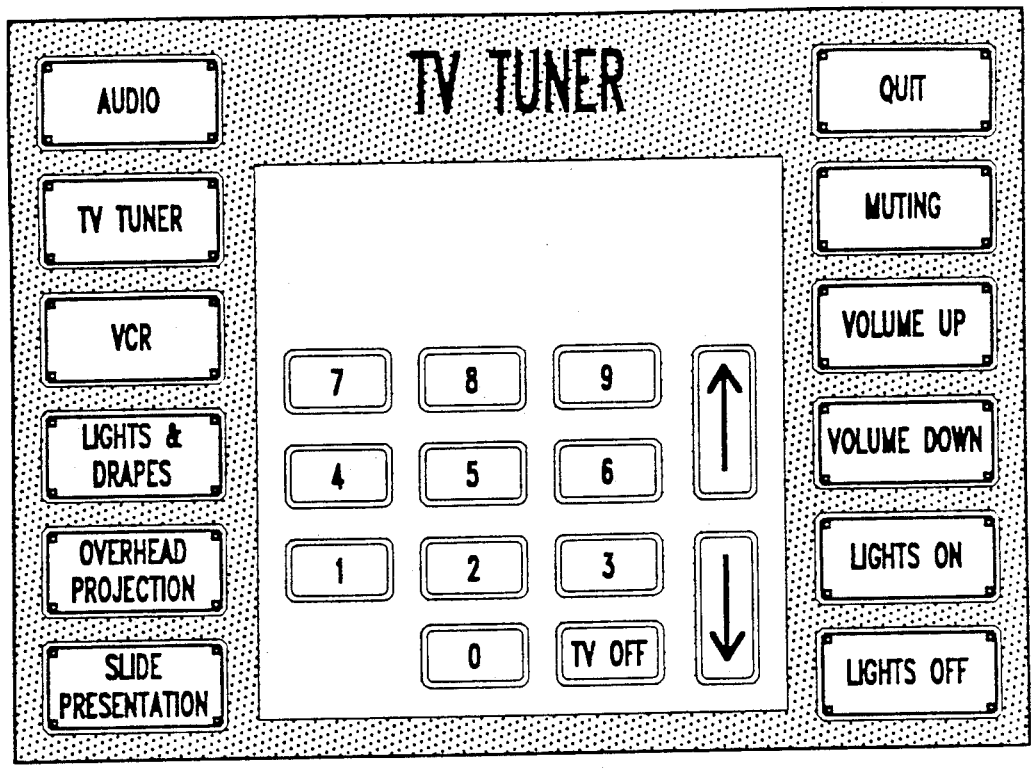

FIG. 12c shows the TV tuner sub-menu touchscreen which is selected by touching the TV tuner functional block of FIG. 12a. The TV tuner sub-menu touchscreen allows the user to turn the TV on by selecting a particular channel, to turn the TV off, and to scan the channels using up and down function blocks.

Figure 12D:
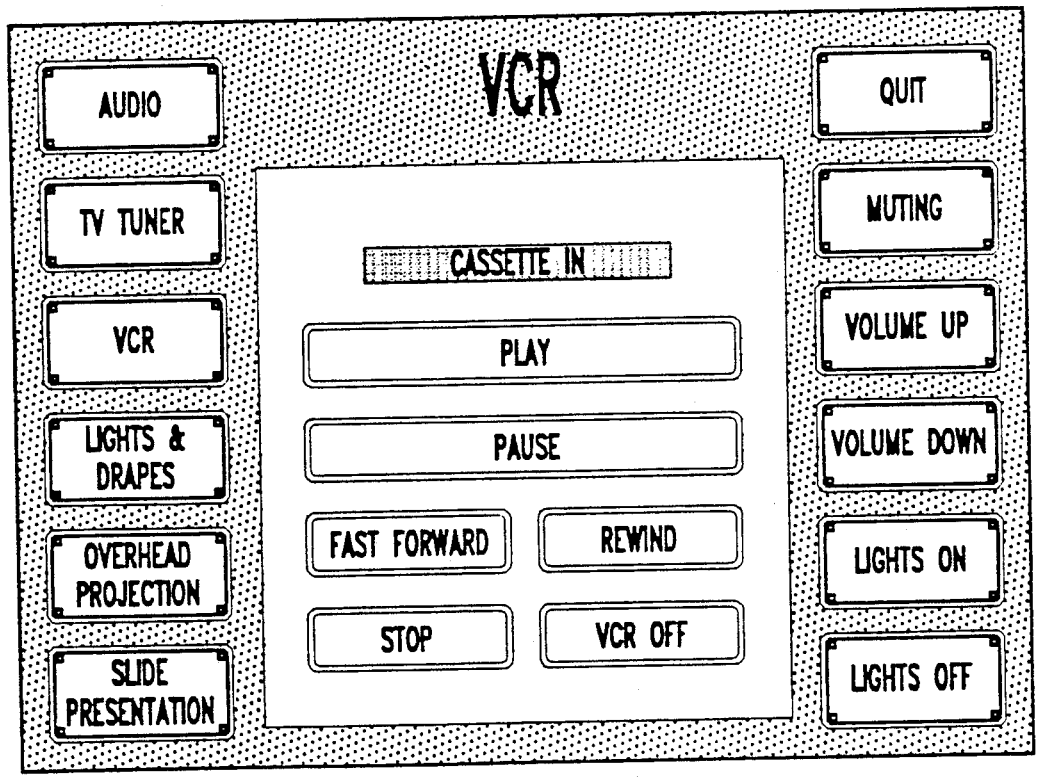

FIG. 12d shows the VCR sub-menu touchscreen which is displayed upon selecting the VCR function block of FIG. 12a. The VCR can be actuated and placed in the play, pause, fast-forward, rewind or stop mode, it can be turned off and an indication is provided as to whether the video tape cassette has been loaded into the VCR.

Figure 12E:
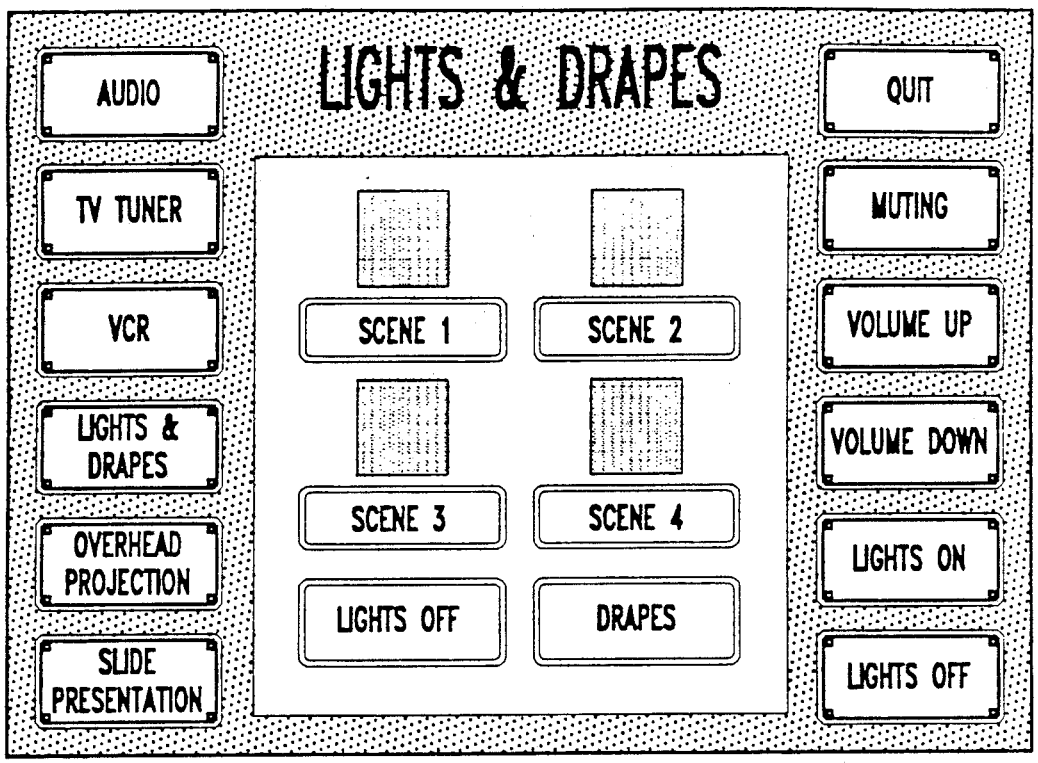

FIG. 12e shows the lights and drapes sub-menu touchscreen which appears upon selecting the lights and drapes function from the main menu touchscreen shown in FIG. 12a. Various predetermined settings can be chosen by selecting scenes 1–4, which actuate the lights and drapes according to predetermined data in a manner similar to that discussed in connection with the lighting moods sub-menu touchscreen FIG. 3k. In addition, functional blocks are provided to actuate the drapes to change their state either from open to close or closed to open and to turn the lights off.

Figure 12F:
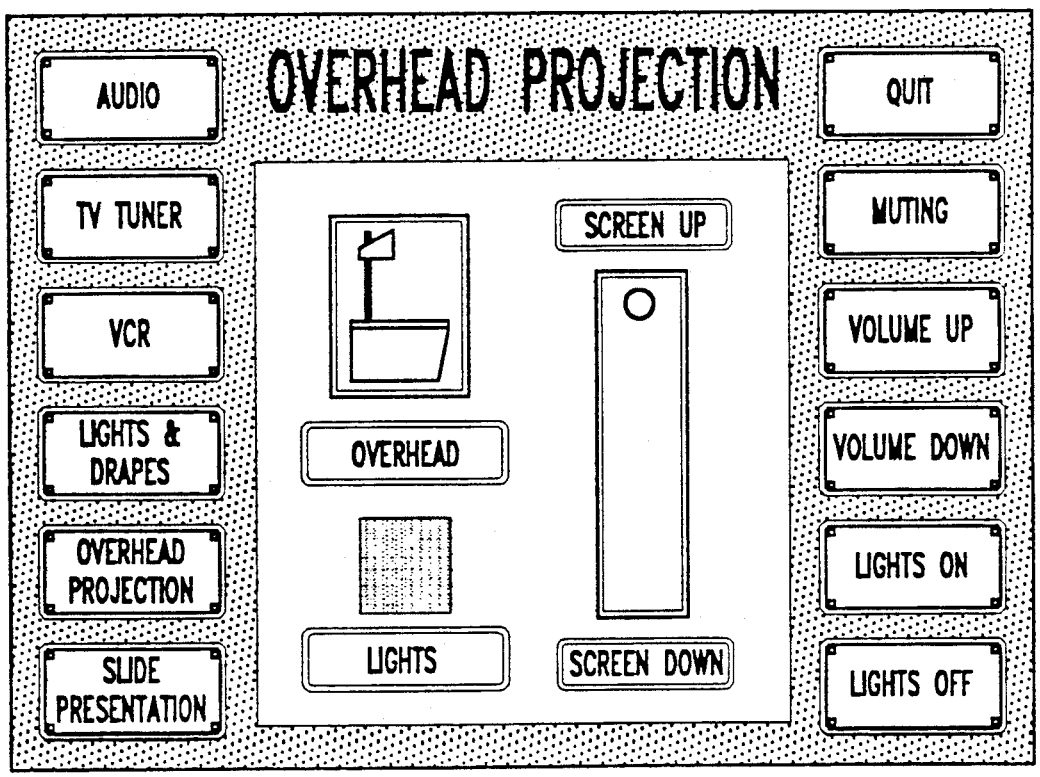

FIG. 12f shows the overhead projection sub-menu touchscreen which appears on the monitor upon selecting the overhead projection functional box from the main menu touchscreen shown in FIG. 12a. The touchscreen menu of FIG. 12f allows the user to turn on the overhead projector, turn the lights off and to move the projection screen up and down.

Figure 12G:
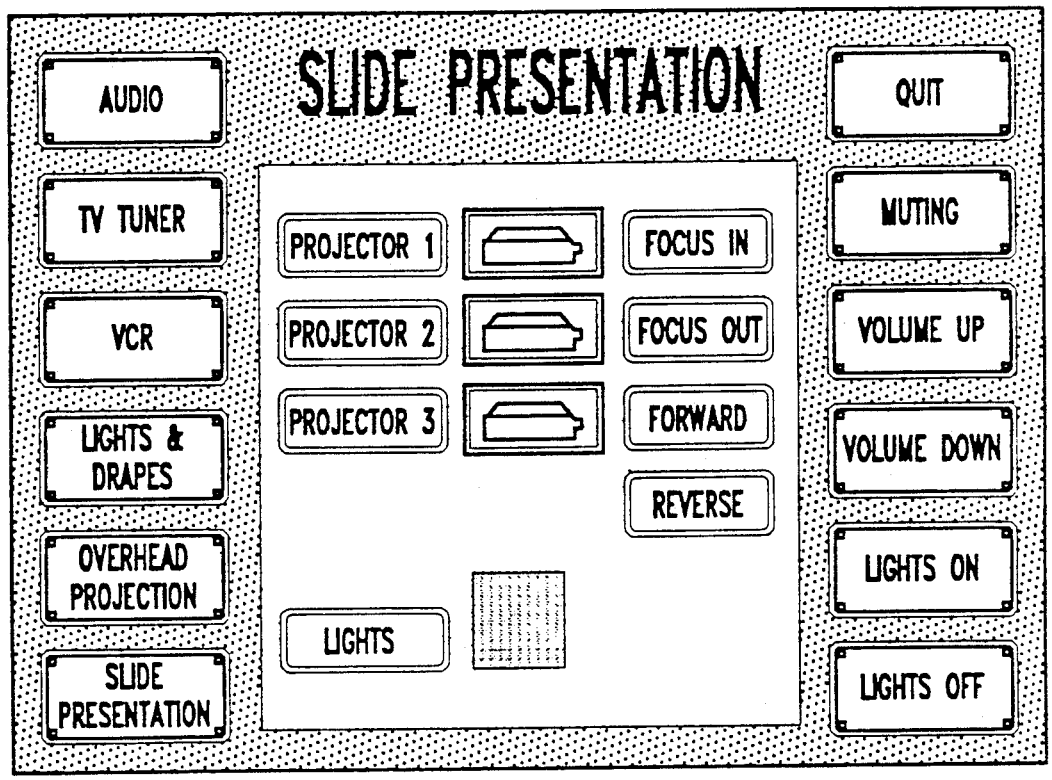

FIG. 12g shows a slide presentation sub-menu touchscreen which is selected upon selecting the slide presentation function from the main menu touchscreen shown in FIG. 12a. A plurality of projectors may be actuated and the lights turned on and off using the functional blocks provided on this sub-menu touchscreen. In addition, the selected projector can be focused in and out and caused to move in either a forward or reverse direction, using additional functional touch blocks provided on this sub-menu touchscreen.

Although many of the functions described herein operate to set parameters to those values preset in data files, it will of course be obvious to those of ordinary skill in the art that the present expandable home automation system can also be utilized to generate ramp signals with which to continuously vary the settings to a contemporaneous user determined value.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A system for automatically controlling a plurality of remotely controllable subsystems within a house, said system also being useful for automatically performing a plurality of commands input to the system by a user, said system comprising:

a programmed data processor;

at least one data interface means connected to said programmed data processor by means of a data bus, said at least one data interface means being connected to said plurality of remotely controllable subsystems for providing bidirectional direct communication between the subsystems and said programmed data processor;

visual communication interface means comprised of a high resolution video monitor and associated touchscreen interface, through which the system communicates information received from said subsystems and also accepts commands from said user, said commands being communicated to said system merely by the user touching said touchscreen interface means; and audio communication interface means comprised of a voice recognition and speech system, through which the system and user communicate with each other, said voice recognition and speech system functioning together with said visual communication interface to provide cues to said user as to available commands, feedback of whether the current command has been accepted by the system and the results of performing said current command.

2. The system of claim 1, further including a modem through which said system can communicate with external information retrieval data bases.

3. The system of claim 1, further including a plurality of types of user devices simultaneously connected to said programmed data processor for communicating commands to said system, said user devices comprising at least one of keypads, serial data keypads, hand-held remote controls, computer keyboards and telephones.

4. The system of claim 1, wherein said plurality of data interface means includes translator means, connected between a commercially available automation controller and said programmed data processor, whereby said system can control said automation controller.

5. The system of claim 1, wherein said visual communication interface means provides the user with a floor plan display of at least one floor of said house, by which the user may enter certain commands into the system by touching the appropriate portion of said floor plan.

6. The system of claim 1, further including home appliances connected to said data interface means such that said system can control said home appliances.

7. The system of claim 1, wherein the user may schedule the occurrence of user-determined events by the system by utilizing said visual communication interface means.

8. The system of claim 1, wherein said remotely controllable subsystems comprise at least one of home heating and cooling systems, access control systems, security systems and lighting systems.

9. The system of claim 1, wherein one of said plurality of remotely controllable subsystems comprises audio/video entertainment means which may be controlled by the user by operation of said visual communication interface means.

10. The system of claim 1, wherein said system is expandable to control a plurality of remotely controllable subsystems and home appliances by incorporating an unlimited number of data interface means.

11. A system for automatically controlling a plurality of remotely controllable subsystems within a house, said system also being useful for automatically performing a plurality of commands input to the system by a user, said system comprising:
  a programmed data processor;
  a plurality of data interface means connected to said programmed data processor by means of a data bus, said plurality of data interface means being connected to said plurality of remotely controllable subsystems for providing bidirectional direct communication between the subsystems and said programmed data processor;
  visual communication interface means comprised of a high resolution video monitor and associated touchscreen interface, through which the system communicates information received from said subsystems and also accepts commands from said user, said commands being communicated to said system merely by the user touching said touchscreen interface means; and
  a plurality of additional communication interface means, including at least two of a keypad, serial data keypad, a voice recognition system, hand-held remote control, computer keyboard and telephone, said at least two additional communication interface means being simultaneously connected with each other and said visual communication interface means to said programmed data processor such that said user may communicate commands to said system using any of said connected communication interfaces.

12. The system of claim 11, wherein said system is expandable to control a plurality of remotely controllable subsystems and home appliances by incorporating an unlimited number of data interface means.

13. The system of claim 11, further including a modem through which said system can communicate with external information retrieval data bases.

14. The system of claim 11, wherein said plurality of data interface means includes translator means, connected between a commercially available automation controller and said programmed data processor, whereby said system can control said automation controller.

15. The system of claim 11, wherein said visual communication interface means provides the user with a floor plan display of at least one floor of said house, by which the user may enter certain commands into the system by touching the appropriate portion of said floor plan.

16. The system of claim 11, further including home appliances connected to said data interface means such that said system can control said home appliances.

17. The system of claim 11, wherein the user may schedule the occurrence of user-determined events by the system by utilizing said visual communication interface means.

18. The system of claim 11, wherein the user may schedule the occurrence of user-determined events by the system by utilizing said voice recognition system.

19. The system of claim 11, wherein said remotely controllable subsystems comprise at least one of home heating and cooling systems, access control systems, security systems and lighting systems.

20. The system of claim 11, wherein one of said plurality of remotely controllable subsystems comprises audio/video entertainment means which may be controlled by the user by operation of said visual communication interface means.

* * * * *